United States Patent [19]

Rostoker et al.

[11] Patent Number: 5,640,399
[45] Date of Patent: Jun. 17, 1997

[54] SINGLE CHIP NETWORK ROUTER

[75] Inventors: Michael D. Rostoker, Boulder Creek; D. Tony Stelliga, Pleasanton, both of Calif.

[73] Assignee: LSI Logic Corporation, Milpitas, Calif.

[21] Appl. No.: 529,656

[22] Filed: Sep. 18, 1995

Related U.S. Application Data

[63] Continuation of Ser. No. 139,999, Oct. 20, 1993, abandoned.

[51] Int. Cl.$^6$ ........................................ H04J 3/14
[52] U.S. Cl. ........................ 370/392; 370/402; 370/466
[58] Field of Search ........................... 370/85.13, 85.14, 370/85.1, 60, 60.1, 61, 58.1, 94.1, 110.1, 99, 105.1, 13, 17, 92, 351, 389, 392, 393, 395, 396, 397, 398, 399, 400, 401, 402, 403, 404, 405, 410, 428, 429, 465, 466, 467, 469, 470, 471, 472, 475, 476, 503, 509, 522, 252

[56] References Cited

U.S. PATENT DOCUMENTS

| | | | |
|---|---|---|---|
| 4,803,485 | 2/1989 | Ripinski | 340/825.05 |
| 4,831,620 | 5/1989 | Conway et al. | 370/401 |
| 4,905,225 | 2/1990 | Gulick | 370/353 |
| 4,907,225 | 3/1990 | Gulick et al. . | |
| 4,933,937 | 6/1990 | Konishi | 370/466 |
| 5,058,110 | 10/1991 | Beach et al. | 370/464 |
| 5,086,426 | 2/1992 | Tsukakoshi | 370/405 |
| 5,105,421 | 4/1992 | Flaig et al. | 370/363 |
| 5,105,424 | 4/1992 | Flaig et al. . | |
| 5,121,390 | 6/1992 | Farrell et al. | 370/458 |
| 5,130,977 | 7/1992 | May et al. | 370/422 |
| 5,210,748 | 5/1993 | Onishi et al. | 370/405 |
| 5,218,680 | 6/1993 | Farrell et al. | 395/325 |
| 5,226,120 | 7/1993 | Brown et al. | 395/200 |
| 5,229,994 | 7/1993 | Balzano | 370/401 |
| 5,239,542 | 8/1993 | Breidenstein et al. | 370/467 |
| 5,245,606 | 9/1993 | DeSouza | 370/401 |
| 5,420,862 | 5/1995 | Perlman | 370/401 |

*Primary Examiner*—Wellington Chin
*Assistant Examiner*—Huy D. Vu
*Attorney, Agent, or Firm*—Poms, Smith, Lande & Rose

[57] ABSTRACT

A single chip router for a multiplex communication network comprises a packet memory for storing data packets, a Reduced Instruction Set Computer (RISC) processor for converting the packets between a Local Area Network (LAN) protocol and a Wide Area Network (WAN) protocol, a LAN interface and a WAN interface. A Direct Memory Access (DMA) controller transfers packets transferring packets between the packet memory and the LAN and WAN interfaces. A packet attribute memory stores attributes of the data packets, and an attribute processor performs a non-linear hashing algorithm on an address of a packet being processed for accessing a corresponding attribute of said packet in the packet attribute memory. An address window filter identifies the address of a packet being processed by examining only a predetermined portion of said address, and can comprise a dynamic window filter or a static window filter.

4 Claims, 32 Drawing Sheets

ATM Adaptation Layer
Convergence Sublayer

AAL5 CR C32 Generation and Checking
Segmentation and Reassembly Sublayer

Type 1, CBR
Type 2, 3/4 VBR
Type 5, VBR

ATM Layer

Cell Multiplexing and Demultiplexing    Delay Priority Processing
Generic Flow Control    CLP Marking, CLP Reduction
Cell Header Generation and Extraction    Explicit FC Indication to Higher Layers
Cell Rate Pacing    Cell Payload Type Marking, Differentiation
Cell TX exceeding the Pacing Rate    Cell Relaying
Cell Rate Decoupling    Cell VPI/VCI Translation
   *Peak Rate Enforcement*

Physical Layer
Transmission Convergence Sublayer

HEC Generation (optional)
Cell Delineation

Transmission Frame Adaptation
Transmission Frame Generation and Recovery

Physical Medium Sublayer
Bit Timing, Physical Medium

Host CPU

ATMizer

OAM FUNCTIONALITY

TCS Specific
Sonet, Taxii, etc

Fig.3

58c — Global Pacing Rate Register

7 | 1 | 1 | 1 | 0 | 0 | 0 | 0 | 0
50% Information rate

| Assigned | Assigned | Assigned | Assigned | IDLE | IDLE | IDLE | IDLE |
| Cell | Cell | Cell | Cell | Cell | Cell | Cell | Cell |

58c — Global Pacing Rate Register

7 | 1 | 0 | 1 | 0 | 1 | 0 | 1 | 0
50% Information rate

| Assigned | IDLE | Assigned | IDLE | Assigned | IDLE | Assigned | IDLE |
| Cell | Cell | Cell | Cell | Cell | Cell | Cell | Cell |

Fig.9

Channel Group Credit Register

| 7 | 6 | 5 | 4 | 3 | 2 | 1 | 0 |

7     58b     0

Bit 0 Set = Peak Pacing Rate Counter 0 Expired
Bit 1 Set = Peak Pacing Rate Counter 1 Expired
...
All bits cleared on system reset

Fig.10

Store Word; SW rt, offset(rb)

31          26 25      21 20    16 15                              0

| SW | base adr reg | data reg | signed imed address offset |
| 101011 | rb | rt | offset |

| LO | TLC (≤ 64 bytes) | | G | D | 0100 | 0000 | LAC (VCR Start Address) | 00 |
| XX | XXXXXXXX | 00 | X | X | | | XXXXXXXXXX | |

*Effective Address Field Settings for* <u>Write to DMA Control Registers/Counters</u>

Ea(31:30) written into LO
Ea(29:24) written into TLC
Ea(21) written into Ghost Register
Ea(20) written into DMA Operation Direction Register
Ea(19:16) = 0100 targets the DMA Control Registers/Counters
Ea(11:2) written into LAC
Rt(31:24) written into MAR, Rt(23:2) written into MAC, Rt(1:0) written into the MOR

Fig.13

| 31 | 20 | 19  16 | 15 | 0 |
|---|---|---|---|---|
| 0 0 0 0 0 0 0 0 0 0 0 0 | | 0 1 0 1 | 0 0 0 0 0 0 0 0 0 0 0 0 0 0 0 0 | |

*Effective Address Field Settings for Rd/Wr the DMA's CRC32 Partial Results Register*

Ea(19:16) = 0101 targets the DMA's CRC32 Partial Results Register
Rt(31:0) written into CRC32 Partial Register(31:0) during Store Word execution
CRC32 Partial Register(31:0) loaded into Rt(31:0) during Load Word execution

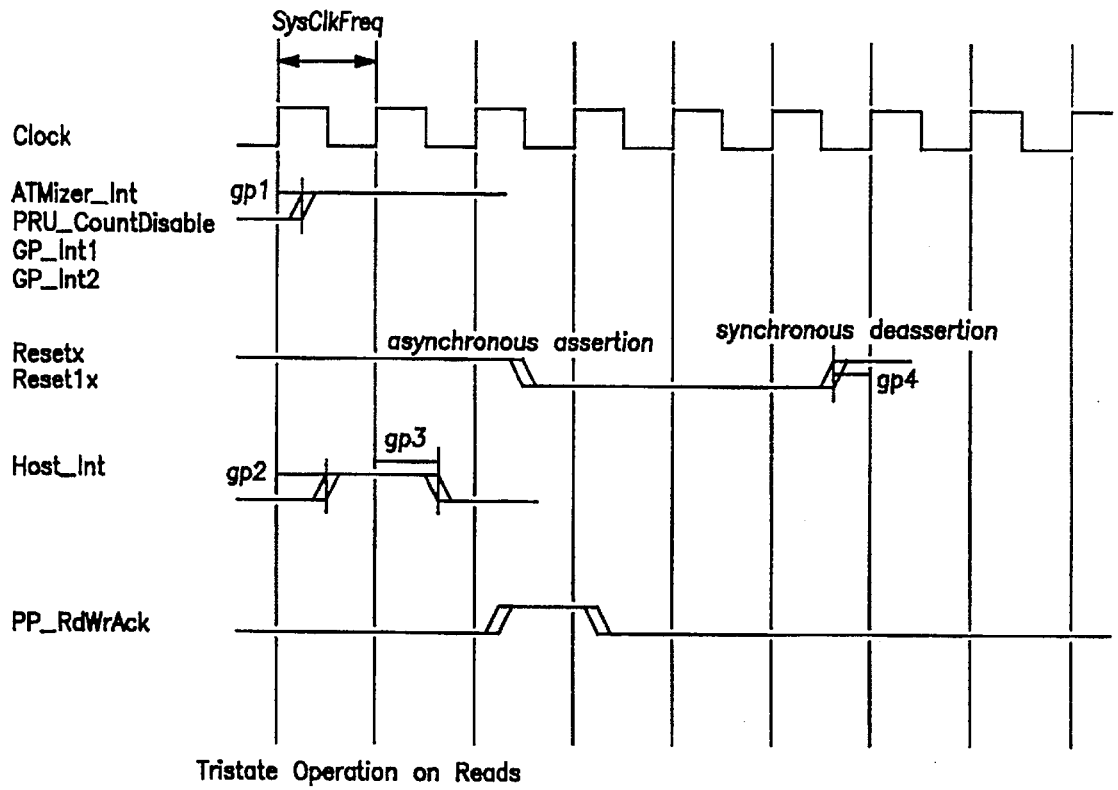

Tristate Operation on Reads

The DMA Engine will turn off its DMA_Data(31:0) drivers during memory read operations. The Drivers begin to shut off automatically (Pt a) following the rising edge of the clock that sources DMA_Rqst. At this point the state of DMA_DataOEx is a don't care. The DMA_Data(31:0) drivers will turn back on in the cycle <u>following</u> the cycle during which DMA_Rqst is driven low. External circuitry can keep DMA_Data(31:0) from driving the bus by deasserting DMA_OEx.

PtA — The ATMizer drives DMA_Data and DMA_DataP.

PtB — In response to the execution of a DMA Read operation, the ATMizer stops driving the DMA_Data bus.

PtC — External circuit begins to drive DMA_Data(31:0); although with unknown data to start.

PtD — The DMA Read operation complete, external logic stops driving DMA_Data(31:0). If DMA_DataOEx is asserted, the ATMizer will begin driving the data bus as shown at PtE.

Fig.18

System Control Register

| 31 30 | 29    24 | 23        | 22        | 21 | 20 | 19    16       | 15              0 |
|-------|----------|-----------|-----------|----|----|----------------|-------------------|
| Rsrvd | Cell Size | CTR 67 | CTR 45 | DH | CR | Buffer Size | Reserved |

Fig.19

| CPU Address Bits | | | | | | | | | | | | | | | | | |
|---|---|---|---|---|---|---|---|---|---|---|---|---|---|---|---|---|---|
| 19 16 | 15 | 14 | 13 | 12 | 11 | 10 | 9 | 8 | 7 | 6 | 5 | 4 | 3 | 2 | 1 | 0 | |
| VCR | | | | | | | | | | | | | | | | | |
| 00XX | x | x | x | x | x | x | x | x | x | x | x | x | x | x | x | x | VCR RD/WR |
| DMAC | | | | | | | | | | | | | | | | | |
| 010X | x | x | x | L | L | L | L | L | L | L | L | L | L | L | L | L | DMAC Init Regs WR |
| 011X | x | x | x | x | x | x | x | x | x | x | x | x | x | x | x | x | DMAC CRC32 Partial Reg RD/WR |
| PRU | | | | | | | | | | | | | | | | | |
| 10XX | 0 | 0 | 0 | 1 | x | x | x | x | x | x | x | x | x | 0 | 0 | 0 | 24 bit Cntr 0 (PRPRs 5/4) RD |
| 10XX | 0 | 0 | 0 | 1 | x | 1 | x | x | x | x | x | x | x | 0 | 1 | 0 | 24 bit Cntr 1 (PRPRs 7/6) RD |
| 10XX | 0 | 0 | 0 | 1 | 0 | x | x | x | x | x | x | x | x | R | R | 0 | PRPC Stall register WR |
| 10XX | 0 | 0 | 0 | 1 | 0 | x | x | x | x | x | x | R | R | R | B | 0 | PRPC Count Init Regs(7:0) WR |
| 10XX | 0 | 0 | 1 | 0 | x | x | x | x | x | x | x | x | B | B | B | 0 | Credit Register RD/WR |
| PCI | | | | | | | | | | | | | | | | | |
| 11X0 | 0 | 0 | 0 | 0 | 1 | 1 | C | C | C | C | x | x | x | x | 0 | 0 | Cell Address FIFO WR |
| 11X0 | 0 | 0 | 0 | 1 | 0 | 0 | 0 | x | x | x | x | x | x | x | 0 | 0 | IDLE Cell Address Holder WR |
| 11X0 | 0 | 0 | 1 | 0 | 0 | 0 | x | x | x | x | x | x | x | x | 0 | 0 | Receive Cell Indication Clr WR |
| 11X0 | 0 | 1 | 0 | 0 | 0 | x | x | x | x | x | x | x | x | x | 0 | 0 | CRC10 Error Reg RD |
| PPORT | | | | | | | | | | | | | | | | | |
| 11X1 | 0 | 1 | 0 | 0 | 0 | 0 | x | x | x | x | x | A | A | A | x | x | Parallel Port RD/WR |
| 11X1 | 0 | 0 | 1 | 0 | 0 | 0 | x | x | x | x | x | x | x | x | x | x | Assert Host Interrupt RD/WR |
| 11X1 | 0 | 0 | 0 | 1 | 0 | 0 | 0 | x | x | x | x | x | x | x | 0 | 0 | Write System Register RD/WR |

Fig.20

PCI Transmitter and Receiver Interface Signal Timing

| | |
|---|---|
| Tx1 | PCL_TxData(7:0) hold time after PCL_TxClk |
| Tx2 | PCL_TxData(7:0) valid from PCL_TxClk |
| Tx3 | PCL_TxAck setup to PCL_TxClk |
| Tx4 | PCL_TxAck hold after PCL_TxClk |
| Tx5 | PCL_BOC, PCL_IDLECell valid from PCL_TxClk * |
| Tx6 | PCL_TxSync hold after PCL_TxClk |
| Tx7 | PCL_TxSync setup to PCL_TxClk |
| Tx8 | PCL_TxDrdy valid from PCL_TxClk * |
| Rc1 | PCL_RcData(7:0) hold after PCL_RcClk |
| Rc2 | PCL_RcData(7:0) setup to PCL_RcClk |
| Rc3 | PCL_RcAck hold after PCL_RcClk |
| Rc4 | PCL_RcAck setup to PCL_RcClk |
| Rc5 | PCL_RcSync hold after PCL_RcClk |
| Rc6 | PCL_RcSync setup to PCL_RcClk |

Parallel Port Interface Signal Timing

| | |
|---|---|
| PP1 | PP_Rqst, PP_RdWrx valid from Clk |
| PP2 | PP_RcData(7:0) hold after PP_DataOEx high |
| PP3 | PP_Address(3:0) valid from Clk |
| PP4 | PP_Data(7:0) valid from Clk |
| | PP_AdrOEx low to PP_Address(3:0) Low Z |
| | PP_DataOEx low to PP_Data(3:0) Low Z |
| PP5 | PP_AdrOEx low to PP_Address(3:0) valid |
| | PP_DataOEx low to PP_Data(3:0) valid |
| PP6 | PP_Address(3:0) hold after PP_AdrOEx high |
| | PP_Data(7:0) hold after PP_DataOEx high |
| PP7 | PP_AdrOEx high to PP_Address(3:0) High Z |
| | PP_DataOEx high to PP_Data(7:0) High Z |
| PP8 | PP_RdWrAck hold after Clk |
| PP9 | PP_RdWrAck setup to Clk |
| PP10 | PP_Data(7:0) setup to Clk |
| PP11 | PP_Data(7:0) hold after Clk |

DMA Interface Timing

| | |
|---|---|
| DMA1 | DMA_Rqst valid from Clk * |
| DMA2 | DMA_Address(31:2) hold after Clk |
| DMA3 | DMA_Address(31:2) valid from Clk |
| DMA4 | DMA_BMask(0:2), DMA_XferLgth(3:0) hold after Clk |
| DMA5 | DMA_BMask(0:2), DMA_XferLgth(3:0) valid from Clk |
| DMA6 | DMA_Data(31:0) hold after Clk |
| DMA7 | DMA_Data(31:0) valid from Clk |
| DMA8 | DMA_RdWrAck hold after Clk |
| DMA9 | DMA_RdWrAck setup to Clk |
| DMA10 | DMA_OpEnding valid from Clk * |
| DMA11 | DMA_AdrOEx low to DMA_Address(31:2) Low Z |
| DMA12 | DMA_AdrOEx low to DMA_Address(31:2) valid |
| DMA13 | DMA_Address(31:2) hold after DMA_AdrOEx high |
| DMA14 | DMA_AdrOEx high to DMA_Address(31:2) High Z |
| DMA15 | DMA_DataOEx low to DMA_Data(31:0) Low Z |
| DMA16 | DMA_DataOEx low to DMA_Data(31:0) valid |
| DMA17 | DMA_Data(31:0) hold after DMA_DataOEx high |
| DMA18 | DMA_DataOEx high to DMA_Data(31:0) High Z |
| DMA19 | DMA_Data hold after Clk (DMA_PLData asserted) |
| DMA19A | DMA_Data hold after Clk (DMA_PLData not asserted) |
| DMA20 | DMA_Data setup to Clk (DMA_PLData asserted) |
| DMA20A | DMA_Data setup to Clk (DMA_PLData not asserted) |

General Purpose Signal Timing

| | |
|---|---|
| GP1 | ATMizer_Int, PRU_CountDisable, GP_Int1, GP_Int2 setup to Clk |
| GP2 | ATMizer_Int, PRU_CountDisable, GP_Int1, GP_Int2 hold after Clk |
| GP3 | Host_Int valid from Clk |
| GP4 | Resetx, reset1x deassertion to rising edge of Clk setup |

Fig. 28a

PCI SYNCHRONIZATION

PCI SYNCHRONIZATION

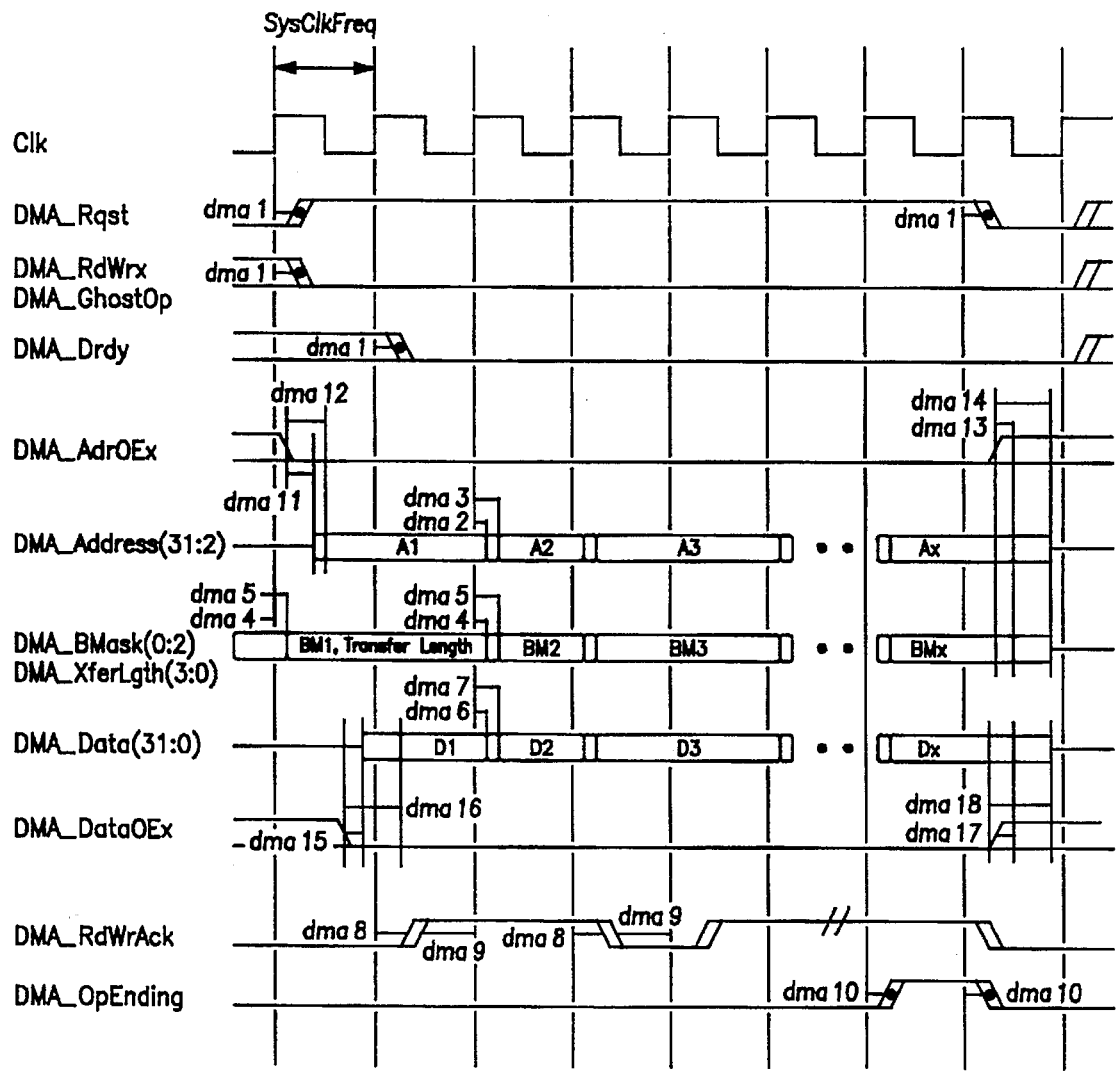

Notes:

DMA_Address(31:2) is valid during the same cycle as DMA_Rqst is asserted. This diagram shows DMA_AdrOEx as the critical path. For systems that have DMA_AdrOEx asserted previously, Clk to DMA_Address(31:2) valid will be the critical address path.

This diagram shows the earliest DMA_Data(31:0) can be sourced by the ATMizer. In certain situations (if the memory byte offset is greater than the local byte offset) the byte alignment logic will add an extra stage of latency to the data path. When this happens DMA_Data(31:0) will appear one cycle later and DMA_Drdy will also appear one cycle later.

DMA WRITE

Fig.28d

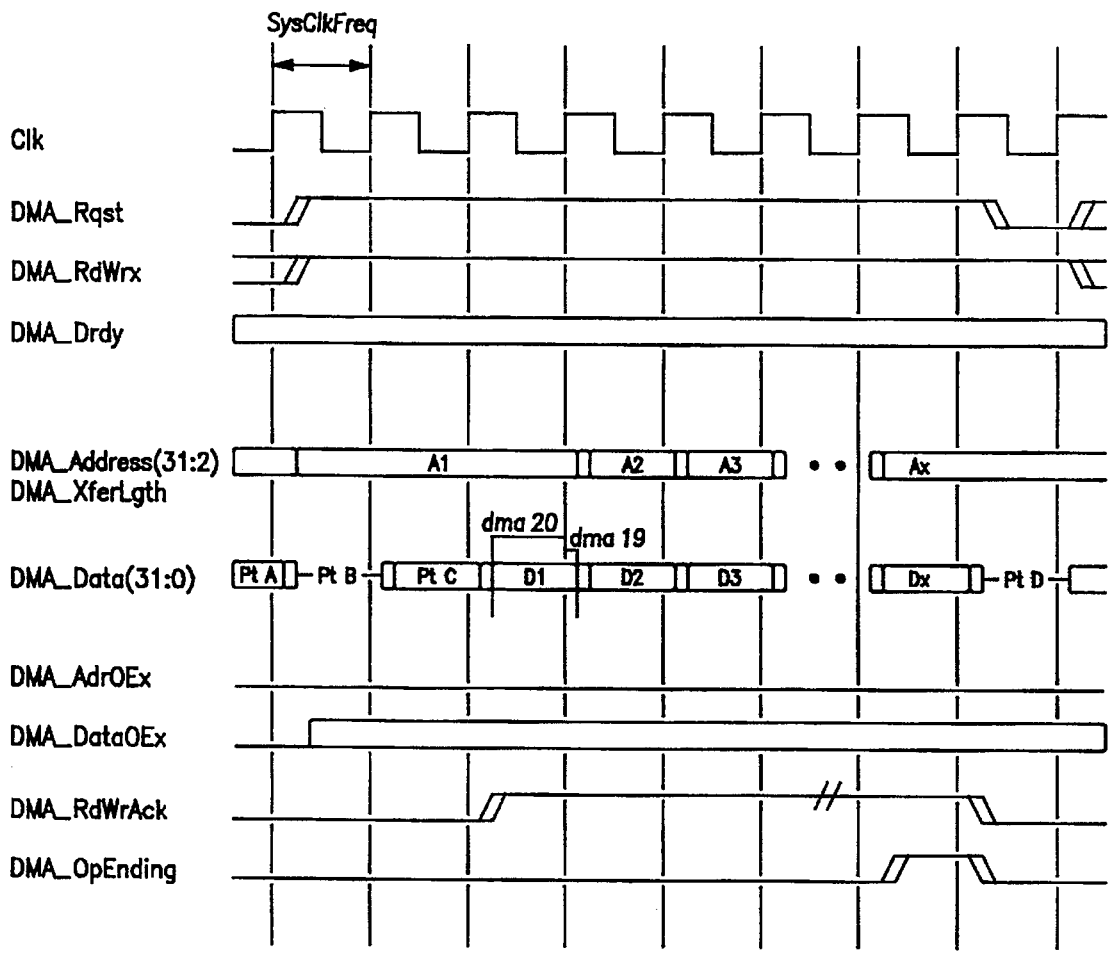

Tristate Operation on Reads

The DMA Engine will turn off its DMA_Data(31:0) drivers during memory read operations. The Drivers begin to shut off automatically (Pt a) following the rising edge of the clock that sources DMA_Rqst. At this point the state of DMA_DataOEx is a don't care. The DMA_Data(31:0) drivers will turn back on in the cycle <u>following</u> the cycle during which DMA_Rqst is driven low. External circuitry can keep DMA_Data(31:0) from driving the bus by deasserting DMA_OEx.

PtA — The ATMizer drives DMA_Data and DMA_DataP.

PtB — In response to the execution of a DMA Read operation, the ATMizer stops driving the DMA_Data bus.

PtC — External circuit begins to drive DMA_Data(31:0); although with unknown data to start.

PtD — The DMA Read operation complete, external logic stops driving DMA_Data(31:0). If DMA_DataOEx is asserted, the ATMizer will begin driving the data bus as shown at PtE.

DMA READ

Fig.28e

Note:

PP_Address(3:0) and PP_Data(7:0) are both valid in the same cycle that PP_Rqst is asserted.

PARALLEL PORT WRITE

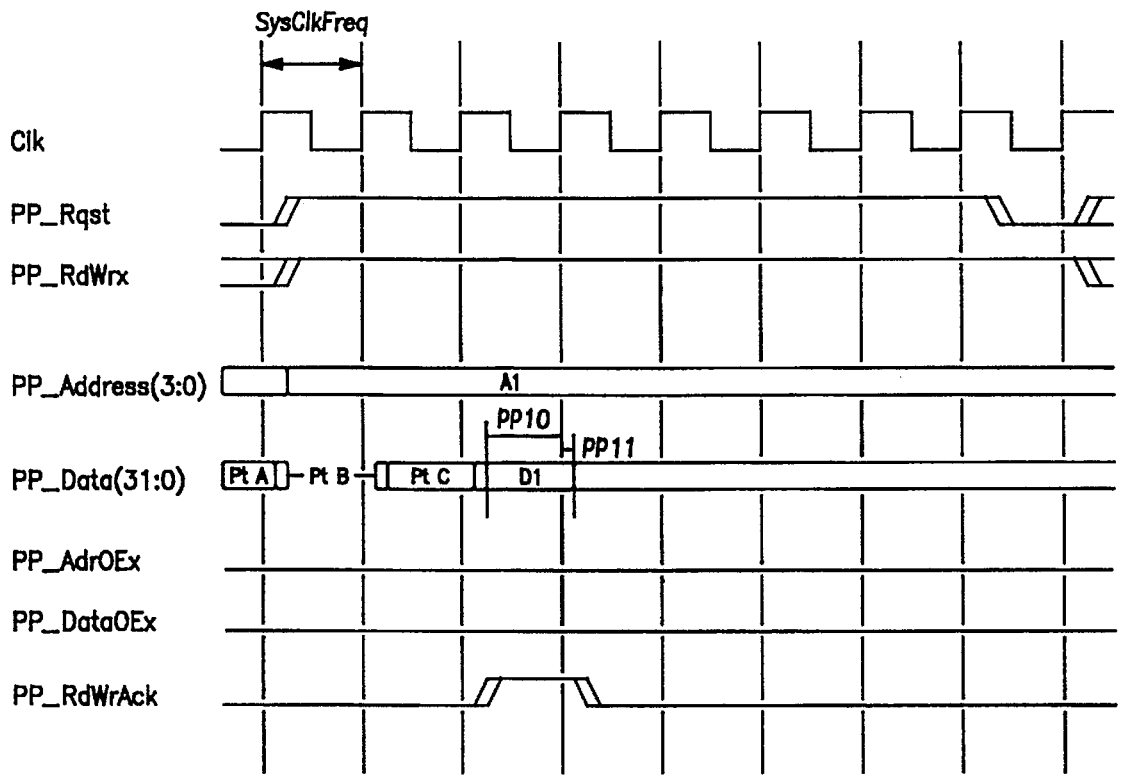

Tristate Operation on Reads

The Parallel Port will turn off the PP_Data(7:0) drivers during parallel port read operations. The drivers begin to shut off automatically one cycle before PP_Rqst is asserted. In the case of a Read following a Write, a one cycle delay will be added before the parallel port asserts PP_Rqst to give the parallel port a chance to disable its drivers.

PtA — The ATMizer drives DMA_Data and DMA_DataP.

PtB — In response to the execution of a DMA Read operation, the ATMizer stops driving the DMA_Data bus.

PtC — External circuit begins to drive DMA_Data(31:0); although with unknown data to start.

PtD — The DMA Read operation complete, external logic stops driving DMA_Data(31:0). If DMA_DataOEx is asserted, the ATMizer will begin driving the data bus as shown at PtE.

PARALLEL PORT READ

Fig.28g

SINGLE CHIP NETWORK ROUTER

This application is a continuation of application Ser. No. 08/139,999, filed Oct. 20, 1993 now abandoned.

BACKGROUND OF THE INVENTION

1. Field of the Invention

The present invention generally relates to the art of multiplex communications including bridges between bus systems, and more specifically to a single chip network router for such a system.

2. Description of the Related Art

A system to which the present invention generally relates is disclosed in U.S. Pat. No. 5,229,994, entitled "BRIDGE FOR CONNECTING AN IEEE 802.3 LOCAL AREA NETWORK TO AN ASYNCHRONOUS TIME-DIVISION MULTIPLEX TELECOMMUNICATION NETWORK", issued Jul. 20, 1993 to J. Balzano et al.

Electronic data networks are becoming increasing widespread for the communication of divergent types of data including computer coded text and graphics, voice and video. Such networks enable the interconnection of large numbers of computer workstations, telephone and television systems, video teleconferencing systems and other facilities over common data links or carriers.

Computer workstations are typically interconnected by local area networks (LAN) such as Ethernet, Token Ring, DECNet and RS-232, whereas metropolitan, national and international systems are interconnected by wide area networks (WAN) such as T1, V3.5 and FDDI.

LANs and WANs themselves can be interconnected by devices known as hubs, bridges and routers in an unlimited configuration. Although the distinction between these interconnection devices is becoming increasingly arbitrary, they are officially classified in accordance with the layer in the Open Systems Interconnection (OSI) model in which they operate.

Hubs interconnect devices using the Physical Layer, bridges utilize the Data Link layer whereas routers operate using the Network layer. Hubs and bridges generally act merely as switches or funnels, whereas routers perform higher level functions including selecting optimal routes through the network for transmission of data packets or cells on an individual basis, and performing network management tasks such as forcing diagnostics operations and controlling other routers or nodes. Whereas hubs and bridges generally operate on data which is formatted in a single protocol such as those listed above (uniprotocol), routers can typically identify and process data which can be in any one of several protocols (multiprotocol).

Interconnect devices, especially the more sophisticated routers, have typically been large, bulky and expensive units which operate at relatively low speed. As such, they limit the data throughput speed in the network in which they are installed. The reasons why routers have been so slow is that they are generally multichip units which transfer data being processed to and from Content Addressable Memory (CAM) chips which are separate from the processor, input/output (I/O) and other functional chips of the unit.

These transfer operations each require multiple system clock cycles which fundamentally limit the transfer speed. In addition, multiple latencies are present in the various paths by which data moves through the unit. The degree by which such latencies can be reduced, as well as the degree by which the size and cost of a multichip system can be reduced, are also fundamentally limited.

Ethernet is a network protocol embodying IEEE standard 802.3, which is more generically referred to as Carrier Sense with Multiple Access and Carrier Detect (CSMA/CD). Ethernet cores used in hubs and other devices comprise transmit backoff units which execute a truncated exponential backoff algorithm in response to a sensed collision condition (two or more nodes attempting to transmit data simultaneously). This algorithm utilizes a pseudo random number generator to generate a random number which designates a backoff time, or a time for which the transmit engine of the core should wait before attempting transmission.

If all of the cores in the network utilize the same type of pseudo random number generator, they will generate the same sequence of random numbers. If the random number generators of two or more cores become synchronized with each other, they will cause the associated cores to back off by the same times. This will cause the cores to continuously attempt to transmit at the same times. This condition is called "lockup", and can result in the cores generating collisions indefinitely, preventing any data from being transmitted over the network.

Asynchronous Transfer Mode (ATM) is a network protocol which is highly advantageous in that it enables high speed transmission of divergent types of data, including codes, video and voice. This is accomplished by breaking down the data to be transmitted into cells including 48 bit Conversion Sublayer Payload Data Unit (CS-PDUs) which contain the actual data, and a header and trailer. ATM can also be utilized as a universal protocol, replacing the protocols which are currently in use and are specific to LANs or WANs.

The header contains a virtual channel identifier and a virtual path identifier which identify the particular cell and its intended destination, and specify an optimal path through the network through which the cell should be routed to reach its destination. The header can also include numerous other information such as the type of data in the CS-PDU and attributes of the data, the sender and/or the destination.

The physical limitations discussed above regarding routers in general also applies to ATM routers, adapters and termination devices which interconnect an ATM network to a network node using a different protocol (or to a host such as a computer workstation). A major problem which is inhibiting the widespread deployment of ATM is that no single ATM protocol has been developed. A diverse assortment of ATM protocols have been developed by various manufacturers throughout the industry, some of which are so different as to be incompatible with each other. At least, the difference between protocols prevents the various higher level capabilities of the individual protocols from being universally utilized.

Congestion is a problem in all networks. This occurs when a large number of users feed data into the network at the same time. ATM cells need not be contiguous, so that computer coded data from one user can be interspersed with, for example, voice data from another user in a time divisioned manner. However, if too many users attempt to inject too much data into the network simultaneously, the bandwidth of the network can be exceeded resulting in substantial delays in data transmission, transmission errors and lost data.

Congestion is controlled by sensing the traffic in the network at the various nodes, sending special information packets between nodes to notify the other nodes of the magnitude and type of congestion, and delaying transmission of data at specified nodes in accordance with a predetermined congestion control algorithm.

ATM networks are relatively new, and the nature and patterns which congestion can take are not well understood. This makes it difficult to formulate and implement an effective congestion control algorithm. Similar to the variety of ATM protocols which are currently in use, a number of divergent congestion control algorithms have been devised and placed into service.

ATM routers, termination devices and other network elements are hardwired with the particular manufacturer's protocol and congestion control algorithm. Although it is likely that a universal ATM standard will be developed in the near future the multiprotocol problem will be eliminated, ATM systems will have to accommodate newly developed congestion control algorithms for an extended period of time until the nature of congestion can be well understood and handled. In the meantime, any changes to existing ATM systems require hard retooling, which is extremely time consuming and expensive.

SUMMARY OF THE INVENTION

An asynchronous transfer mode (ATM) processing system interconnection or termination unit embodying the present invention is implemented on a single integrated circuit chip. The unit includes a Virtual Channel Memory (VCR) for storing ATM cells for segmentation and reassembly, a Direct Memory Access (DMA) controller for interconnecting the VCR to a host unit, and a Parallel Cell Interface (PCI) for interconnecting the VCR to an ATM network.

A Reduced Instruction Set Computer (RISC) microprocessor controls the DMA controller as well as segmentation and reassembly of Conversion Sublayer Payload Data Unit (CD-PDU)s and transfer between the memory, the host and the ATM network and other operations of the device using single clock cycle instructions. The operating program for the RISC microprocessor is stored in a volatile Instruction Random Access Memory (IRAM) in the form of firmware which is downloaded at initialization. The program can be user designed to accommodate changes in ATM network protocols and congestion handling routines.

A Pacing Rate Unit (PRU) includes a global pacing rate register which automatically reduces the maximum transmission rate of ATM cells in response to a sensed congestion condition in the ATM network.

The ATM termination unit is being manufactured on a commercial basis as the ATMizer™ by LSI Logic Corporation of Miltipas, Calif. The ATMizer's uniqueness and the power of its architecture are derived from the inclusion of a 32 bit MIPS RISC CPU on chip.

The ATMizer is implemented on a single chip, thereby eliminating the off-chip memory access delays and latencies involved in conventional network interconnect devices. Such integration enables the ATMizer to operate at substantially higher speeds than conventional devices. The ATMizer chip can be easily plugged into a socket in highly divergent types of network and host devices, thereby providing a highly desirable and cost-efficient replacement for conventional large, expensive and inflexible network interconnects.

It will be further appreciated that the scope of the invention includes embodying the present ATM interconnect device as a hub, bridge, uniprotocol or multiprotocol router, or in any other configuration regarding ATM termination, switching or routing. The single chip ATMizer concept also includes incorporating the ATMizer per se on a single chip which can include other elements, such as a host processor. The concept also includes any single chip device which integrates an ATM device embodying the present invention thereon.

It can be expected that ATM standards and/or congestion control algorithms will become universalized at some time in the future. When this occurs, some or all of the functions of the ATMizer's RISC microprocessor and/or volatile firmware memory can be replaced with hardwired or otherwise fixed options. It will be understood the scope of the invention includes reconfiguring the computing and control functions of the ATMizer with a microcontroller, non-volatile memory, hard wired circuitry, or any combination thereof.

While the basic function of the ATMizer is to provide for the segmentation and reassembly (and ATM cell generation) of ATM Adaptation Layer 1 data streams and ATM Adaptation Layers 2, 3/4 and 5 CS-PDUs, its on-chip processor allows user firmware to accomplish these tasks in such a controlled fashion such that segmentation and reassembly are just two of the many functions that the ATMizer can perform.

The features of the present ATMizer include fulfilling the following objects.

SCATTER-GATHER DMA

CS-PDUs under segmentation need not be contiguous in system memory when using the ATMizer. The Segmentation and Reassembly routines, written by the system designer and executed by the ATMizer, can perform segmentation on non-contiguous data structures that logically form a single CS-PDU. This is what is commonly referred to as the "gather" function of a scatter-gather DMA controller.

These user supplied routines handle AAL and ATM header generation and extraction as well as link list pointer management and buffer allocation. The implications of "scatter" and "gather" support, made possible by the inclusion of a 32 bit CPU (referred to throughout the specification as the APU or ATM Processing Unit) are significant and described in the detailed description portion of the specification.

APPLICATION ACCELERATION THROUGH HEADER STRIPPING AND DATA ALIGNMENT

In specialty applications, the ATMizer can be saddled with the responsibility of stripping higher layer headers from incoming CS-PDUs and placing them in specific memory locations to aid network software. In addition, the ATMizer can utilize the powerful byte alignment capabilities of its DMA engine to insure that the user data payload portion of the higher layer PDU (Transport Layer) is written into memory on a word aligned basis. This releases application layer software from the responsibility of insuring proper data alignment.

CELL SWITCHING

The ATMizer enables a system to either terminate all VCs or terminate some but switch others, simultaneously. On a per VC basis the APU can make a determination as to whether it should reassemble the SAR User-Payload into a CS-PDU or simply pass the entire cell, headers and trailers intact, to some other memory mapped ATM port or ATM switch interface.

The ATMizer can even switch cells between its Receiver and Transmitter without touching system memory. This structure can be put to use in ring, dual and triple port switching fabrics, and other topologies. In cell switching situations, the VCI, the VPI both or neither can be selectively translated.

Multicast expansion can be selectively performed. The APU can make these decisions in real time and perform the operations. Furthermore, in switching applications, the ATMizer can support a "user cell size" of up to 64 bytes. This allows the user to pre-pend up to 12 bytes of switch-specific information to each cell.

CONGESTION CONTROL

The manner in which congestion will develop in ATM based networks, what it look like, and how an end station should react to congestion are questions that cannot be answered because no one has seen enough ATM networks in operation to gain a real life understanding of ATM network congestion. As the industry moves ahead with ATM so rapidly, the ATMizer, with its user programmable CPU positioned directly at the ATM line interface, is capable of executing or facilitating almost any congestion control algorithm imaginable.

Because its user generated firmware is downloaded at system reset, systems in the field can be updated with new congestion control algorithms as more is learned about congestion in real ATM networks.

The ATMizer offers fast congestion response time. Cells arriving at the ATMizer's ATM port side with notification of network congestion can affect the transmission of the very next cell, either inhibiting it altogether, slowing down the rate of transmission of assigned cells or forcing CLP reductions. With a user supplied algorithm, the ATMizer provides the hardware pacing logic, aggregate traffic shaping capability, and the processor to execute the algorithm.

AAL1 REAL-TIME DATA STREAMS

The APU in the ATMizer can implement data transfers with real-time data stream buffers (DS1, voice, video, etc.), and transfer data from the data stream to main memory. Residual Time Stamps are now required as part of the AAL1 SAR Header. The AAL1 segmentation routine running on the APU can access RTS values from any memory mapped device or location and carefully interleave the RTS value into the headers of the AAL1 cell stream. When a new RTS value is needed, the APU retrieves it. When sequence numbers and sequence number protection are called for, the APU generates and inserts the appropriated information into the SAR header, and on reassembly, the APU will verify sequence number integrity and sequentially and pass RTS values to the appropriate devices.

DIAGNOSTIC OPERATION

The ATMizer can actively participate in diagnostic operations utilizing diagnostic firmware downloaded at system reset. In diagnostic mode, the ATMizer can perform functions including forcing HEC, CRC10 and CRC32 errors, gather line statistics, and more. Under normal operating conditions, the APU can be chartered with the additional task of statistics gathering to aid in the network management process. All of these operations are made possible by the inclusion of the APU.

An adaptive error detection and correction apparatus for an Asynchronous Transfer Mode (ATM) network device such as the ATMizer comprises a sensing unit for sensing a congestion condition in the ATM network and a global pacing rate unit for adaptively reducing a maximum allowable transmission ratio of ATM cells containing information to idle ATM cells in response to a sensed congestion condition.

A processor stores a number corresponding to a relatively high maximum allowable transmission ratio in the global pacing rate register in the absence of a sensed congestion condition, and stores a number corresponding to a relatively low maximum allowable transmission ratio in the global pacing rate register in response to a sensed congestion condition.

A controller adjusts the maximum allowable transmission ratio in accordance with the number stored in the global pacing rate register. A plurality of peak pacing rate counters reset to predetermined values upon decrementation to zero, the predetermined values corresponding to service intervals for segmentation of Conversion Sublayer Payload Data Unit (CD-PDU)s. The processor further comprises means for assigning the counters to selected CD-PDUs, and sensing the counters to determine whether or not segmentation of said selected CD-PDUs is within the respective service intervals. The apparatus further comprises a channel group credit register having bits corresponding to the respective counters.

A random number generating apparatus for an interface unit of a Carrier Sense with Multiple Access and Collision Detect (CSMA/CD) Ethernet data network comprises a transmit backoff unit for implementing a backoff algorithm in response to a network collision signal and a random number. The apparatus comprises a dual mode random number generator and a multiplexer for switching the random number generator between modes in accordance with the serial address bits of a data packet being processed by the interface unit.

The random number generator includes a 25 stage linear feedback shift register. The multiplexer has two signal inputs connected to outputs of the 18th and 22nd stages of the shift register respectively, a switch input connected to receive the serial address bits and an output connected in circuit to an input of the shift register.

A single chip router for a multiplex communication network comprises a packet memory for storing data packets, a Reduced Instruction Set Computer (RISC) processor for converting the packets between a Local Area Network (LAN) protocol and a Wide Area Network (WAN) protocol, a LAN interface and a WAN interface. A Direct Memory Access (DMA) controller transfers packets transferring packets between the packet memory and the LAN and WAN interfaces.

A packet attribute memory stores attributes of the data packets, and an attribute processor performs a non-linear hashing algorithm on an address of a packet being processed for accessing a corresponding attribute of said packet in the packet attribute memory. An address window filter identifies the address of a packet being processed by examining only a predetermined portion of said address, and can comprise a dynamic window filter or a static window filter.

A single chip hub for an electronic communication network comprises a packet memory for storing data packets, a Reduced Instruction Set Computer (RISC) processor for processing the packets, and a plurality of media access interfaces. A Direct Memory Access (DMA) controller transfers packets transferring packets between the packet memory and the interfaces. The hub further comprises an attribute processor and a window filter which correspond to those of the router.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 3 is a diagram illustrating the ATM layers which can be addressed by the ATMizer;

FIG. 9 is a diagram illustrating a global pacing rate control function of the ATMizer;

FIG. 10 is a diagram further illustrating the Pacing Rate Unit;

FIG. 12 is a diagram illustrating a "store word" function;

FIG. 13 is a diagram illustrating a second "store word" function;

FIG. 18 is a general signal timing diagram of the ATMizer;

FIG. 19 is a diagram illustrating how a System Control Register is programmed using a Store Word instruction;

FIG. 20 is a memory map of the ATMizer;

FIG. 28a is a diagram listing the interfacing timing signals of the ATMizer;

FIG. 28d is a timing diagram illustrating a DMA write operation;

FIG. 28e is a timing diagram illustrating a DMA read operation;

FIG. 28g is a timing diagram illustrating a Parallel Port read operation;

DETAILED DESCRIPTION OF THE INVENTION

Figure 1:
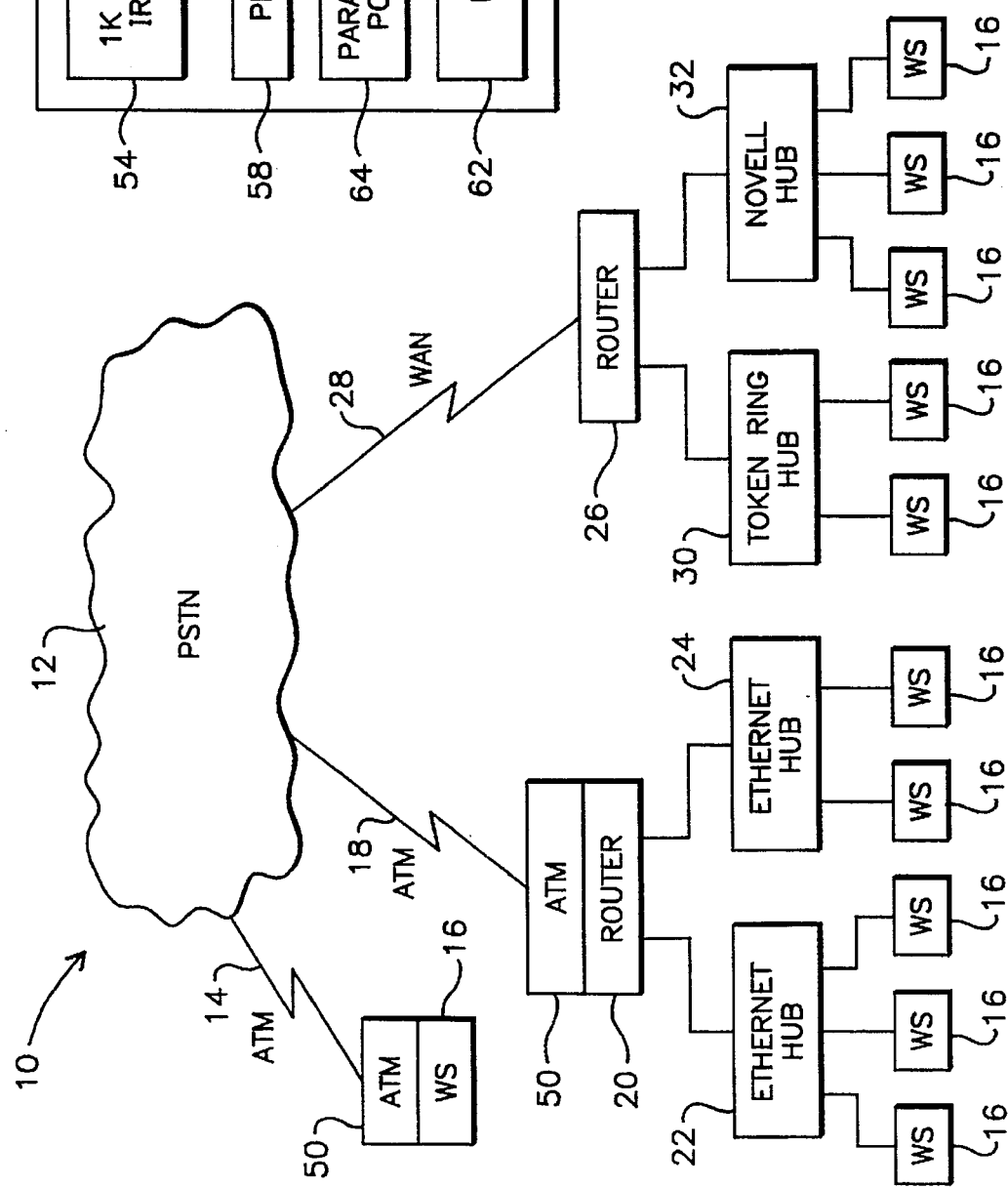
FIG. 1 is a block diagram of a hypothetical electronic data network incorporating elements of the present invention.

FIG. 1 illustrates a hypothetical data communications network 10 to which the present invention relates. The network 10 comprises a public service telephone network (PSTN) 12 which is generally represented as a cloud and interconnects users nationally and internationally using a combination of land lines and satellite links.

Although not illustrated in detail, the PSTN 12 comprises a number of multiprotocol routers which are capable of interconnecting network nodes using a variety of Wide Area Network (WAN) protocols, including T1, V.35 and FDDI. Asynchronous Transfer Mode (ATM) is a universal protocol which can be used for both WANs and Local Area Networks (LAN).

As illustrated in the exemplary network, the PSTN 12 is connected through an ATM link 14 to an end user such as a computer workstation 16 through an ATM termination device 50. The PSTN 12 is also connected through an ATM link 18 and a device 50 to a router 18, which in turn is connected to Ethernet hubs 22 and 24 through an Ethernet LAN network. The hubs 22 and 24 are connected to workstations 16 through the Ethernet LAN.

Although the workstations are collectively designated as 18, they need not be similar, but can individually be constituted by diverse types of electronic communication devices such as telephone switching stations, commercial data collections terminals such as automatic bank teller machines, video and/or voice communication devices.

Further illustrated in the exemplary network 10 is a multiprotocol router 26 which is connected to the PSTN 12 through a wide area network link 28. The router 26 is connected to a Token Ring LAN hub 30 and a Novell LAN hub 32 through respective LAN interfaces. The hubs 30 and 32 are connected to workstations 32.

The device 50 is being commercially manufactured as the ATMizer™, and has been designed to control almost all aspects of ATM line operation from segmentation and reassembly of CS-PDUs and real-time data streams, to cell switching. Scatter-gather DMA, ATM layer operations, congestion control, statistics gathering, messaging, error monitoring, and diagnostic troubleshooting of the ATM port are all under APU control.

In addition to Segmentation and Reassembly, the single chip ATMizer 50 allows active and intelligent control of all aspects of ATM station operation. The provision of high speed processing capabilities at the port interface allows for the implementation of systems that can deliver a level of operational control that can not be cost effectively delivered in a discrete implementation.

The ATMizer 50 will now be described in detail.

INDEX 1.0 ATMizer Features
1.1 General Features
1.2 ATM Adaptation Layer Features
1.3 ATM Layer Features
1.4 ATM Port Physical Interface Features
1.5 Diagnostic Support Features
2.0 Operations Performed by the ATMizer
3.0 The ATMizer—Functional Blocks
3.1 The ATMizer Processing Unit (APU)
3.2 1024×32 Instruction RAM (IRAM)
3.3 The Virtual Channel RAM (VCR)
3.3.1 Using the VCR for Cell Storage
3.3.2 Using the VCR for Storing Channel Parameter Entries
3.3.3 Channel Groups. Combining active VCs into Logical Groupings for Segmentation Pacing Synergy
3.3.4 Cell Multiplexing—Cell Demultiplexing. Number of Channels Supported by the ATMizer
3.4 The Pacing Rate Unit
3.4.1 Cell Rate Pacing (CS-PDU Segmentation Rates)
3.4.2 Global Pacing Rate
3.4.3 Channel Priority
3.5 The DMA Controller
3.5.1 DMAC Control Registers and Counters
3.5.2 Programming the DMAC
3.5.3 Using the DMA Controller to implement Cell Switching, Segmentation and Reassembly
3.5.4 CRC32 Generation Considerations
3.5.5 Misaligned Operations Revisited
3.5.6 Using the DMA Controller to Implement Scatter and Gather Operations
3.5.7 How to Determine when a DMA Operation has Completed
3.6 The Parallel Cell Interface
3.6.1 The Parallel Cell Interface Transmitter
3.6.1.1 Transmit Cell Sources
3.6.1.2 Queuing a Cell for Transmission
3.6.1.3 Cell Rate Decoupling
3.6.1.4 Preparing the Transmitter to Transmit
3.6.2 The Parallel Cell Interface Receiver
3.6.2.1 Received Cell Handling Options
3.6.2.2 Received Cell Indication. How the APU recognizes that Cells are awaiting processing in the VCR
3.6.3 HEC Generation and Checking
3.6.4 External Buffering of Received Cells
3.6.5 Frequency Decoupling
3.7 The Parallel Port
4.0 The System Control Register
5.0 The ATMizer Memory Map
6.0 The ATMizer's Interrupt Structure and CpCond Hookups
7.0 Programming the ATMizer
8.0 ATMizer <-> Host Messaging
9.0 The ATMizer in Operation
9.1 Data Types Supported
9.2 The Cell Generation Process—An Overview
9.2.1 AAL1 Real-Time Data Streams
9.2.2 AAL 3/4 and 5 CS-PDU Segmentation
9.3 The CS-PDU Reassembly Process
10.0 Congestion Notification and Handling
11.0 ATMizer Signals
11.1 ATMizer Pin Diagram
11.2 ATMizer Signal List
12.0 ATMizer Interface Timing

ATMizer DETAILED DESCRIPTION 1.0 ATMizer Features
1.1 General Features

Supports ATM data rates of up to 155.54 megabits per second (mbps).

Supports simultaneous Segmentation and Reassembly of certain VCs and cell switching of others.

User programmable on-chip 32 bit MIPS RISC CPU (ATM Central Processing Unit—APU) controls all aspects of the ATM cell generation and switching processes.

Handles contiguous and non-contiguous CS-PDUs (scatter-gather DMA operations).

APU controls scatter-gather DMA algorithms, AAL Header and Trailer Generation, ATM Header generation and manipulation, ATMizer—Host messaging, error handling, congestion control, statistics gathering, diagnostic operation and more.

Supports ATM Adaptation Layers 1, 2, 3/4 and 5, simultaneously.

Generates and appends 4 byte CRC32 field on AAL5 CS-PDU segmentation.

Generates and checks 4 byte CRC32 field on AAL5 CS-PDU reassembly.

Implements Peak Rate Pacing, Maximum Burst Length and Global Pacing for aggregate traffic shaping.

Supports up to 65,536 VCs—actual numbers are implementation specific.

On-chip elastic byte buffer and received cell buffers (2, 4, 8 or 16 cells deep) eliminate the need for buffering at the ATM port. All metastability issues are handled by the ATMizer 50.

On-chip caching of channel parameters, buffer lists and messages in 4 kilobyte Virtual Channel RAM, coupled with received cell buffers allows for the development of "memory-less" network interface cards that operate at desktop speeds (<=45 mbps). All CS-PDUs under segmentation and reassembly reside in system memory.

Operates out of system memory in low cost NIC applications, a single unified DRAM system in high speed applications supporting a limited number of VCs (256) or from a combination of high speed SRAM and DRAM in high speed applications requiring the support of a large number of VCs (greater than 256).

Robust ATM port interface with frequency decoupling logic and metastability logic inside of the ATMizer 50.

Powerful 32 bit DMA addressing capabilities and 32 or 64 bit DMA Data interfacing capabilities.

General purpose eight bit Parallel Port Interface with addressing of up to 16 external devices.

Extensive diagnostic support including HEC, CRC10 and CRC32 error forcing.

1.2 ATM Adaptation Layer Features

Controlled AAL1 Cell Generation from real-time data streams including SAR Header generation and Residual Time Stamp Insertion.

Controlled Segmentation and Reassembly of AAL 2, 3/4 and 5 CS-PDUs.

Scatter-gather capabilities on Reassembly and Segmentation. CS-PDUs need not be contiguous in system memory. Allows for efficient use of memory space, higher throughput (no moves necessary to form contiguous CS-PDUs) and low latency attributable to devices such as routers. User firmware implements the scatter-gather algorithm.

Higher layer header extraction and data alignment capabilities for application acceleration.

CRC10 generation and checking for AAL 2 and 3/4 SAR PDUs.

CRC32 generation and checking for AAL 5 CS-PDUs.

Supports simultaneous Segmentation and Reassembly of AAL 2, 3/4 and 5 CS-PDUs, AAL 1 cell generation from real-time data streams and cell switching between the ATMizer 50's ATM Receiver port and ATM Transmitter port or any memory mapped device (terminate some VCs, switch others. Implement rings, dual attach stations, switching fabrics, etc.).

1.3 ATM Layer Features

Controlled ATM Header generation and manipulation.

Cell Multiplexing/Cell Demultiplexing from up to 65,536 VCs/VPs.

On-chip caching of channel parameters in Virtual Channel Ram allows for low cost network interface cards to be implemented without any dedicated memory on the card. Use the PC's/Workstation's main memory system for CS-PDU storage during S&R.

Support for VCI/VPI translation and cell switching.

Supports a user defined cell size up to 64 bytes to allow for the pre-pending of a switch specific header.

Support for multicast expansion.

On-chip Peak Rate Pacing Counters (up to 8 Peak Rates), Maximum Burst Length control.

Global Pacing Rate Register allows the APU to set the percentage of IDLE cells to be sent over the ATM port. Provides for aggregate traffic shaping and is a quick way of reducing data speeds upon congestion notification. Gradually return to full speed operation under APU control.

Advanced congestion control capabilities. User firmware specified congestion control algorithms provide for immediate reaction to congestion notification. Fast response (within one cell time) results in fewer cells sent into a congested network, minimizing cell loss and CS-PDU retransmissions resulting in higher overall throughput. Congestion control routines are part of user firmware and can be modified as more is learned about congestion in actual ATM networks.

Cell Loss Priority marking and manipulation (w/AAL 5 High-Medium-Low Priority CS-PDU support).

Automatic Cell Rate Decoupling through IDLE cell insertion.

1.4 ATM Port Physical Interface Features

Eight bit parallel transmit data output bus; PCI_-TxData (7:0).

Eight bit parallel receive data input bus; PCI_Rc-Data (7:0).

Separate transmitter and receiver sync inputs.

Eight byte deep elastic buffers in transmitter and receiver allow for direct connection of data output and input buses to transceivers. No external buffering required.

Elastic buffers driven by transceiver generated/recovered byte clocks (PCI_TxClk, PCI_RcClk). Supports any byte frequency < or =25 MHz. Clocks can be "Gapped".

All buffering and metastability issues dealt with inside the ATMizer 50.

Separate transmitter and receiver "data transfer acknowledgment" input signals (PCI_TxAck, PCI_RcAck) provide for Gappable operation with free running transmitter and receiver clocks.

Allows connection to Transmission Convergence Sublayer framing logic that requires "gaps" in the assigned cell stream for the insertion/extraction of framing overhead.

On-chip received cell buffers (user selectable 2, 4, 8 or 16 cells deep) adds second layer of buffering between ATM port and main memory. Buffering allows ATMizer 50 to absorb periods of high latency to main memory or long exception handling routines without losing received cells. Especially important in "memory-less" network add-in cards for PCs and Workstations where the computer's main memory is the ATMizer 50's working memory space.

HEC GENERATION AND CHECKING

Cell delineation using "slip and sync on HEC error" protocol.

"Transmit Data Ready" (PCI_TxDrdy), "Beginning of Cell" (PCI_BOC), "IDLE Cell" (PCI_IDLE) and "HEC Error" (PCI_HECError) outputs to aid the Transmission Convergence Sublayer framing logic.

1.5 Diagnostic Support Features

Unlimited user firmware controlled statistics gathering capabilities. Keep track of any statistics the application or network management architecture requires.

CRC10 and CRC32 error statistics gathering.

Force HEC, CRC10 and CRC32 errors for diagnostic purposes.

ATMizer 50s are fully lock-steppable for use in fault tolerant systems.

On board APU provides for network management and troubleshooting of ATM system.

Download special diagnostic firmware to APU to aid system level diagnostics when troubleshooting system or line failures.

2.0 Operations Performed by the ATMizer 50

The ATMizer 50 is a single chip ATM network controller from LSI Logic that, in general terms, fits into the Segmentation and Reassembly category of ATM control chips. In reality, the ATMizer 50 provides far more power and flexibility than one would expect from a Segmentation and Reassembly device.

The power of the ATMizer 50 comes from the inclusion within the chip of a 32 bit, user programmable, RISC CPU based on the MIPS R3000 architecture. It is user firmware downloaded to the on-chip CPU during system reset that controls most of the operational aspects of the ATMizer 50.

The ATMizer 50, as shipped, does not solve a particular ATM station design problem. It is a group of carefully chosen hardware functional blocks that can be woven together by user firmware in such a fashion that the ATMizer 50 becomes tuned to solve a set of problems particular to the user's system implementation.

Segmentation and reassembly are likely to be two of the major problems solved by the ATMizer 50, but additional issues can be handled as well including cell switching, VCI/VPI translation, statistics gathering, messaging and diagnostic operation. In addition, the way that the user's system manages CS-PDU lists (i.e. lists of CS-PDUs in need of segmentation), memory buffers (in scatter-gather implementations), Host-ATMizer messaging and other structures can vary from system to system depending on the firmware architecture implemented by the user.

In general terms, the ATMizer 50 has been designed to address the ATM layers enclosed in the box illustrated in FIG. 3.

3.0 The ATMizer 50—Functional Blocks

Figure 2:
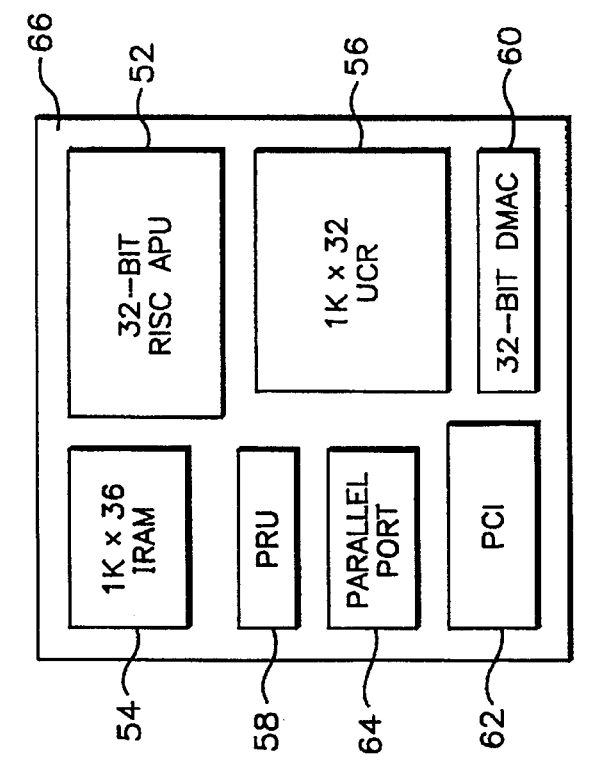
FIG. 2 is a diagram illustrating the organization of the main functional units of an asynchronous transfer mode (ATM) termination unit or ATMizer™ embodying the present invention.

The ATMizer 50 is fabricated as a single integrated circuit chip on a substrate 66 as illustrated in FIG. 2. As stated previously, the objective in designing the ATMizer 50 was to provide ATM system designers with a Segmentation and Reassembly chip that can, through user firmware control, be used to implement ATM end stations and switching stations in a number of very divergent fashions. As such the ATMizer 50 is a device that provides a number of critical hardware functions that are "brought to life" by the firmware that a user downloads to the ATMizer 50's APU at system reset time.

The responsibilities attributed to the ATMizer 50 in a system are a function of this firmware. Therefore, it is important for the system designer to understand the functional blocks of the ATMizer 50 prior to undertaking any system architectural activities.

Figure 4:
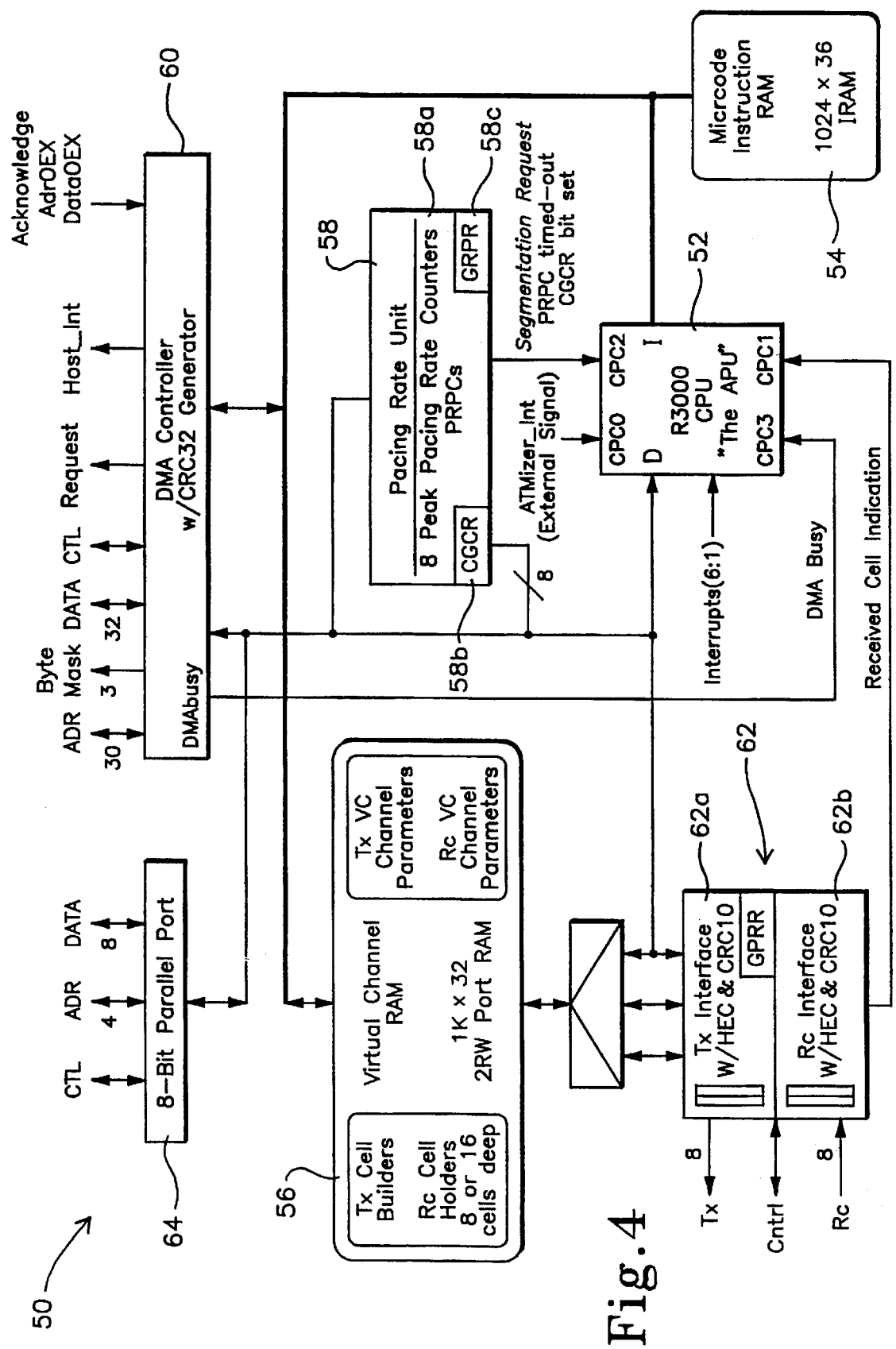
FIG. 4 is a block diagram of the ATMizer.

The ATMizer 50 consists of the following seven functional blocks as illustrated in FIG. 4.

1. ATMizer Processing Unit (APU) 52. The "brain" of the ATMizer 50 is the on board 32 bit MIPS RISC based CPU that controls all aspects of ATMizer 50 operation. This specification refers to the on-board CPU as the APU 52. The APU 52 must process every incoming cell and generate every outgoing cell. It is the APU 52 that provides the level of operational control that is necessary to support such functions as interleaved circuit termination (S&R) and cell switching of multiple ATM Adaptation Layer type cells, scatter-gather memory management operations, intelligent congestion control algorithms, traffic statistics gathering and robust ATMizer <-> Host messaging.

2. Instruction RAM (IRAM) 54. The APU 52 runs the user supplied firmware routine from an on-board 1024×32 single cycle SRAM which constitutes the IRAM 54. The SRAM is loaded at system reset and the code then remains static in the SRAM throughout system operation. However, if system failures occur, the diagnostic operating system may chose to download a diagnostic control routine to the IRAM 54 so that the APU 52 can actively participate in the troubleshooting process.

3. Virtual Circuit RAM (VCR) 56. The VCR 56 is the most configurable aspect of the ATMizer 50. While the VCR 56 is simply a 1024×32 two Read/Write port SRAM, the software partitioning of this SRAM will vary dramatically from user to user and application to application. Tradeoffs in VCR configuration will impact issues such as the number of channels supported and the size, structure and speed of the external main memory system.

All cells received from the ATM port side are written into the VCR 56 to await either reassembly or switching operations initiated by the APU 52. AAL 1, 2, 3/4 and 5 cells are "built" in the VCR 56 by a combination of DMA operations and APU operations before being passed to the ATM transmitter.

The VCR 56 may also be used to store Channel Parameter Entries, available buffer lists and other data structures required for system operation. In some applications, all Channel Parameters Entries will be stored in the VCR 56 while in other applications Channel Parameter Entries will be stored in main memory (combination systems are also likely).

4. Pacing Rate Unit (PRU) 58. The PRU 58 contains eight Peak Rate Pacing Counters (PRPC) 58a that are used to control the rate of CS-PDU segmentation. Whenever one or more PRPCs 58a times out, the PRU 58 asserts the APU's CpCond2 input allowing the APU 52 to poll for this time out condition. If the APU 52 finds CpCond2 set, it branches to the Segmentation routine.

The PRU 58 also contains the Channel Group Credit Register (CGCR) 58b, an eight bit, APU readable/writable register containing one bit for each PRPC 58a. A PRPC 58a that has timed out but has not yet been serviced by the APU 52 has its bit set in the CGCR 58b. Firmware running on the APU 52 can implement channel priority by selectively servicing Channel Groups that have timed-out. Four of the eight 12 bit PRPCs 58a can be configured into two general purpose 24 bit timer/counters for general purpose usage. These timer/counters provide a robust set of features including APU interrupt on time-out capabilities.

The PRU 58 further includes a Global Rate Pacing Register (GRPR) 58c which will be described in detail below.

5. DMA Controller (DMAC) 60. The DMA controller 60 is a slave resource (as seen by the APU 52) utilized by the APU 52 to accomplish data transfers between the on-chip VCR 56 and memory mapped devices. While the APU 52 is the "brains" behind DMA operations, the DMA controller 60 is the "muscle" behind such operations. Because the APU 52 initializes the DMA controller 60 at the beginning of each operation, the DMA controller 60 effectively supports an unlimited number of channels.

The DMA Controller 60 is extremely powerful, supporting every combination of local and memory byte alignments on transfers. This powerful support of aligned and mis-aligned operations gives the ATMizer 50 an ability to participate in robust Scat-ter-Gather operations. The DMA controller 60 is also responsible for generating CRC32 results for AAL 5 SAR CS-PDUs. The DMA Controller 60 operates in 32 bit address and 32 bit data transfer mode.

6. Parallel Cell Interface (PCI) 62. The PCI 62 is the ATMizer 50's interface to the ATM port side circuitry, and includes a PCI Transmitter 62a and a PCI Receiver 62b. The PCI 62 is 8 bits wide in both the transmit and receive directions and connects directly to the actual Transmission Convergence Sublayer framing circuitry. In the receive direction, the PCI 62 is responsible for reconstructing ATM cells in the VCR 56 from data received from the external framing logic. In the transmit direction, the PCI 62 is responsible for transferring cells from the VCR 56 to the external framing logic.

The PCI 62 also contains data buffers and frequency decoupling logic to allow for a direct connection between the ATMizer 50's ATM ports and the ATM line transceivers. All metastability issues are addressed and solved by the ATMizer 50.

7. Parallel Port 64. The Parallel Port 64 is an eight bit port that can be accessed by the APU 52 directly through Load and Store commands. The Parallel Port 64 may be used to pass information between the ATMizer 50 and the system controller, between two or more ATMizers or as part of the ATMizer <-> Host messaging system. The Parallel Port 64 can also be used to access external devices while the DMA controller 60 is busy and to pass information to an external device about an active DMA operation.

3.0 ATMizer FUNCTIONAL BLOCKS 3.1 ATMizer Processing Unit (APU) 52

The APU 52 is a 32 bit RISC CPU based on the MIPS R3000 architecture. It is the inclusion of this powerful, user programmable CPU that gives the ATMizer 50 its unique capabilities. APU firmware is responsible for a range of functions from cell building (SAR Header and Trailer generation, ATM Header retrieval from the Channel Parameter Entry for the VC, ATM Header manipulation and insertion, and DMA operation initialization for SAR SDU retrieval) to ATMizer <-> Host messaging and channel servicing sequencing.

The system designer is responsible for writing the firmware that will be executed by the APU 52. Firmware is downloaded to the ATMizer 50 at system reset and controls almost all operational functions of the ATMizer 50 including the following functions:

SAR PDU GENERATION, ATM CELL GENERATION

The APU 52 is responsible for generating SAR Headers (AAL 1, 2 and 3/4) and Trailers (AAL 2 and 3/4) during segmentation and reassembly (the CRC10 field is automatically generated and inserted by the PCI 62). SAR Header generation includes sequence number generation and checking as well as message type insertion and extraction (BOM, COM, EOM, SSM).

The APU 52 is also responsible for initiating the appropriate DMA operations to accomplish SAR SDU retrieval from memory based real time data buffers (AAL 1) or CS-PDUs. The APU 52 is also responsible for ATM Header retrieval and manipulation, including PTI and CLP field modification. For cells that are to be switched, the APU 52 is responsible for making the initial switching decision based on information contained in the Channel Parameter Entry for the VC as well as for accomplishing VCI/VPI translation if such an operation is specified in the Channel Parameter Entry.

DMA OPERATION INITIALIZATION

To initiate a DMA operation the APU 52 sets the main memory start address (byte offset), the local address and local byte offset, the number of bytes to be transferred and the transfer direction (Rd vs. Wr) in the DMA Engine. Once these parameters have been written into the DMA engine, the DMA controller operates autonomously to accomplish the entire transfer.

The APU 52 initiates DMA operations to retrieve SAR SDUs during segmentation operations, to restore SAR SDUs to their respective CS-PDUs during reassembly operation, to switch entire cells, headers and trailers intact, to other memory mapped ATM ports during switching operations, to retrieve and restore Channel Parameter Entries in applications utilizing off chip SRAM to support an extended number of VCs or to retrieve a Channel Parameter Entry to be appended to the end of a VCR based Channel Group in applications supporting on-chip caching of Channel Parameter Entries in the VCR 56, and to transfer SAR SDUs to and from real time data stream buffers in applications supporting AAL1 circuit interfaces (such as T1 lines).

PACING RATE UNIT CONFIGURATION

The APU 52 has write access to the eight Peak Rate Pacing Counters 58a and their initialization registers (not shown). The APU 52 sets the initial count values by writing a 12 bit value into one of the eight Peak Rate Pacing Registers. The APU 52 can also read the Channel Group Credit Register 58b to determine which PRPCs 58a have expired.

The Pacing Rate Unit 58 informs the APU 52 that a PRPC 58a has timed-out by asserting the APU 52's CpCond2 input. The APU 52 polls this condition by periodically executing the "Branch on CpCond2 True" instruction. If the APU 52 evaluates this condition as True it branches to the Segmentation routine and begins segmenting the CS-PDUs specified in the individual Channel Parameter Entries for the Channel Group whose PRPC 58a has timed-out (forcing the assertion of CpCond2).

The APU 52 will generate a number of cells per CS-PDU/ Channel Parameter Entry, as indicated in the Channel Parameter Entry, prior to proceeding to the next Channel Parameter Entry in the Channel Group. The APU 52 implements channel priority by being selective (and creative) in the order in which it handles segmentation when multiple PRPCs have timed out simultaneously and are awaiting service.

In between cell generation procedures the APU 52 will check for received cells, and must interleave the generation of cells with the reception (termination or switching) of cells as well as with any ATMizer <-> Host messaging actions that may be required.

PARALLEL CELL INTERFACE CELL QUEUING AND CELL PROCESSING

The APU 52 is responsible for queuing cells for transmission by writing the VCR 56 start address of a cell into the Cell Address FIFO in the PCI Transmitter 62a. If no cell address is present in the FIFO when an end of cell boundary is reached, the Transmitter 62a will automatically send an IDLE cell.

For received cells, the APU 52 is responsible for deciding between cell switching and circuit termination on a per VC basis. The APU 52 accomplishes internal cell switching (cell switching between its Receiver and Transmitter) by passing the VCR 56 addresses of a received cell targeted for internal switching to the Cell Address FIFO in the Transmitter. A cell targeted for external switching (switching over DMA_Data (31:0)) has its VCR 56 addresses passed to the DMA Controller 60.

The APU 52 also is responsible for setting the Global Pacing Rate Register 58c in order to shape the assigned cell content of the outgoing cell stream. For cells that are to be terminated (i.e. reassembled into CS-PDUs) the APU 52 retrieves the Channel Parameter Entry for the VC over which the cell arrived to obtain information required to reassemble the SAR SDU into its corresponding CS-PDU.

This information includes the memory address of the tail end of the CS-PDU under reconstruction. The APU 52 then initiates a DMA operation to transfer the SAR SDU from the VCR 56 to memory by passing the DMAC the local (VCR 56) address of the SAR SDU, the memory address of the CS-PDU and the number of bytes of SAR SDU to be transferred. The DMA Controller 60 then executes the transfer, leaving the APU 52 free to do other things.

MEMORY ALLOCATION

During the reassembly process the APU 52 is responsible for memory buffer management. If memory is to be allocated to incoming CS-PDUs in "fragments", the ATMizer 50's APU 52 is responsible for tracking fragment boundaries, issuing additional fragments to CS-PDUs as needed, generating link lists of the fragments allocated to a given CS-PDU and ATMizer <-> Host messaging to inform the host of CS-PDU complete situations, error and congestion problems.

In the transmit direction, the APU 52 is responsible for recognizing and dealing with the difference between end-of-fragment boundaries and end-of-CS-PDU boundaries.

ATMizer <-> HOST MESSAGING

The ATMizer 50 does not enforce a particular messaging system between the on-chip APU 52 and the host system. The user implements his own messaging system by polling the ATMizer 50_Int input (connected directly to CpCond0 and tested with the "Branch on CpCond0 True" instruction) for an indication that the host wishes to communicate with the ATMizer 50 and by setting the ATMizer 50's Host_Int output to indicate to the host that the ATMizer 50 wishes to or has already passed a message to the host system.

The APU 52 can also read and/or write any DMA memory mapped or Parallel Port memory mapped location as part of a messaging mailbox system. GP_Int1 or GP_Int2 could also be used in addition to or in place of ATMizer 50_Int as part of the messaging system.

CONGESTION CONTROL

As stated previously, the ATMizer 50 is capable of executing or facilitating almost any congestion control algorithm. The APU 52 looks at the appropriate ATM Header field/s of each incoming cell for notification of congestion. If congestion notification is found to exist, the APU 52 can take immediate action. Such actions may include one or more of the following:

1. Notify the Host that congestion has been seen utilizing the ATMizer <-> Host messaging scheme developed by the user.

2. Lower one or more Peak Rate Pacing Counter initialization values.

3. Reduce the overall assigned cell throughput rate by setting a "lesser" value in the Global Pacing Rate Register.

4. Set the CLP fields of outgoing cells to 0 in lieu of lowering the overall information rate.

3.2 1024×32 Instruction RAM (IRAM 54)

The 1024×32 Instruction RAM 54 contains the 4096 bytes of user written "firmware" that power the APU 52. The IRAM 54 code is downloaded during system reset (Resetx asserted) through a series of memory write operations executed by the host processor with the ATMizer 50 serving as the target device. The ATMizer 50 acts as a slave device for the purpose of this download process.

The host accomplishes the data transfer to the ATMizer 50 by issuing 1024 (or less) write operations to 1024 (or less) consecutive memory addresses. These memory address have common MSBs that result in external logic selecting the ATMizer 50 as the targeted resource of the write operations.

As a result of each write operation, external logic asserts the ATMizer 50's DMA_RdWrAck input. The ATMizer 50 responds to the assertion of DMA_RdWrAck while Resetx is low by writing the data sourced by the host on DMA_Data(31:0) into the on-board IRAM54 on the rising edge of clock. The ATMizer 50 generates the IRAM 54 index (i.e. the IRAM 54 write address) internally, starting at location zero and incrementing the address by one word each time DMA_RdWrAck is asserted.

Therefore, it is imperative that the IRAM 54 code be written consecutively until the entire firmware routine has been written into the IRAM 54. Once the entire user firmware routine has been written into the on-chip IRAM 54, the system can release the ATMizer 50's Resetx input and the APU 52 will begin firmware execution at the R3000 reset vector. DMA_DataOEx and DMA_AdrOEx should be deasserted during slave write operations.

The ATMizer 50 will generate consecutive DMA memory addresses to IRAM 54 code downloading, beginning at memory address zero and incrementing by one word each time DMA_RdWrAck is asserted. If external logic wishes to use the address sourcing capability of the DMA to boot from a ROM or some other device, it should assert DMA_AdrOEx during the ATMizer 50 initialization processor. If external logic relies on programmed I/O to configure the IRAM 54, DMA_AdrOEx should most likely be deasserted to insure that the ATMizer 50 does not drive the DMA_Address(31:2) bus.

3.3 Virtual Channel RAM (VCR 56)

The Virtual Channel RAM 56 is a 1024 word×32 dual ported RAM that provides the ATMizer 50 with many of its unique capabilities. The VCR 56 should be thought of as the central resource within the ATMizer 50. Almost all ATMizer 50 operations revolve around the transfer of data to and from the VCR 56. The VCR 56 can be read and written by the DMA controller 60, the Parallel Cell Interface 62 and the APU 52.

All incoming cells (cells arriving over the Receiver in the Parallel Cell Interface) are written into the VCR 56 prior to processing (the APU 52 will decide how to process a cell. It can chose to terminate a cell (reassemble it into a CS-PDU or a data buffer) or to switch a cell (internally or externally). All outgoing cells are either constructed in the VCR 56 (segmentation) or transferred to the VCR 56 (external switching) prior to transmission. In addition, Channel Parameter Entries, memory buffer lists, messages and other parameters can all be stored within the VCR 56.

It is this ability to store such parameters inside the ATMizer 50 that allows the ATMizer 50 to be used in a variety of cost sensitive applications such as memory-less network interface cards supporting a limited number of simultaneously active VCs.

Figure 5A:
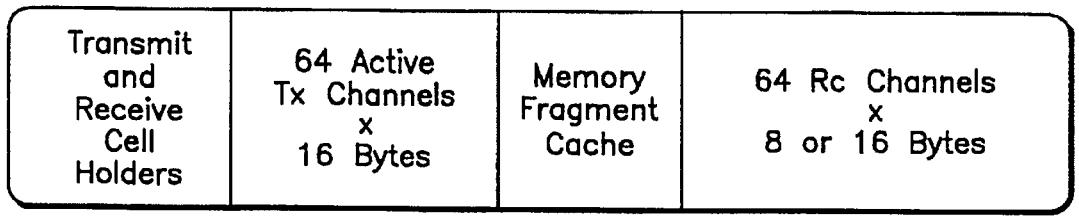
FIGS. 5a and 5b are diagrams illustrating application examples of the ATMizer.
Figure 5B:
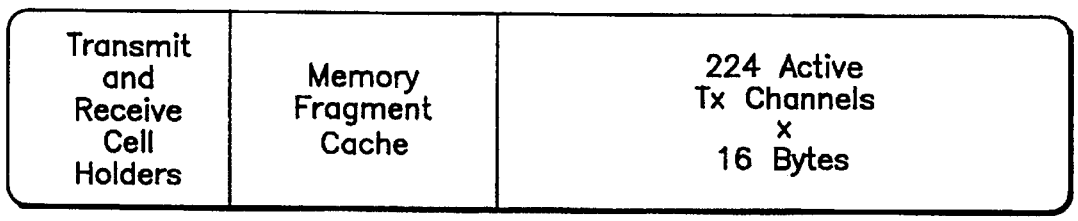

Two sample VCR 56 constructions are illustrated in FIGS. 5a and 5b. In the first example, of FIG. 5a, a Network Interface Card (NIC) for a PC or Workstation supporting a limited number of open channels, all Channel Parameter Entries for both transmit and receive channels are stored in the VCR 56 eliminating the need for off chip local memory. In the second example of FIG. 5b, a router supports an unlimited number of open channels but places a restriction on the number of VCs that can have CS-PDUs under active segmentation at any one time.

In the sample system we have limited to 256 the number of transmit channels that can be "active" simultaneously and we cache all Channel Parameter Entries for these active channels in the VCR 56.

A 155 mbps ATM pipe evenly split amongst 256 channels yields approximately 605 kilobytes/sec per channel. In this scenario we have not limited the number of open transmit channels, only the number of channels that can have CS-PDUs undergoing segmentation simultaneously.

Once one CS-PDU has been completely segmented the APU 52 can swap out its Channel Parameter Entry for the next in line. Channel Parameter Entries for channels that are active in the receive direction are stored off-chip in local memory. This allows the router to support an unlimited number of simultaneously active receive channels.

Without an intelligent memory fragment allocation plan, support for a large number of VCs would swamp most memory systems. Fortunately the ATMizer 50 combines support for external Channel Parameter Entries with a capability to do link list based CS-PDU scattering during reassembly (allocate memory in small "fragments" as needed). The net result is that the sample router is able to support an unlimited number of open transmit and receive channels from a single unified DRAM based memory system with a single restriction on the number of transmit channels that can be actively undergoing segmentation at one time.

In high end applications, it is possible to support an unlimited number of simultaneously active transmit and receive channels by storing all Channel Parameter Entries off chip. This puts certain demands on the speed of local memory that may force the usage of SRAM for Channel Parameter Entry storage.

3.3.1 Using the VCR 56 for Cell Storage

INCOMING CELLS

The Receiver in the ATMizer 50's Parallel Cell Interface reconstructs cells received from the external transmission convergence framing logic in the VCR 56. The PCI 62 allocates 64 bytes of VCR 56 memory to each incoming cell. The actual size of a cell is user selectable (up to 64 bytes) and must be programmed in the System Control Register as part of the APU 52's system initialization routine.

The Receiver reconstructs cells beginning at VCR address 0000. The first 128 bytes (2 cells), 256 bytes (4 cells), 512 bytes (8 cells) or 1024 bytes (16 cells) of the VCR 56 are set aside for Received Cell Holders. Cells are written into the VCR 56 in a modulo 2, 4, 8 or modulo 16 fashion. Therefore, it is important that cells be processed before they are overwritten.

Cell buffering in the VCR 56 helps to decouple the incoming cell stream from memory interface latency and is especially helpful in situations where the APU 52 is temporarily unable to process incoming cells due to execution of an extended routine.

Cells written into the VCR 56 are processed in the order of their arrival by the APU 52 and are either:

1. Switched over the internal Transmitter;
2. Switched over the main memory interface; or
3. Reassembled into memory based real time data stream buffers or CS-PDUs. The decision to switch or terminate a cell is made by the APU 52 after examining the information stored in the Channel Parameter Entry for the VC over which the cell arrived.

OUTGOING CELLS

All cells must be either moved to (external switching) or constructed in (segmentation) the VCR 56 prior to transmission. Software can set aside an area in the VCR 56 to act as the staging area for cell switching and generation (shown in FIG. 3.3 as the Transmit Cell Builder regions). Outgoing cells are transferred from the VCR 56 to the external transmission convergence framing logic by the Transmitter in the PCI 62. The Transmitter works off of VCR 56 memory pointers.

Whenever the APU 52 wishes to have a VCR 56 resident cell transferred to the transmission convergence framing logic, it simply writes a VCR 56 pointer to the cell into the Transmitter's Cell Address FIFO. The transmitter then handles the transfer automatically.

A benefit to this pointer method is that it enforces no restrictions on the internal location of cells slated for transmission accept that they be VCR 56 resident. As a result, the ATMizer 50 can switch Received Cell Holder resident cells out over the Transmitter by simply passing a pointer to the cell to the Cell Address FIFO (internal switching).

To switch a cell from an external device (i.e. to source a pre-existing memory based cell out over the ATMizer 50's PCI Transmitter 62a) the APU 52 must first initiate a DMA operation to bring the cell into the VCR 56 from some temporary memory buffer. Once in the ATMizer 50, the APU 52 passes the VCR 56 pointer for the cell to the Cell Address FIFO in the same fashion as for internal switching.

Segmentation requires ATM and SAR (AAL 1, 2 and 3/4) Headers and Trailers (AAL 2 and 3/4) to be appended to the SAR SDUs by the APU 52. But once a cell is constructed in the VCR 56 the APU 52 again passes a pointer to the cell to the Cell Address FIFO and the Transmitter sends the cell to the transmission convergence framing logic, one byte at a time.

3.3.2 Using the VCR 56 for storing Channel Parameter Entries

Beyond transmit and received cell holding, how the VCR 56 is used will vary dramatically from application to application. For the APU 52 to generate a cell it must know certain information about the virtual circuit over which the cell will pass and information about the CS-PDU from which the cell will be generated. Such information includes:

1. The main memory address of the CS-PDU or real time data buffer from which the SAR SDU will be retrieved.
2. The number of bytes remaining in the CS-PDU or CS-PDU fragment (in scatter-gather applications).
3. In scatter-gather applications, whether or not the current CS-PDU fragment is the last fragment of a multifragment CS-PDU.
4. The base ATM Header that is to be appended to each cell.
5. The ATM Adaptation Layer type that is to be used to segment or reassemble cells originating or terminating on the given VC.
6. The previous SAR Header/Sequence Number (for AAL 1, 2 and AAL 3/4 circuits).
7. The CRC32 partial result for the CS-PDU (for AAL 5 circuits).

Collectively, these parameters provide the APU 52 with all of the information that is needed to process an incoming cell or to segment a CS-PDU into a stream of cells. In this specification we refer to a RAM based data structure that contains all of the pertinent information about a single VC as a Channel Parameter Entry for the VC.

The ATMizer 50 is unique in that it does not enforce any Channel Parameter Entry data structure. User firmware will dictate the actual Channel Parameter Entry data structure, how VCs are grouped together and how the segmentation process will be conducted on a grouping. The system designer creates the Channel Parameter Entry data structure architecture to fit his system and then writes the APU 52 firmware to work within this environment. For example, a system that supports AAL5 CS-PDU segmentation and reassembly will require less information in a Channel Parameter Entry than a system that supports AAL5 CS-PDU segmentation and reassembly and cell switching. Furthermore, a system that supports simultaneous segmentation and reassembly of AAL 1, 2, 3/4 and 5 CS-PDUs will require an even more robust Channel Parameter Entry for each VC.

Example Channel Parameter Entries for the first two systems follow.

A SYSTEM SUPPORTING AAL 5
SEGMENTATION AND REASSEMBLY ONLY

Channel Parameter Entry for CS-PDU/VC
Undergoing Segmentation

1. CS-PDU Current Main Memory Address (2 to 4 bytes, depending on the size of main memory).
2. Base ATM Header to be appended to each cell (4 bytes, APU 52 handles PTI and CLP manipulation).
3. CRC32 Partial Result (4 bytes).
4. DMA Current Byte Count (1–2 bytes, how many bytes left in the CS-PDU or CS-PDU fragment).
5. Control (CS-PDU priority, segmentation burst length, last fragment flag, etc.).

Channel Parameter Entry for CS-PDU/VC
Undergoing Reassembly

1. CS-PDU Current Main Memory Address (2 to 4 bytes, depending on the size of main memory).
2. CRC32 Partial Result (4 bytes).
3. DMA Current Byte Count (1–2 bytes, # of bytes left in current memory buffer).

A SYSTEM SUPPORTING AAL 5
SEGMENTATION AND REASSEMBLY AND
CELL SWITCHING

Channel Parameter Entry for CS-PDU/VC
undergoing segmentation

1. CS-PDU Current Main Memory Address (2 to 4 bytes, depending on the size of main memory).

2. Base ATM Header to be appended to each cell (4 bytes, APU 52 handles PTI and CLP manipulation).

3. CRC32 Partial Result (4 bytes).

4. DMA Current Byte Count (1–2 bytes, how many bytes left in the CS-PDU or CS-PDU fragment).

5. Control (CS-PDU priority, segmentation burst length, last fragment flag, etc.).

Channel Parameter Entry for CS-PDU/VC Undergoing Reassembly

1. CS-PDU Current Main Memory Address (2 to 4 bytes, depending on the size of main memory).

2. CRC32 Partial Result (4 bytes).

3. DMA Current Byte Count (1–2 bytes, # of bytes left in current memory buffer).

4. Control (Switch or Terminate; if switch: VPI/VCI Translation?, Local or Main Memory Switch?).

Channel Parameter Entry for CS-PDU/VC Undergoing Cell Switching

1. New VCI and/or New VPI.

2. Control (Switch or Terminate; if switch: VPI/VCI Translation?, Local or Main Memory Switch?).

It is important to understand that both the concept of Channel Parameter Entries as well as the structure and location of such entries are all user definable structures. The same is true for Channel Groups as described below. A distinction must be made between the hardware features that are provided by the ATMizer 50 and the means of employing those features to get a particular job done that are provided by user firmware.

3.3.3 Channel Groups. Combining active VCs into Logical Groupings for Segmentation Pacing Synergy This specification introduces the concept of a "Channel Group". A Channel Group is simply a group of VCs whose "Channel Parameter Entries" form a contiguous list, either in the VCR 56 (on-chip memory) or in main memory. The VCs that form a Channel Group reach their segmentation service intervals simultaneously (i.e. they are driven by a common Peak Rate Pacing Counter (PRPC 58a)).

Once a Peak Rate Pacing Counter 58a times out, firmware running on the APU 52 will proceed to sequence through the list of VCs/CS-PDUs (i.e. the Channel Group), generating a specified number of cells from each CS-PDU before proceeding on to the next entry in the Channel Group. CS-PDU before proceeding to the next Channel Group entry (and therefore, the next CS-PDU) is controlled by user firmware.

Figure 7:
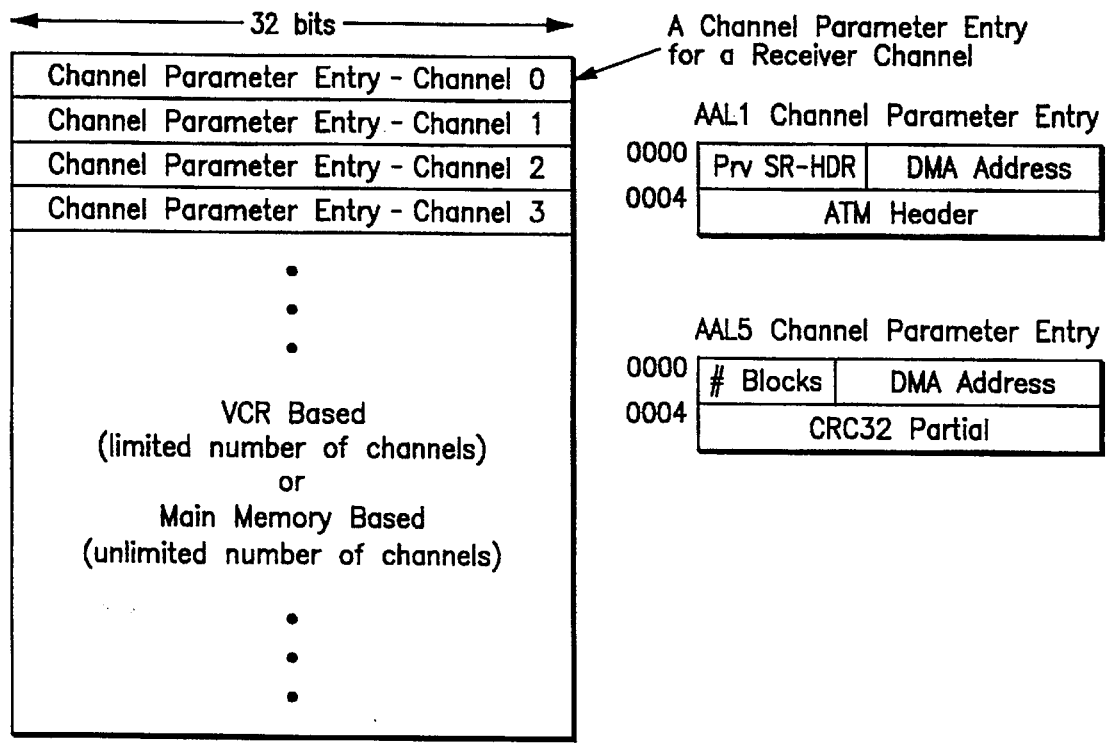
FIG. 7 is a diagram illustrating a sample channel parameter entry structure for receive channels.
Figure 6:
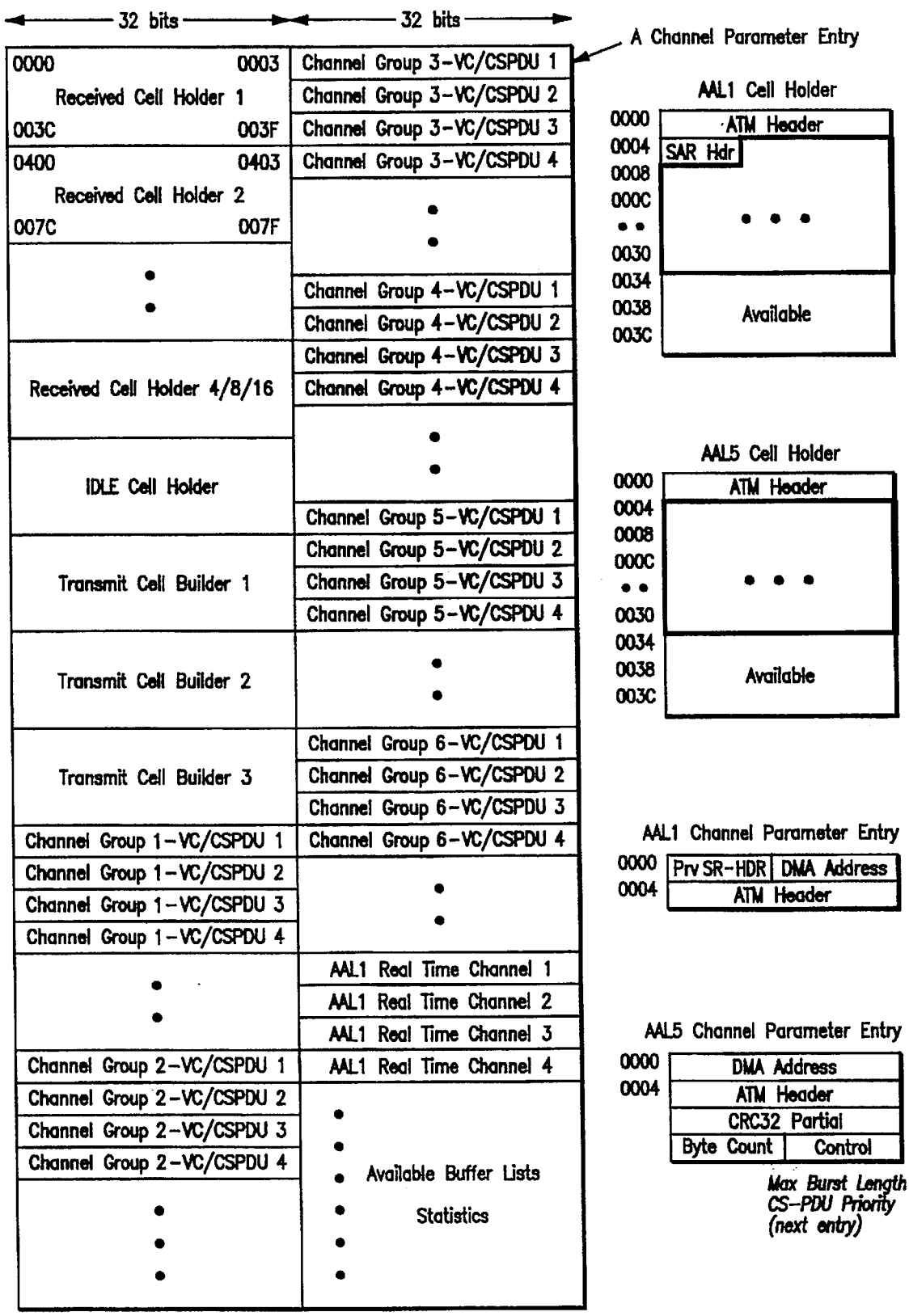
FIG. 6 is a diagram illustrating sample VCR software structures for cell holding and on-chip channel support for segmentation.

FIG. 6 illustrates sample VCR 56 software structures for cell holding and on-chip channel support for segmentation, whereas FIG. 7 illustrates a sample channel parameter entry structure for receive channels. In FIG. 6, the AAL 5 channel parameter entry for a VC within a CS-PDU undergoing reassembly saves RAM space by limiting the address field size and by tracking the number of 48 byte blocks left in the CS-PDU fragment instead of the number of bytes.

In the example system, a Channel Parameter Entry for a VC over which we are segmenting and transmitting a CS-PDU requires 16 bytes of information. These 16 bytes include 4 bytes for storing the memory address (where we left off) of the CS-PDU under segmentation on the VC, 4 bytes for storing the ATM header to be appended to each SAR-PDU (the APU 52 will modify the PTI and CLP fields as necessary), 4 bytes for CRC32 partial storage (if we are using AAL 5 on this VC), 2 bytes for the CS-PDU byte count (or CS-PDU fragment current byte count in scatter-gather applications) and 2 bytes for control information such as burst length (how many cells do we generate before proceeding to the next Channel Group entry), CS-PDU priority (High-Medium-Low) for AAL 5 VCs or the previous SAR header for AAL 1, 2 or 3/4 VCs as well as any other user defined constructs.

This is simply a user defined data-structure and not a structure enforced by the ATMizer 50. The host system manages CS-PDU sequencing over a single VC through either a linked list mechanism (parsing driven by the ATMizer 50) or through an explicit messaging mechanism whereby the host waits for a "CS-PDU Segmentation Complete" message from the ATMizer 50 before "passing" a new CS-PDU to the ATMizer 50 to be segmented and transmitted over a given VC (passing implies passing a new Channel Parameter Entry to the ATMizer 50 with an indication of which Channel Group/PRPC the Channel Parameter Entry should be appended to.

The ATMizer 50 appends the new entry to the specified Channel Group). The Host uses memory mailboxes and Host <-> ATMizer 50 messaging to "pass" a new Channel Parameter Entry to the ATMizer 50. Channel Parameter Entries for channels carrying CS-PDUs undergoing reassembly can be built more compactly than for channels carrying CS-PDUs undergoing segmentation.

In the sample VCR 56 (or it could be main memory based in applications supporting a large number of simultaneously active receive VCs) construction illustrated in FIGS. 5 and 6, the APU 52 uses the VCI contained in the ATM Header of an incoming cell as an index into a table that is either VCR 56 based (limited number of simultaneously active receive channels) or main memory based (unlimited number of simultaneously active receive channels) to retrieve the Channel Parameter Entry for the VC.

In this fashion, Channel Parameter Entries for receiver oriented channels are listed in order of their VCIs. No such restriction applies in our sample system for the transmit direction where a grouping and parsing mechanism is employed.

3.3.4 Cell Multiplexing—Cell Demultiplexing. Number of Channels Supported by the ATMizer 50

The ATMizer 50 can handle up to 65,536 VCs simultaneously, performing cell multiplexing and pacing for all of the active channels. However, there are tradeoffs to be made between the number of channels supported, the data rate of the ATM port and the cost and structure of the memory system deployed.

For example, in a network interface card operating at desktop speeds (<=45 mbps) it is possible to limit the number of VCs supported to 256 (128 Tx and 128 Rc). In such a scenario, the on-chip Virtual Channel Ram 56 can be used to cache all the relative parameters for each of these channels. As a result, the ATMizer 50 need only access main memory to retrieve and retire SAR-SDUs and host memory can be used for CS-PDU storage. In such a scenario, the NIC itself need not contain any memory.

In applications requiring the support of a very large number of channels, the on chip VCR 56 can not hold all of the needed channel information. As a result, it may be necessary to provide high speed SRAM, accessible by the ATMizer 50's DMA Engine, for channel parameter storage. This gives the ATMizer 50 fast access to the information needed for segmenting and reassembling CS-PDUs and for the switching of cells. CS-PDU storage would likely be handled in a local memory system, DRAM or SRAM based.

Scenarios exist that are essentially a cross between the two examples listed above. In certain systems it is possible to limit the number of simultaneously active Transmit channels. In this scenario there is no limit on the number of Tx VCIs supported, only in the number that can have CS-PDUs under segmentation at any one point in time. If the number is limited to 128, then all Tx channel parameters can be cached on chip. The time savings associated with caching Tx parameters in the VCR 56 yields added time to retrieve the parameters needed for reassembly.

This added time may allow the use of a single interleaved DRAM system for both CS-PDU and Channel Parameter storage. It is important to note that the number of TX VCIs has not been limited in this example, only the number of Tx VCIs that can have CS-PDUs under active segmentation by the ATMizer 50 at any one time. An unlimited number of TX VCIs can be supported by "swapping out" a Channel Parameter Entry/VC/CS-PDU for a new Channel Parameter Entry/VC/CS-PDU once its CS-PDU (or CS-PDU fragment) has been segmented. The inclusion of SRAM on the ATMizer 50 opens a wide range of possibilities for system implementations.

3.4 Pacing Rate Unit (PRU) 58

CELL RATE PACING (CS-PDU SEGMENTATION RATES), GLOBAL PACING AND CHANNEL PRIORITY

Figure 8:
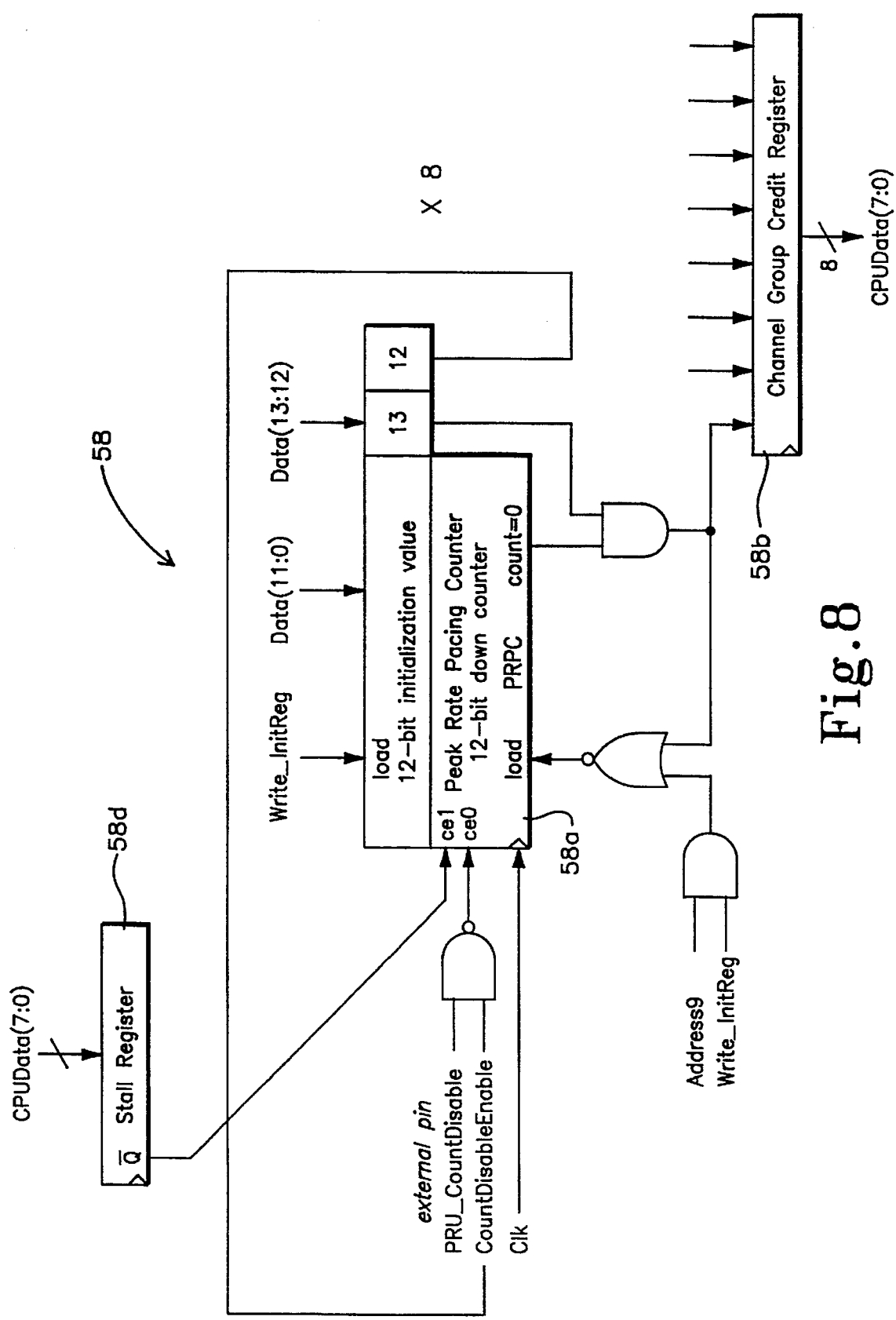
FIG. 8 is a diagram illustrating Peak Rate Pacing Counters and a Channel Group Credit Register of the ATMizer.

The Peak Rate Pacing Counters 58a and the Channel Group Credit Register 58b are illustrated in FIG. 8.

3.4.1 Cell Rate Pacing (CS-PDU Segmentation Rates)

AVERAGE RATE

The ATMizer 50 contains all of the features necessary for implementing the ATM layer Peak Rate Pacing and Maximum Burst Length control functions. Average Pacing is not expected to be implemented by the ATMizer 50 although it could be. Average pacing is expected to be implemented by the host processor which will have access to a real-time-clock.

To maintain the Average Pacing Rate agreed to at connection establishment, the host processor keeps a running total of the number of bytes sent over each established VC. Prior to queuing a new CS-PDU for segmentation over a given VC, the host processor must first determine if queuing the CS-PDU would violate the Average Rate for the VC.

To do this the processor calculates the amount of time that has passed since the last checkpoint. It then divides the total number of bytes sent out over the VC since the last checkpoint by the elapsed time. The result is the actual "Average Pacing Rate" in bytes/second.

If queuing the next CS-PDU would result in a violation of the agreed to Average Pacing Rate for the Virtual Circuit then the host processor will wait a period of time before passing the CS-PDU to the ATMizer 50 for segmentation.

If queuing the CS-PDU would not violate the Average Pacing Rate parameter, the CS-PDU is "passed" to the ATMizer 50 for segmentation. As statistical multiplexing issues become better understood software can be modified to implement Average Rate Pacing in the most ATM network friendly fashion.

PEAK RATE PACING AND BURST LENGTH

Once a CS-PDU or CS-PDU fragment has been "passed" to the ATMizer 50 for segmentation, the ATMizer 50 controls the rate of cell generation from the CS-PDU and the number of back-to-back cells generated from a CS-PDU each time the ATMizer 50 segments a portion of it.

There are eight user programmable "Peak Rate Pacing Counters" (PRPC 58a) in the ATMizer 50, and a CS-PDU can be "attached" to any one of the eight. A Peak Rate Pacing Counter 58a is simply a 12 bit down counter that automatically reloads to an APU 52 specified value upon reaching zero. Each PRPC 58a counts down by one on each system clock tick (Clk). External logic can temporarily or periodically suspend the down counting of the PRPC 58as by asserting the ATMizer 50's PRU_CountDisable input (providing that the PRPC 58a has been configured to be sensitive to PRU_CountDisable).

Since each CS-PDU attached to a given PRPC 58a may have its own "Burst Length" value, the count in the Peak Rate Pacing Register actually determines the "Service Interval" for the channel group and not necessarily the peak rate of cell generation for CS-PDUs attached to that PRPC 58a (note: CS-PDUs attached to a particular PRPC 58a with similar characteristics such as channel priority are collectively referred to as a "Channel Group".

More than one Channel Group can be attached to a single PRPC 58a). Of course, if the burst lengths for each CS-PDU attached to a PRPC 58a are identical, the PRPC 58a count will determine the actual peak rate of segmentation for CS-PDUs belonging to that Channel Group.

CS-PDUs are attached to a PRPC 58a by the host processor. When the host passes a "Segment CS-PDU" information packet to the ATMizer 50, it includes in the information packet an indication of which PRPC 58a should be used to define the Service Interval for segmenting the CS-PDU. It also includes the Burst Length value for the CS-PDU (i.e. how many cells should be generated and sent, back-to-back, for the CS-PDU at each service interval). The ATMizer 50, upon receiving this "Segment CS-PDU" information packet (through Host-ATMizer Messaging), appends the channel parameters for the CS-PDU to the end of the specified channel group and begins the segmentation process on the CS-PDU the next time its associated PRPC 58a times-out.

When a PRPC 58a reaches zero, all CS-PDUs associated with that PRPC 58a are essentially given "Credit to Send". Anytime one or more Peak Rate Pacing Counters 58a have timed out but have not yet been serviced (i.e. the APU 52 has yet to clear its bit in the Channel Group Credit Register 58b), internal hardware asserts the APU 52 input CpCond2.

Firmware running on the APU 52 periodically checks the state of CpCond2 by executing the "Branch on Co-processor Condition 2 True" instruction. If CpCond2 is True, one or more Peak Rate Pacing Counters 58a have timed-out and the APU 52 must segment the CS-PDUs attached to the PRPC 58a or PRPC 58asthat have reached their service intervals. The APU 52 can determine which PRPC 58a has timed-out by reading the 8 bit Channel Group Credit Register (CGCR) 58b. Each bit set in the CGCR 58b indicates that the corresponding PRPC 58a has timed out since its bit was last cleared by the APU 52. APU 52 firmware clears the appropriate bit when it has serviced all channels in a particular channel group.

When servicing a channel group, APU firmware can choose to generate and send one or more cells for a VC before servicing the next VC in the channel group. The number of cells to be sent before proceeding to the next channel group entry can be defined either by construction (i.e. the same for each member of a channel group and embedded into the firmware directly) or by a field inside the Channel Parameter Entry for the VC. Firmware running on the ATMizer 50 segments the number of cells specified by this Burst Length value before proceeding to the next channel group entry.

A side effect of this process is that the amount of time required to access and restore a Channel Parameter Entry can be amortized over several cells, effectively reducing the number of APU instructions and the amount of time required to generate a cell. This may be of importance in high speed applications (155 mbps) supporting a large number of VCs (>512).

GENERAL FACTS ABOUT THE PRU—PRPC CONTROL

Each PRPC 58a in the PRU 58 has a 14 bit initialization register associated with it. The APU 52 writes an initialization word into the initialization register using a store word or store half word instruction. Bits eleven through zero of the APU 52's data bus are written into the targeted initialization register as the initialization count. Bits twelve and thirteen are also saved but are used as control bits and are not part of the 12 bit down count initialization value.

Bit 12 controls sensitivity to the external PRU_CountDisable signal. If bit 12 is set for a given PRPC 58a, its count will be suspended whenever external logic asserts PRU_CountDisable. If bit 12 is not set for a given PRPC 58a, its count will not be suspended whenever external logic asserts PRU_CountDisable. In this fashion, implementations are possible that have certain PRPCs sensitive to the external count disable function while other PRPC 58as are not sensitive to this external signal.

Bit 13 controls whether the PRPC 58a is enabled or not. If a PRPC 58a is not being used it should not be allowed to accumulate credit and cause spurious assertions of the APU 52's CpCond2 input (segmentation request). By setting bit 13 to zero, the APU 52 can disable the targeted PRPC 58a from accumulating credit. All PRPC 58as are disabled at system reset and must be enabled by the APU 52 prior to activating a PRPC 58a.

In addition, a function is provided by the PRU 58 to allow the APU 52 to stall one or more of the PRPC 58as at any given time. An eight bit Stall Register 58d is written by the APU 52 using a store instruction. The APU 52's data bus carries the Stall Register Mask on bits seven through zero. Writing a one into a bit of this register will force the corresponding PRPC 58a to stall until the one is overwritten by a zero during a subsequent APU 52 write operation.

A special provision is added to ensure that a PRPC 58a does not stall at time-out so software need not concern itself with a PRPC 58a stalled generating credit indefinitely. When the APU 52 writes a new value into the PRPC 58a's initialization register, that value will be loaded into the PRPC 58a once the PRPC 58a reaches zero.

If the APU 52 wishes the effect to take place immediately (overwrite the existing value in the PRPC 58a), it asserts the immediate bit encoded as APU address bit 9. If APU address bit 9 is set during a write to an initialization register, the initialization value is written into both the initialization register and the PRPC 58a. If APU address bit 9 is not set, the initialization value is loaded only into the initialization register and will be loaded into the PRPC 58a only once the PRPC 58a times out.

USING PRPC 4/5 AND 6/7 AS 24 BIT TIMER/COUNTERS

PRPCs four and five and PRPCs six and seven are capable of being converted into general purpose 24 bit timer/counters. When configured in timer/counter mode, the PRPCs 58a can be read and written by the processor. PRPCs four and five are configured into one 24 bit timer counter by setting the COUNTER 4/5 bit in the System Control Register. PRPC five makes up the high order 12 bits of the counter and PRPC four makes up the low order 12 bits.

PRPCs six and seven can be used in a similar fashion. When configured in counter/timer mode, PRPCs 4, 5, 6 and 7 timing out will not cause CpCond 2 to be asserted but they will continue to accrue credit in the credit register 58b. Once both PRPCs 58a making up a 24 bit timer counter have counted down to zero, an interrupt will be sent to the APU 52. Timer/counter 4/5 is connected to the APU 52's interrupt 0 input and timer/counter 6/7 is connected to the APU 52's interrupt 1 input.

The interrupt assertion can be cleared by the APU 52 by clearing the associated bit/s in the Channel Group Credit Register 58b. When configured in timer/counter mode, most of the control features listed above still apply. PRPCs 4 and 6 are still affected by the external PRU_CountDisable input (if so configured in initialization register bit 12), but PRPCs 6 and 7 are forcibly removed from PRU_CountDisable sensitivity. Since in timer/counter mode the count enable inputs of PRPCs 5 and 7 are connected to the time out (credit bits) of timers 4 and 6, respectively, timers 5 and 7 effectively stall in response to PRU_CountDisable if their associate low order partners are configured to be sensitive to PRU_CountDisable.

3.4.2 Global Pacing Rate

Average and Peak Rate Pacing and Burst Length are useful constructs in managing bandwidth utilization by a particular VC. Taken as a whole, OAM software can manipulate these values for active VCs to manage the overall data throughput rate (or information rate) on the Transmission line. However, it is almost impossible to effectively shape the overall ATM port information rate through this mechanism. Shaping of the overall information rate may be desirable when connecting into a system that can only handle a limited information rate or during periods of high congestion in the switching network.

In the case of a congested network, the latency between notification of congestion and the host processor's ability to modify the pacing parameters may be high. As a result, many cells will be sent into a congested network and lost, requiring the retransmission of many CS-PDUs. This further exacerbates the congestion problem. And by the time the system responds to the notification of congestion, the congestion situation in the network may have actually changed. That is why the ATMizer 50 implements a Global Pacing Rate Controller function as illustrated in FIG. 9. The Global Pacing Rate Control function is a quick way to limit the overall transmission bandwidth consumed on the Transmit port. The Global Pacing Rate Register (GPRR) 58c, as illustrated in FIG. 8, is an APU 52 accessible register that determines the percentage of cells sent out over the ATMizer 50's PCI Transmit port that can be assigned cells (the remainder being IDLE cells). Any assigned cell percentage can be chosen as long as it is a multiple of 12.5% between 0% and 100%.

A single APU instruction is all that is required to modify the GPRR 58c. With the GPRR 58c, the ATMizer 50 is able to throttle the data rate on its transmission port within the same cell time that the congestion is recognized from an incoming cell. And more importantly, the amount of the initial reduction as well as the algorithm by which the ATMizer 50 returns to full speed operation can be implemented intelligently in APU 52 firmware and can be modified as more is learned about ATM network congestion.

Furthermore, high priority channels can continue to gain access to the reduced throughput capacity while lower priority traffic will be blocked.

3.4.3 Channel Priority

Software can use the CGCR 58b to implement channel priority. By checking the CGCR bits in a particular order, the APU 52 implements "high priority" and "low priority" channel groups. In an effort to give even further priority to CS-PDUs/VCs belonging to "high priority" channel groups, the APU 52 can read the CGCR 58b periodically during the servicing of a channel group designated by software convention as "lower priority" to see if a higher priority channel group has timed-out during the servicing process.

If so the APU 52 can suspend servicing of the "lower priority" channel group and begin servicing the "higher priority" channel group immediately. The APU 52 can then resume servicing of the lower priority channel where it left off once all higher priority requests have been satisfied.

In addition, if the user wishes to attach both high and low priority CS-PDUs to a single PRPC 58a in order to pace high and low priority CS-PDUs/VCs at the same Service Interval Rate, he can. Each PRPC 58a could have two (or more) Channel Groups associated with it.

For instance a PRPC 58a could have a high priority channel group and a low priority channel group attached to it. The APU 52 could service all channels belonging to the high priority channel group and then check for other high priority requests pending by reading in the CGCR 58b before servicing the low priority channel group attached to that particular PRPC 58a. Virtually any "channel priority" algorithm can be supported in user firmware. There are no priority mechanisms enforced in hardware.

In summary, the Pacing Rate Unit 58 consists of the 8 Peak Rate Pacing Counters 58a, the Channel Group Credit Register 58b (as illustrated in FIG. 10), the external count disable feature (PRU_CountDisable), the logic that asserts CPCond2 when one or more bits are set in the CGCR 58b and the hardware to allow the processor to set the PRPC 58a initialization values and to clear the Channel Group Credit Register 58b bit fields as Channel Groups are serviced. All other constructs are by software design and make use of one or more of the hardware features listed above.

Regarding Channel Priority Vs CS-PDU Priority, PRPCs 58a and their associated Channel Group or Channel Groups can be given distinct priorities. If Channel Groups have reached their Service Intervals and are awaiting servicing, high priority requests can be serviced before low priority requests. Existing high priority requests should be serviced before new high priority requests.

New high priority requests may be serviced before existing low priority requests. This implementation of "channel priority" is separate from the AAL5 high-medium-low CS-PDU Priority assignment. Both priority constructs influence the cell generation process.

Channel priority affects Channel Group/CS-PDU servicing sequence while ATM AAL 5 CS-PDU priority is reflected in the PTI and CLP field values of the ATM header. Both functions are controlled by the ATMizer 50. For AAL traffic, the host must include an indication of the CS-PDU priority in the "Segment CS-PDU" message packet provided to the ATMizer 50.

3.5 DMA Controller 60

Figure 11:
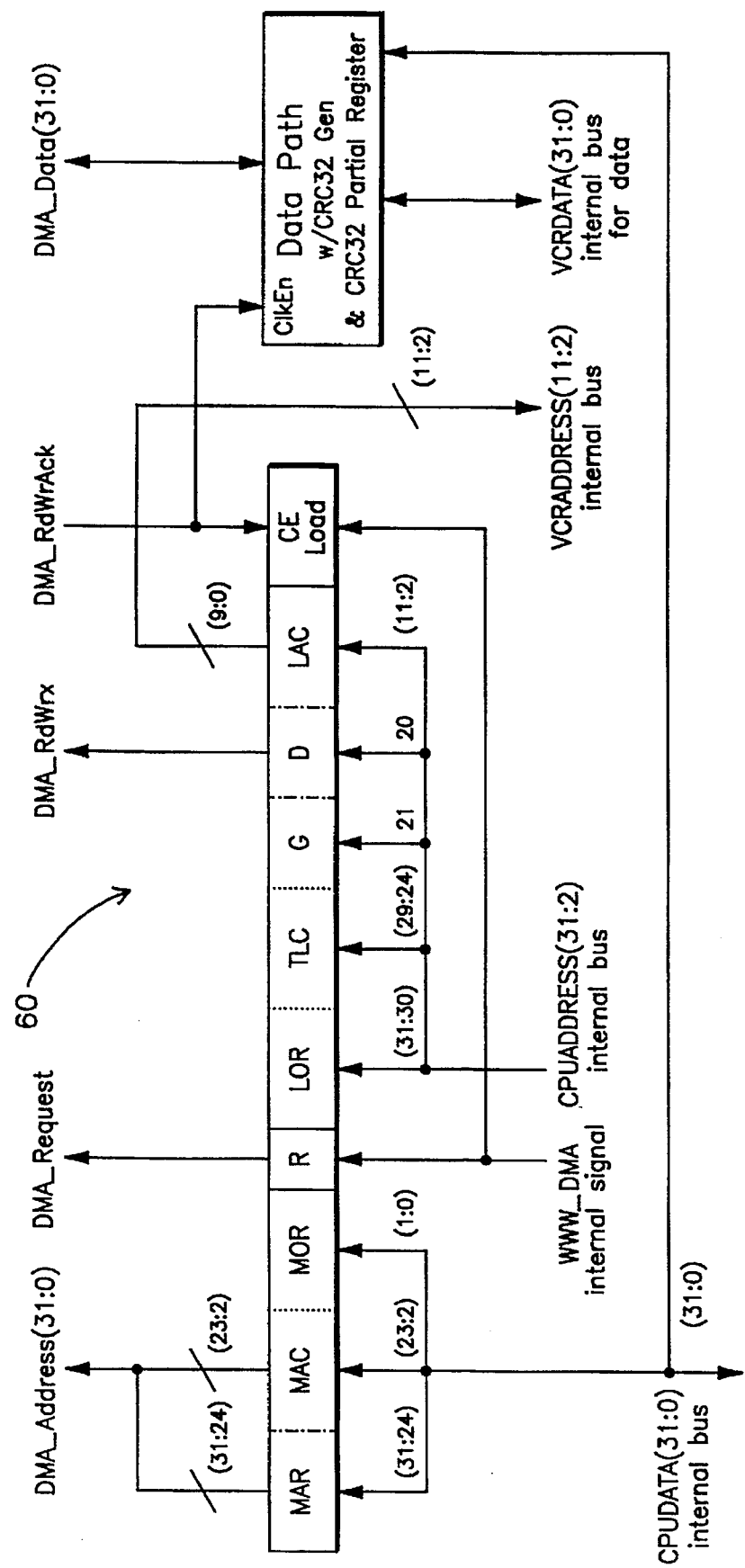
FIG. 11 is a diagram illustrating a DMA controller of the ATMizer.

As illustrated in FIG. 11, the DMA Controller 60 is an assembly of registers, counters and a data path that collectively control data transfer operations between the on-chip VCR 56 and main memory. These transfers include the retrieval of SAR User Payloads from memory based CS-PDUs during segmentation operations, the writing of SAR User Payloads back into memory based CS-PDUs during reassembly operations, access to buffer lists, link list pointers, messages and all other data structures required by the user's application.

In addition, in systems that support more simultaneously active VCs than can be supported directly out of the on-chip VCR 56, the DMA controller 60 can be used to retrieve and restore memory based channel parameters. The DMAC 60 also contains CRC32 generation circuitry that is used to generate the CRC32 values required for AAL5 CS-PDU protection. All DMA registers and counters are initialized by the APU 52 and all DMA operations are initiated by the APU 52 as part of the standard servicing of events such as "Cell Received" and "Peak Rate Pacing Counter Time-Out".

Because the DMAC 60 is configured at the start of each DMA operation, it effectively provides an unlimited number of DMA channels. The following section describes the DMAC registers and counters pictured above in more detail.

3.5.1 DMAC Control Registers and Counters

MAR Memory Address Register rt(31:24)

The Memory Address Register holds the 8 MSBs of the main memory address during DMA operations. While the DMAC does increment the main memory address for consecutive transfers in a multiple word DMA operation, it does not increment the 8 MSBs (i.e. the value in the MAR). Therefore, if external logic relies on sequential incrementing of the DMA_Address bus during multiple word DMA operations, the APU 52 should not initiate a DMA operation that crosses a sixteen megabyte boundary. The contents of the MAR are reflected on output pins DMA_Address (31:24) when input pin DMA_AdrOEx is asserted.

MAC Memory Address Counter rt(23:2)

The Memory Address Counter holds the lower 22 main memory address bits. During a DMA operation, the Memory Address Counter is incremented in response to the assertion of DMA_RdWrAck by external logic. The contents of the MAC are reflected on DMA_Address(23:2) when DMA_AdrOEx is asserted.

MOR Memory (byte) Offset Register rt(1:0)

The Memory Offset Register holds the two LSBs of the main memory address of a DMA operation. The DMAC will begin the memory access beginning at the byte pointed at by the MOR. The DMA_Bmask(3:0) outputs indicate which bytes should be retired to memory during DMA transfers. The address of the first word of the operation is indicated by the MAR/MAC.

LAC Local Address Counter ea(11:2)

The Local Address Counter holds the on-chip VCR 56 read or write word address (the "local address"). It is programmed by the APU 52 with the local starting address at the beginning of a DMA operation and then incremented automatically by the DMAC 60 as the operation proceeds.

LOR Local (byte) Offset Register ea(31:30)

In applications supporting AAL 3/4 Segmentation and Reassembly or in applications supporting "Scatter" and "Gather" operation, it may be necessary to transfer a data block between the VCR 56 and main memory that does not begin on an even word boundary in the VCR 56. The Local Address Offset field informs the DMA controller 60 of the starting byte offset of the first byte of valid data in the VCR 56. The LAR provides the word address of this first byte.

TLC Transfer Length Counter ea(29:24)

The size (in bytes) of a DMA transfer is set by the APU 52 in the TLC. Since the TLC is only a six bit register, a 64 byte transfer length encoding is recognized when the TLC is initialized to 000000.

G Ghost Bit ea(21)

The ghost bit is used to indicate to external circuitry that the DMA operation being requested is being done solely for the purpose of creating a CRC32 partial result for an AAL 5 SAR SDU that has been constructed in the VCR 56 from two or more data block fragments. If a SAR SDU is built from more than one data block, and if one of the data blocks was not word aligned and of size evenly divisible by four, the CRC32 partial generator in the DMAC would not have been able to calculate a CRC32 partial result for the SAR SDU over the numerous DMA operations required to retrieve the sub blocks of the SAR SDU.

Therefore, once the entire SAR SDU has been built up in the VCR 56, the APU 52 will have to force a CRC32 partial generation by initiating a DMA write operation targeting the SAR SDU as the local write data. The CRC32 generator can then calculate the need CRC32 partial result for this SAR SDU. The write is not truly desired and so the APU 52 sets the ghost bit to inform the memory controller that this write should be acknowledged at full speed but should not affect the contents of memory.

The memory controller responds by ignoring the transaction accepts for provide the necessary number of DMA__RdWrAck assertions to move the 48 byte SAR SDU through the CRC32 generator. Once the operation is complete, the APU 52 can read out the result.

D DMA Operation Direction ea(20)

The DMA Operation Direction Register is a one bit register that is used to indicate to the DMAC 60 and the outside world the direction of the DMA operation. By writing a 1 into this register the APU 52 indicates that it wishes to perform a main memory read operation. A zero indicates a main memory write operation. The value of this register is directly reflected on output pin DMA_RdWrx.

CRC32 Partial Register rt(31:0)

The CRC32 Partial Register should be initialized to all ones by the APU 52 prior to beginning the first SAR User Payload retrieval for an AAL 5 CS-PDU. The CRC32 Partial Result, generated during the DMA operation, is read from the CRC32 Partial Register by the APU 52 at the end of the DMA operation. It is saved and then restored prior to the next segmentation operation. The register is used in a similar fashion for CRC32 generation during reassembly.

WWW_DMA ea(19:16)=0100

Internal logic asserts this signal when the APU 52 executes a Store Word instruction that carries 0100 on APU 52 address bits 19:16, respectively. This causes the values on the APU 52 address and data bus to be written into the appropriate DMA control registers and counters. It also results in the assertion of the DMA_Rqst output signal and initiation of the DMA operation.

3.5.2 Programming the DMAC 60

In order to initiate a DMA operation between main memory and the on-chip VCR 56, the APU 52 programs the DMAC 60 with the starting main memory address (byte address), the local/VCR 56 starting address (word aligned address written into the LAR and the starting byte offset within the targeted word written into the LOR), the number of bytes to be transferred and the direction of the transfer.

In addition, the APU 52 may need to preset the CRC32 generator for AAL 5 CS-PDU CRC32 support or set the ghost bit as needed.

The APU 52 can configure the DMAC control registers and counters and initiate a DMA operation by executing a single "Store Word" instruction as illustrated in FIG. 12. Both the effective address and data fields produced by the Store Word instruction are used to configure the DMAC's registers and counters.

For AAL5 CS-PDU segmentation and reassembly, if the ATMizer 50 is to be used for CRC32 generation and checking, a second "Store Word" instruction is needed as illustrated in FIG. 13 to initialize the CRC32 generator with the correct CRC32 partial result value.

Figures 14, 17:
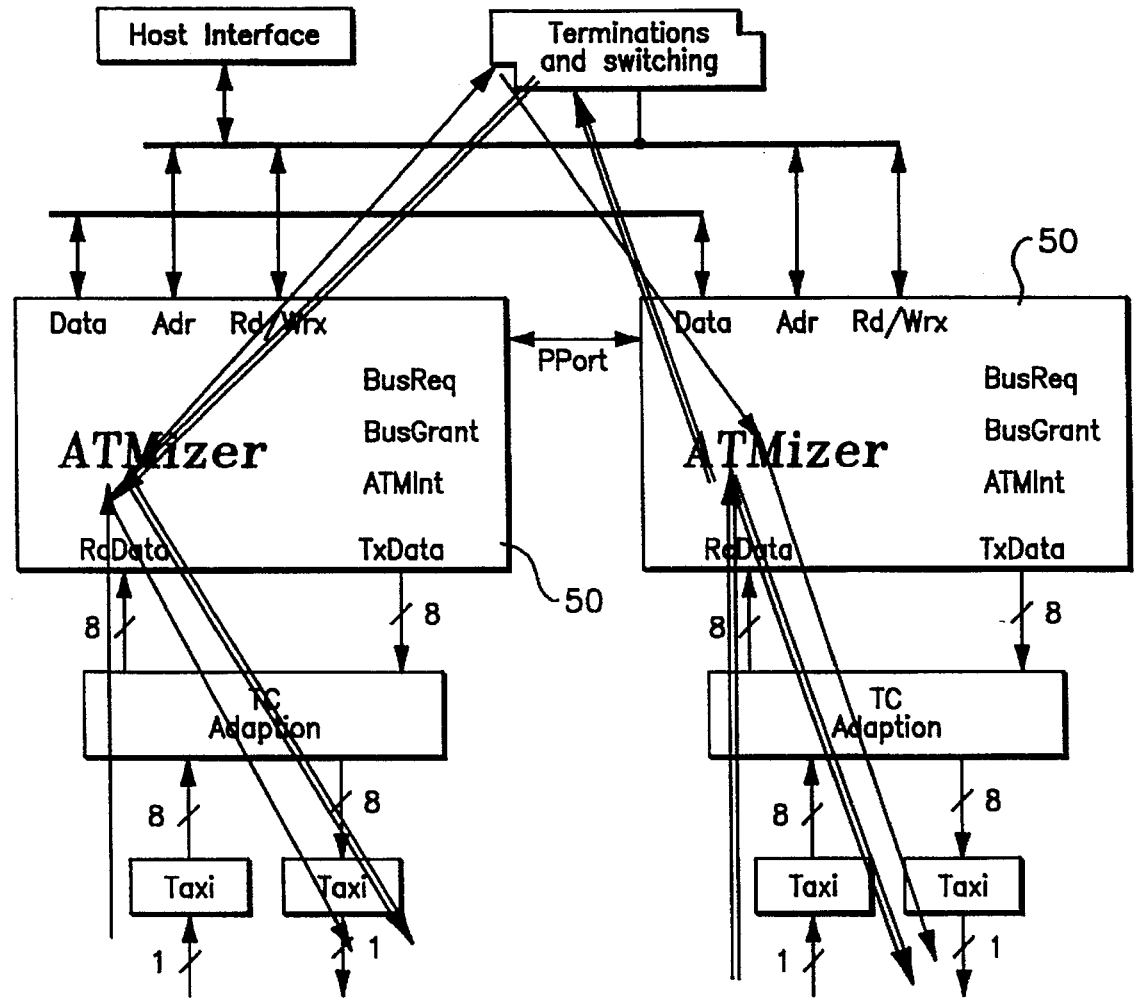
FIG. 14 is a diagram illustrating a "load word" function.
FIG. 17 is a diagram illustrating received cell handling options in a dual port switch/termination station of the ATMizer.

This second instruction should be executed immediately before the Store Word instruction that is used to initialize the DMAC's registers and initiate the DMA operation. The CRC32 Partial register can be read at the end of a DMA operation using a Load Word instruction with EA(19:16)= 0101 as illustrated in FIG. 14.

The 16 bit offset is sign-extended and added to the contents of general register rb to form a 32-bit unsigned effective address. The contents of general register rt are stored at the memory location specified by the effective address. If either of the two least significant bits of the address is non-zero, an address exception occurs.

3.5.3 Using the DMA Controller 60 to implement Cell Switching, Segmentation and Reassembly The ATMizer 50, under APU 52 user firmware control, can be used to implement CS-PDU segmentation, CS-PDU reassembly, and ATM cell switching. On a per VC basis, the APU 52 can decide whether to switch or terminate an incoming cell. The decision can be based on static principles (certain VC #s are dedicated to switched VCs while other VC #s are dedicated to terminating VCs) or on dynamic principles (the channel parameter entry for a given VC has a flag field that indicates whether its cells should be switched or terminated).

REASSEMBLY VS. CELL SWITCHING

If an incoming cell is to be "switched", it can be passed, headers and trailers intact, to any memory mapped device using the ATMizer 50's DMA Controller 60 to accomplish the transfer. In networks implementing a ring-like structure or a simple two way switching matrix, incoming cells can be switched directly between the ATMizer 50's Receiver 62b and Transmitter 62a by simply passing a pointer to the cell in the VCR 56 (i.e. the cell's VCR 56 starting address) to the Transmitter in the PCI 62 (this is the same procedure that is used for queuing a cell for transmission). In this fashion, cells can be switched within the ATMizer 50, never touching system memory.

Before a cell is switched, the APU 52 may choose to perform operations on it such as VPI translation, VCI translation, and congestion notification insertion. The APU 52 accomplishes these actions by simply overwriting the specific fields in the cell with new values. For example, if VCI translation is required, a flag will be set in the channel parameter entry for the VC that the cell arrived over that indicates that the cell is to be switched w/VCI translation.

The new VCI will be included in the channel parameter entry as well. The APU 52 reads the new VCI from the channel parameter entry and writes it into the VCI field of the cell held in the VCR 56 (remember that the VCR 56 holds either two, four, eight or sixteen 64 byte cells. The Receiver 62b in the PCI 62 writes cells into the VCR 56 in a modulo two, four, eight or sixteen fashion). A decision is then made to switch the cell over the back-plane using the DMA controller 60 or to pass a pointer to the cell to the ATM Transmitter 62a in the PCI 62.

In practice, the specific procedures for implementing cell switching are defined by user firmware. From the perspective of the DMA controller 60 and the Parallel Cell Interface 62, there is no distinction between cell switching and circuit termination. Cells arriving over the ATM Receiver 62b are written into the VCR 56.

In the case of circuit termination, the APU 52 initiates a DMA operation to transfer the User Payload portion of a cell to its corresponding memory based CS-PDU and sets the LAC, LO and TLC values in the DMAC 60 accordingly. In cell switching applications where a cell is to be transferred to a memory mapped device, the entire cell, headers and trailers included, must be transferred.

Therefore, the pointer written into the LAC should point to the beginning of the cell instead of the beginning of the SAR User Payload field, the Local Offset is most likely zero since the Receiver writes cells into the VCR 56 starting at byte 0 of word zero for the active Received Cell Holder, and the TLC value should be large enough to include all ATM and SAR headers and trailers.

Figure 15:
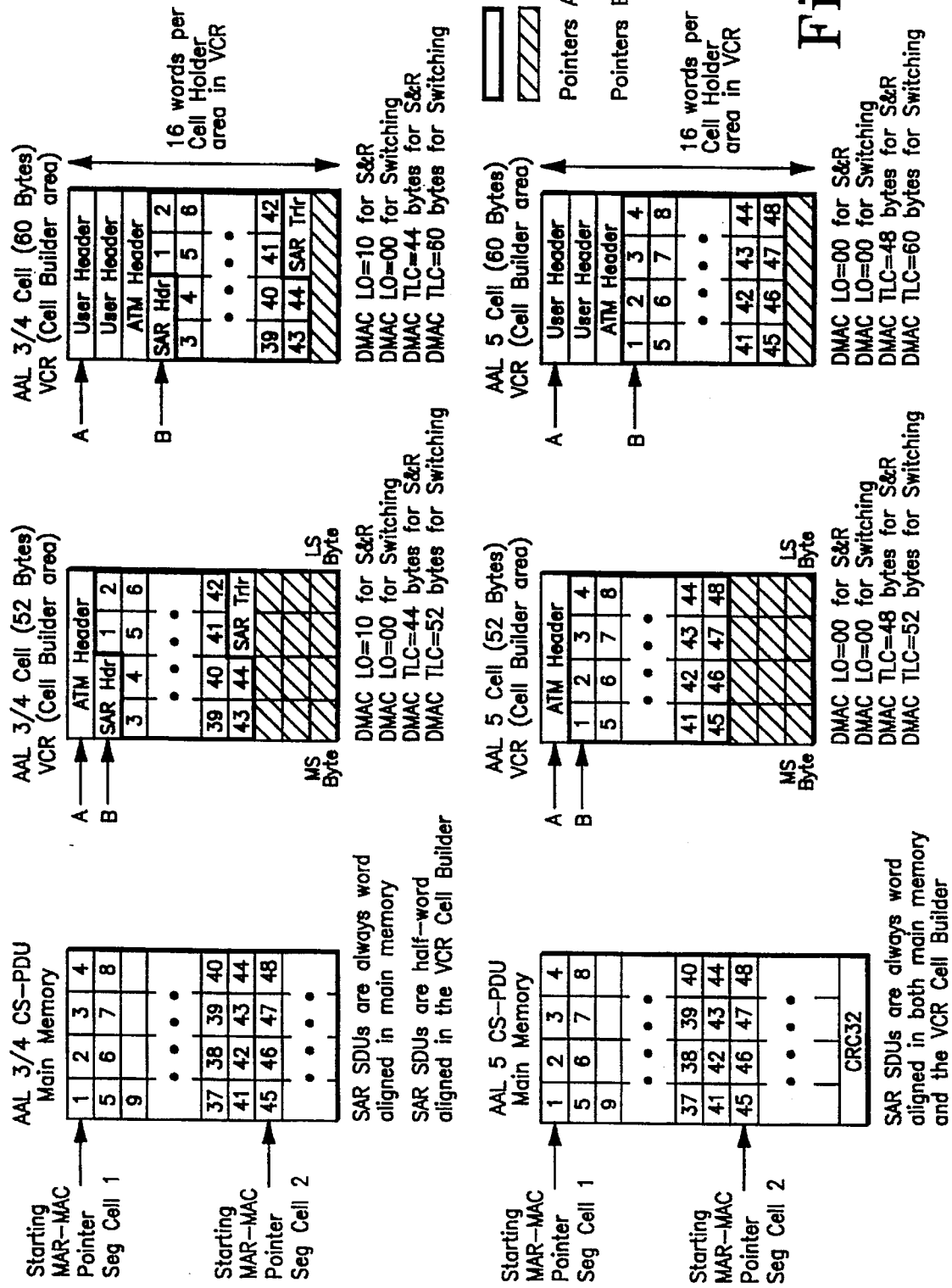
FIG. 15 is a diagram illustrating local address pointers.

FIG. 15 illustrates the local address pointers (labeled B) that would be written into the DMAC's Local Address Counter, Local Offset Register and Transfer Length Counter to accomplish reassembly operations on 52 and 60 byte cells as well as the pointers (labeled A) that would be written into these same registers to accomplish switching operations on 52 and 60 byte cells.

In addition, the drawings illustrate that in the case of AAL 3/4 cells, the SAR User Payload is not word aligned in the VCR 56. Therefore, the APU 52 must set the Local Offset field to 10 when initiating the DMA transfer to inform the DMA Controller 60 of the alignment condition.

The DMA controller 60 is responsible for merging bytes from two VCR 56 words into a single word to be written to a word aligned data structure in main memory. If the MOR indicates that the targeted memory address is not word aligned, the DMA controller 60 is also responsible for adjusting the targeted local data to the proper memory alignment.

The DMAC 60 has the capability to transfer from any local offset to any memory offset and vice versa. This is especially important in AAL 3/4 S&R operations, AAL 3/4 and AAL 5 "Gather" operations and in AAL 3/4 or AAL 5 "Scatter" operations where the system designer wishes to rely on the ATMizer 50 to do higher layer (i.e. TCP/IP) header stripping and Packet alignment to accelerate application layer routines. When switching AAL 3/4 Cells the Local Offset should be set to 00 because even though the SAR User Payload field is misaligned, the cell itself is not.

SEGMENTATION VS. CELL SWITCHING

Cell switching and segmentation differ from the perspective of the DMAC 60 in a similar fashion. Fetching a cell from memory differs from fetching a SAR User Payload from memory in both the size of the transfer (i.e. a cell is larger than a SAR SDU) and the LAC and LO initialization values. In addition, segmentation is usually triggered by an on-chip event such as a Peak Rate Pacing Counter 58a timing-out while the need to switch a cell from an external memory mapped device must be indicated to the APU 52 using an external triggering event.

The relationship between CS-PDU main memory addresses and VCR 56 cell holder us illustrated in FIG. 15. The addresses are for a standard 52 byte cell and a user specific 60 byte cell.

3.5.4 CRC32 Generation Considerations

CRC32s can be calculated individually for each CS-PDU actively undergoing either segmentation or reassembly. For CS-PDUs undergoing segmentation, the final CRC32 result is appended, under APU 52 control, to bytes 44–48 of the SAR SDU of the last cell generated from the CS-PDU. For CS-PDUs undergoing reassembly, the CRC32 result is compared with the CRC32 received in the last cell of the CS-PDU as a checking mechanism.

Because the ATMizer 50 supports cell multiplexing and de-multiplexing from up to 64K VCs, the APU 52 must provide CRC32 partial result storage and retrieval services to allow for multiple concurrently active CRC32 calculations to be performed by the single CRC32 generator.

As part of its Partial Results Management function the APU 52 must set the CRC32 Partial Register to all ones prior to retrieving the first SAR SDU for an AAL5 CS-PDU. The 12 word DMA Read operation automatically generates a 32 bit CRC32 partial result in the CRC32 Partial Register. The APU 52 must retrieve this value at the end of the DMA operation and save it to preset the CRC32 Generator prior to the next transfer from the same CS-PDU.

If more than one cell is to be built from a CS-PDU before proceeding to the next CS-PDU (i.e. burst length >1), and if no other DMA operation takes place in the interim, the APU 52 need not retrieve and restore the CRC32 partial result until the final SAR SDU has been retrieved from the CS-PDU. Before proceeding to the next CS-PDU, the AAL5 CRC32 partial result must be stored safely away in a place where it can be retrieved the next time that the CS-PDU is segmented (it will most likely be stored in the channel parameter entry for the VC).

When the last SAR User Payload of a CS-PDU has been fetched from memory, the APU 52 is responsible for reading the CRC32 final result from the CRC32 Partial Register and appending the result to the last four bytes of the cell in the VCR 56 Cell Builder. If the final DMA transfer is set as a 48 byte transfer, user software must be sure that the last four bytes of the CS-PDU in main memory (i.e. the CRC32 field) is preset to all zeros. If the last transfer is executed as a 44 word transfer, no such restriction applies.

On reassembly, the APU 52 must preset the CRC32 register with all ones prior to initiating the first reassembly DMA operation for a CS-PDU. The APU 52 is again responsible for retrieving the CRC32 partial result at the end of the DMA operation, saving it away in the VCR 56 or system memory (where ever channel parameter entries are saved) and restoring it prior to reassembling the next cell of the CS-PDU. Again, if the last transfer is queued up as a 48 byte transfer the APU 52 must first set the CRC32 field in the Cell Holder to all zeros before initiating the DMA operation.

At the end of the last transfer, the APU 52 reads the CRC32 final result from the CRC32 partial register and compares it to the result carried into the ATMizer 50 in the last cell of the CS-PDU. If they differ, a CRC32 error has been detected and the ATMizer 50 must inform host software utilizing the user's messaging system.

3.5.5 Misaligned Operations Revisited

As mentioned above, the DMAC 60 in the ATMizer 50 is capable of performing a DMA operation of any byte length less than or equal to sixty four bytes beginning at any VCR 56 byte offset and beginning at any memory byte offset as well.

For example, during segmentation implementing "Gather", if two physically disjunct data structures form a single logical AAL 5 CS-PDU, one being 53 bytes and a second being 91 bytes (87 bytes of significance and a four byte zeroed out CRC32 field to be calculated and inserted by the ATMizer 50), the ATMizer 50 must perform the following operations to accomplish segmentation of this disjunct CS-PDU:

Assumptions

1. CS-PDU fragment one (53 bytes) starts at memory address 00000000H.
2. CS-PDU fragment two (91 bytes) starts at memory address 00001000H.
3. Next active Transmit Cell Builder in the VCR 56 starts at 0100H.

Procedure

| | | |
|---|---|---|
| 1. Build first cell. | | |
| MAR-MAC-MOR | = 00000000H | SAR SDU retrieval |
| TLC | = 48D | SAR SDU will be placed starting at 0104H |
| LAR | = 0104H | Received Cell Holder Starts at 0100H |
| LO | = 00H | ATM Header will be placed at 0100H |
| 2. Build next cell (a fragment transition cell). | | |
| MAR-MAC-MOR | = 00000030H | Get remainder of first fragment |
| TLC | = 5D | Use next Transmit Cell Builder |
| LAR | = 0144H | |
| LO | = 00H | |
| MAR-MAC-MOR | = 00001000H | Fill SAR SDU from second fragment |
| TLC | = 43D | |
| LAR | = 0148H | |
| LO | = 01H | |
| 3. Build final cell | | |
| MAR-MAC-MOR | = 0000102BH | Get remainder of second fragment |
| TLC | = 48D | |
| LAR | = 0184H | |
| LO | = 00H | |

A problem of special significance when building AAL transition cells is the fact that the CRC32 generator will be thrown off track by the gap in the data stream used to build the cell. If a cell is built from one or more word aligned data structures and if a data structure is always an even multiple of four bytes, CRC32 generation is not impacted greatly.

User firmware simply retrieves the CRC32 partial result from the first data fetch (i.e. in step two if the first data fetch were 8 bytes instead of 5 bytes) and restores it to the CRC32 generator prior to undergoing the second data transfer (i.e. 40 bytes instead of the 43 bytes shown above in step 2). In this fashion, the CRC32 generation process proceeds without a problem.

If however, the Gather function involves data structures that require non-word-aligned accesses, as shown in step 2 above, the CRC32 generator will be thrown out of alignment (because the CRC32 generator operates on 32 bits of data at one time). Therefore, firmware must first construct the SAR SDU in the VCR 56 completely, using as many data structures as required to fill out the body of the cell and without regard to data structure alignment, before asking for a CRC32 calculation.

Once the SAR SDU has been constructed in the VCR 56, the CRC32 partial (or final) result is calculated by initiating a "Ghost" DMA write operation to an arbitrary address. The DMA ghost operation acts internally like a memory write operation. The DMAC 60 can be moved through a Ghost write operation at a rate of one word per cycle. Once the operation has completed, the CRC32 value can be read from the CRC32 partial register the same as for any AAL5 DMA Segmentation procedure.

Since the CRC32 generator works on aligned data (data after it passes through the DMAC's byte aligners), future cells built from the final CS-PDU fragment will not require ghost operations. CRC32 generation will proceed smoothly as long as another unaligned boundary condition is not encountered.

On reassembly operations, if Header stripping and data field alignment is employed for application acceleration, the same issues may arise with cells that contain the end of one header and the data field of a packet. On reassembly, the CRC32 generator works on VCR 56 data before it hits the data aligners. Therefore, after the ghost operation is done to generate the CRC32 for the transition cell, future operations to a single fragment need not utilize ghost operations because the SAR SDU will be word aligned in the VCR 56 even though it may not be word aligned after being written into main memory.

That is why the CRC32 generator pulls its input data prior to the data aligners in the memory write direction and following the data aligners in the memory read direction. (The CRC32 generator uses data aligned to its VCR 56 destination alignment, not based on memory alignment. This is true in both directions).

3.5.6 Using the DMA Controller 60 to Implement Scatter and Gather Operations By construction, the ATMizer 50 provides the system design with all of the functionality needed to implement a fully robust scatter-gather ATM network <-> Host interface. In the Gather direction (during segmentation) the ATMizer 50 is capable of generating cells from any number of separate data structures as if they were a single contiguous CS-PDU. By doing so, the ATMizer 50 precludes the need for the host processor to do a series of time consuming data movement operations to form a contiguous CS-PDU in a local buffer memory prior to initializing the Segmentation operation.

For example, in a TCP/IP application, the TCP/IP header may reside in a different location within host memory from the actual user CS-PDU data payload. In addition, the actual CS-PDU data payload field may actually consist of a number of discontinuous pages of memory. Because the ATMizer 50 supports "Gather" operations, there is no need to move all of these data structures in advance into a single CS-PDU.

The actual implementation of both Scatter and Gather are up to user firmware. In general, the Gather function can be implemented by having the host processor pass to the ATMizer 50 a series of "Segment CS-PDU fragment" messages with the appropriate user defined control structures. The APU 52 recognizing that it is involved in a gather operation, is programmed not to generate end of CS-PDU header fields at the end of a CS-PDU fragment.

It is also programmed to understand how to resolve the arrival at an end of CS-PDU fragment boundary (i.e. automatically resolve the link list pointer or simply pass a message to the host processor asking it to resolve the next pointer for it).

3.5.7 How to Determine when a DMA Operation Has Completed

The APU 52 must determine that a DMA operation has completed before it attempts to use the information retrieved by the DMA operation. In the case of segmentation, the APU 52 must determine that the DMA controller 60 has retrieved the entire SAR SDU before it can queue the cell for transmission. In systems where channel parameter entries are kept off chip, the APU 52 must wait for the DMA controller 60 to return the channel parameter entry before attempting to access it.

There are three methods for the APU 52 to determine when a DMA operation has completed.

1. "Branch on Coprocessor Condition 3 True"

The DMA controller 60 generates a DMA_Busy internal signal whenever it is involved in a DMA transfer. DMA_Busy is connected directly to the APU 52's CPCond3 input pin.

Programmers familiar with the R3000 CPU architecture understand that the four CpCond inputs to the R3000 can be tested using a conditional branch instruction. If the APU 52 wished to determine if the DMAC is busy, it can execute a "Branch On Coprocessor Condition 3 True" instruction. If CPCond3 is True (i.e. DMA_Busy is asserted), the DMA Controller 60 is still busy and the APU 52 should not attempt to use the data (i.e. queue the cell for transmission). If CPCond3 is False (i.e. DMA_Busy is not asserted) the DMA controller 60 has finished its operation and the data is valid in the VCR 56.

The APU 52 is free to queue the cell for transmission or read the retrieved data from the VCR 56. If the APU 52 wishes to check that an entire AAL 5 SAR SDU has been fetched from memory before queuing the cell for transmission, it can execute a "Branch on Coprocessor Condition 3 True" instruction where the branch target address is the "Branch on Coprocessor Condition 3 True" instruction itself.

While the DMAC 60 remains busy, this test evaluates as True and the APU 52 loops continuously. Once the DMA operation has completed the test will be evaluated as false and the CPU will fall out of the loop. The next instructions could be the instructions that queue the cell for transmission and jump back to the event parsing routine.

2. "Load w/DMA Busy Considerations, Type 1":

Another scenario exists when the application chooses not to cache channel parameters on-chip. In such a scenario, the APU 52 must gain access to a channel parameter entry in main memory before initiating a SAR SDU DMA operation or Cell Switching operation. The APU 52 must initiate a DMA operation to retrieve the channel parameter entry, use these parameters to build one or more cells, update the channel parameters (i.e. DMA address and Byte Count) and restore the updated parameters to main memory.

In systems using aggressive memory system designs, these channel parameters can be fetched quickly enough to maintain peak rate throughput. However, if several cells are built and sent for each channel, the overhead associated with the retrieval and restoration of these parameters can be amortized over several "Cell Times" minimizing its impact on transmission throughput in systems with slower memory structures. The ideal scenario is, of course, the caching of channel parameters in the VCR 56.

In situations where channel parameter entries are stored in main memory instead of the VCR 56, the APU 52 must be able to sense when the DMA operation used to retrieve the entry has completed. The DMA engine can accomplish this as before with the "Branch on Coprocessor 3 True" instruction or it can accomplish it in a more efficient manner.

Since at some point the APU 52 will need the channel parameter entry information to proceed, the APU 52 can execute a "Load" instruction with a target address equal to the beginning LAC address of the DMA operation. In the normal scenario, a load to the VCR 56 is decoded as 0000 in effective address bits (19:16), by placing a "1" in address bit 22, internal logic will stall the CPU load operation until the first word of the DMA operation has been retired to memory (we will call this a "Load w/DMA_Busy Consideration, Type 1" instruction).

The benefit of this stalling mechanism is that if the first word is available, no cycles are lost and if the first word is not available, the CPU will stall but then immediately recover as soon as the word is retrieved from memory. And of equal importance, the CPU will have accomplished the access as well.

The Branch on Coprocessor 3 True method requires at least two instructions to test the condition and does not result in any transfer of the desired information to the APU 52 register file. Therefore, "Load w/DMA Busy Considerations, Type 1" is a far more efficient way of accomplishing the test.

3. "Load w/DMA Busy Considerations, Type 2":

Under normal circumstances, it is assumed that once the first word is retrieved from memory, the remainder of the words will be retrieved in a deterministic fashion (one every cycle or one every other cycle). Firmware could then simply pace further reads of the information.

To support systems where DMA transfers could be interrupted in the middle of the operation, the ATMizer 50 also supports a "Load w/DMA Busy Considerations, Type 2" instruction. This differs from the "Load w/DMA Busy Considerations, Type 1" instruction in that it forces an APU 52 stall if the DMA controller 60 is busy. The first instruction only forces a stall if the DMA Controller 60 has yet to retrieve the first word of the transaction.

This is a useful mechanism to guard against situations where there may be an unpredictable amount of time between retrieval of the first word of a DMA transaction and the remaining words. "Load w/DMA Busy Considerations, Type 2" is indicated to internal hardware when Effective Address Bit 23 is set to a 1 during Load or Store instructions involving the VCR 56 as the target.

ADDITIONAL DMA STALLING OPERATIONS

If the APU 52 attempts to program a DMA operation into the DMA controller 60 before the DMA controller 60 has completed a pending operation, the DMA engine will assert the CPU stall input forcing the CPU to stall until the DMA operation has completed. As soon as the existing operation completes, the new operation will be loaded into the DMAC 60.

DMA_Rqst will not go low in the case of back to back operations. This allows the ATMizer 50 to indicate that it does not wish to give up the bus at the completion of the DMA operation. External logic should monitor the DMA_OpEnding output to distinguish between separate DMA operation boundaries.

3.6 Parallel Cell Interface (PCI) 62

Figure 16:
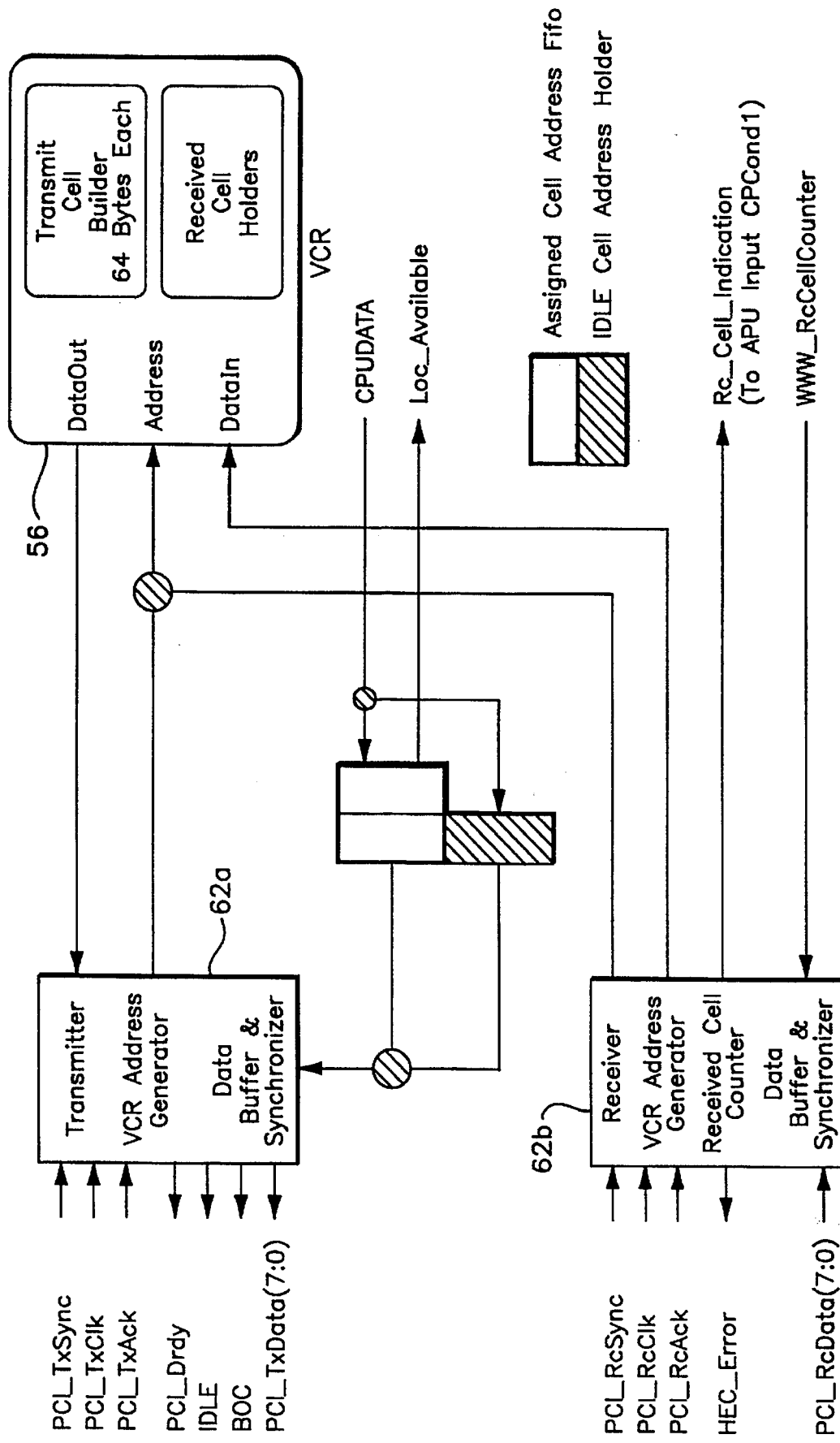
FIG. 16 is a diagram illustrating a Parallel Cell Interface as including ATM port side Transmitter and Receiver functions.

The Parallel Cell Interface 62 contains the ATM port side Transmitter and Receiver functions as illustrated in FIG. 16. The PCI's Transmitter 62a is responsible for taking cells that have been built in the VCR 56 and transferring them one byte at a time to an external ATM line serializer/transmitter. The Transmitter 62a also generates and inserts the HEC and generates and appends a CRC10 field to AAL 3/4 cells.

The Transmitter 62a is also responsible for Cell Rate Decoupling. If there does not exist an assigned cell in the VCR 56 ready for transmission, the Transmitter 62a will automatically send an IDLE cell. The Receiver 62b accepts cells, one byte at a time, from the ATM line parallelizer/receiver and reconstructs these cells in the VCR 56 so that the APU 52 may process them (either reassemble the cell or switch the cell).

The actual size of a cell is user programmable, up to 64 bytes, to support applications that employ extra header fields to convey switch specific information. The actual size of the cell must be a multiple of 4 bytes.

The typical ATM cell is represented in the VCR 56 as a 52 byte entity. The HEC value is generated and inserted into the cell as it is passed out of the ATMizer 50. Therefore, the typical ATM cell adheres to the requirement that it be a multiple of 4 bytes. If the user employees a cell size other than 52 bytes, he must disable HEC generation and checking and he shall be responsible for generating and checking the HEC value externally.

3.6.1 Parallel Cell Interface Transmitter 62a

The Transmitter 62a in the Parallel Cell Interface 62 is responsible for transferring cells from the VCR 56 to the ATM Transmission Convergence Sublayer framing logic utilizing the ATMizer 50's eight bit wide PCI_TxData(7:0) output bus. Cells become available for transmission in the VCR 56 in one of three ways.

3.6.1.1 Transmit Cell Sources

1. Segmentation: In response to an internal or external event, the APU 52 determines that it must segment one or more CS-PDUs or generate a cell from one or more Real Time data buffers. The APU 52 chooses an available Transmit Cell Holder to be used in the cell building process (as described in section 2.3.0). In order to accomplish segmentation, the APU 52 initiates a DMA Read Operation to transfer the SAR SDU from a memory based CS-PDU or Real Time Data Buffer into the VCR 56. The APU 52 is careful to provide the DMA controller 60 with all of the proper address information such that the SAR SDU is transferred into the Transmit Cell Holder in its proper cell location. The APU 52 then generates or retrieves and appends the necessary headers and trailers to the cell and queues the cell for transmission. The APU 52 queues the cell for transmission by writing the VCR 56 starting address of the cell into the Transmitter's Cell Address FIFO.

2. Internal Switching: The ATMizer 50 is capable of transferring cells that arrive over the ATM port side Receiver (PCI_RcData(7:0)) out of the ATMizer 50 utilizing the ATM port side Transmitter without having to pass the cell to main memory. This process works as follows.

All cells arriving into the ATMizer 50 over the ATMizer 50's Receiver Port are written into the VCR 56. The ATMizer 50 sets aside the first 512 bytes (8 Cells) or 1024 bytes (16 Cells) of VCR 56 memory for Received Cell Buffering.

Once a cell is written into the VCR 56 the APU 52 must process the cell. As with all operations, the APU 52 uses cell header fields as an index into a VCR 56 or memory based look up table that contains information on how the cell should be processed. If the look up yields information that indicates that the cell should be sent out over the ATM port side Transmitter, the APU 52 can perform any necessary header manipulation operations (such as VCI or VPI translation and/or congestion notification insertion) before queuing the cell for transmission. The APU 52 queues the cell for transmission by writing the VCR 56 starting address of the cell into the Transmitter's Cell Address FIFO.

3. External Switching: In certain applications, the ATMizer 50 will have access to main memory based cells that have arrived over some other ATM port but need to be transferred out over the ATMizer 50's ATM port side Transmitter. The ATMizer 50 is informed of the need to switch a main memory resident cell through some user defined external event mechanism (through assertion of ATMizer_Int or through APU 52 polling of some mailbox location).

If the ATMizer 50 finds that a cell exists externally (the location of which is likely to be known by convention), it can initiate a DMA operation to bring the cell into the ATMizer 50. Once inside, the cell headers can be modified by the APU 52 (or they may have already been modified by the "ATMizer" that placed the cell in external memory).

Once the cell has been fully retrieved from memory and placed in the VCR 56, the APU 52 queues the cell for transmission by writing the VCR 56 address of the cell into the Transmitter's Cell Address FIFO.

3.6.1.2 Queuing a cell for transmission

As described above, Transmission Cells can be generated in one of three fashions. What is common to each of the scenarios listed above is that the APU 52 queues a cell for transmission by writing an address pointer into the PCI Transmitter 62a's Cell Address FIFO. This address pointer points to where the cell begins in the VCR 56.

The address is passed through the use of a Store Word Instruction with Effective Address Bits (19:16)=1100. The address itself is conveyed to the Cell Address FIFO over the CPU's Data Bus (CPUDATA(11:6)). The address should be 64 byte aligned (i.e. CPUDATA(5:0) should=000000).

If the APU 52 attempts to write an address to the Cell Address FIFO but the Cell Address FIFO is already full, the write operation will cause the APU 52 to enter a stall operation and the APU 52 will remain in the stall operation until the Transmitter finishes sending a cell and a location becomes available in the Cell Address FIFO. The APU 52 can prevent writing an address into a full buffer (and prevent the delays associated with it) by testing the state of the buffer before beginning a segmentation or cell switching application.

As explained previously, the APU 52 learns of an internal event (PRPC 58a time-out) by polling its CPCond2 input (Segment_CS-PDU_Request). CPCond2 is only asserted if a location is available in the Cell Address Buffer. Therefore, if the APU 52 polls CPCond2 and finds that it is true, it knows that a location is available in the Cell Address Buffer. By not clearing the Channel Group Credit Register 58b until after all members of the channel group have been serviced, the APU 52 can sense the state of CPCond3 in between segmentation operations to insure that a location is available in the Cell Address Holder before branching to the segmentation routine.

If CPCond3 is not asserted at a time when the APU 52 knows that a bit is set in the Channel Group Credit Register 58b, the APU 52 knows that CPCond2 is temporarily deasserted due to the fact that the Cell Address FIFO is full. The APU 52 would then forgo the segmentation routine and check to see if there are any Received Cells in need of processing or external messaging requests that need to be resolved. In this fashion the APU 52 manages to pace itself so that it does not allow the segmentation process to get ahead of itself.

The Cell Address FIFO mentioned above is a two deep FIFO that holds the VCR 56 addresses of cells that are ready for transmission. When the Transmitter reaches the end of a cell, it checks the Cell Address FIFO to see if an address exists for a completed cell. If it does, the PCI's Transmitter 62a will automatically begin fetching the new cell from the VCR 56 and sending it, one byte at a time, to the external transmission convergence framing logic over PCI_TxData (7:0). If an address does not exist in the Cell Address FIFO when the end of the present cell is reached, the Transmitter performs Cell Rate Decoupling.

3.6.1.3 Cell Rate Decoupling

As part of its start up code and prior to initiating Transmitter operations, the APU 52 must build a complete "IDLE Cell" in the VCR 56 and pass the address of the idle cell to the Transmitter by writing it into the "IDLE Cell Address Register". The IDLE cell pattern should be the same length as the user defined cell size. By designating an area in the VCR 56 as the IDLE Cell Holder, a user is free to generate an IDLE cell that matches his switch specific structure.

During normal operation, if the ATMizer 50 reaches the end of the current cell and no other address is available in the Cell Address FIFO, it will send the cell that resides in the VCR 56 location pointed to be the IDLE Cell Address Register (most likely but not necessarily an "IDLE cell"). The ATMizer 50 will assert its PCI_IDLE output pin to inform external logic that the cell it is transmitting is an IDLE cell. Please refer to section 11 for detailed timing of PCI_IDLE assertion and deassertion.

3.61.4 Preparing the Transmitter to Transmit

When the ATMizer 50 powers up, the contents of the VCR 56 and the IDLE Cell Address Register are both undefined. External logic must not attempt to clock data out of the ATMizer 50 before the ATMizer 50 has had a chance to initialize at least the IDLE cell generation circuitry. As part of its reset routine, the APU 52 must create the IDLE cell pattern in the VCR 56 and set the IDLE Cell Address Register to point to this cell structure.

Once the APU 52 has done this it can enable the Transmitter and initiate the IDLE Cell generation process by setting the "Cells Available" bit in the control register. As soon as the PCI Transmitter 62a sees the "Cells Available" bit set, it will begin fetching and transmitting the IDLE cell pattern. As soon as the APU 52 queues an assigned cell for transmission by writing its start address into the Cell Address FIFO, the Transmitter will send the assigned cell after reaching the end of the current IDLE cell transmission.

External logic can abort the sending of a cell by asserting the PCI_TxSync input. If PCI_TxSync is asserted prior to the APU 52 setting the Cells Available bit, the Transmitter will not react to its assertion. It will remain idle. If PCI_TxSync is asserted after the APU 52 has generated the IDLE pattern and set the Cells Available bit, the Transmitter will react to the assertion of PCI_TxSync be suspending transmission of the existing cell and immediately beginning Transmission of a new cell. If there is an address available in the Cell Address FIFO, the PCI Transmitter 62a will begin fetching and sending the cell pointed to by that address. If no address is available then the PCI 62 will fetch and send the IDLE cell pattern.

A short period of time exists between the assertion of PCI_TxSync and the Transmitter's ability to access the first byte of cell data from the VCR 56. External logic must be careful not to assert the data acknowledgment (PCI_TxAck) input until the ATMizer 50 has successfully retrieved the first byte of data from the VCR 56 and sourced it onto PCI_TxData(7:0).

The ATMizer 50 indicates to the outside world that it has retrieved the first byte of data by asserting its DRDY output. After system reset or transmitter synchronization, external logic must wait for the ATMizer 50 to assert DRDY before proceeding (i.e. asserting PCI_TxAck). DRDY is deasserted in response to either of the two reset events described above. Once DRDY is asserted it will remain asserted and data will continue to be sourced onto PCI_TxData(7:0) as long as PCI_TxClk remains within specification.

In addition to the IDLE and DRDY signals, the Transmitter asserts BOC (Beginning of Cell) each time it has placed the first byte of data for a cell onto PCI_TxData(7:0).

3.6.2 Parallel Cell Interface Receiver 62b

The Receiver in the Parallel Cell Interface 62 is responsible for accepting bytes of cell data from the ATM port side Receiver's PCI_RcData(7:0) bus and using these bytes of data to reconstruct cells in the VCR 56. The Receiver 62b is also responsible for informing the APU 52 that a cell has arrived by triggering an internal "Received_Cell_Indication" event.

Upon detecting the arrival of a cell, the APU 52 can read the cell header and use it as an index into a VCR 56 based or memory based look up table. From this look up the APU 52 determines the AAL type used for the VC and the operation/s that must be performed on the cell. The options are as follows:

3.6.2.1 Received Cell Handling Options

The received cell handling options in a dual port switch/termination station are illustrated in FIG. 17.

1. Reassembly: The APU 52 can choose to reassemble the cell into a CS-PDU in memory by initiating the appropriate DMA operations. In the case of reassembly, the DMA controller 60 is configured with the VCR 56 address of the SAR SDU, the memory address of the CS-PDU and the appropriate transfer length count. The DMA controller 60 then automatically accomplishes the reassembly operation through a series of memory write transfers.

2. Internal Switching: The ATMizer 50 is capable of transferring cells that arrive over the ATM port side Receiver out of the ATMizer 50 utilizing the ATM port side Transmitter without ever passing the cell out to main memory. See section 2.8.1 for more information on internal switching.

3. External Switching: In certain applications, the ATMizer 50 will want to pass entire cells, headers and trailers intact, to some other ATM port interface that has access to the same memory space as the ATMizer 50 (perhaps it iS another ATMizer 50).

In such a situation, the ATMizer 50 may choose to first execute one or more header manipulation operations before transferring the cell to the centralized memory structure. After performing these operations, the ATMizer 50 initiates a DMA operation to transfer the cell to memory so that another ATM port interface can gain access to it. After transferring the cell to memory the ATMizer 50 can alert another port interface to the availability of the cell by asserting one or more Parallel Port 64 output pins or by writing to a memory mapped mailbox location.

4. Discard the Cell: The APU 52 can chose to discard the cell by writing to the Received Cell Counter without initiating any DMA operations. If the APU 52 wishes to count IDLE cells, it can first increment the IDLE cell counter before proceeding. In addition, the APU 52 may wish to react to CRC10 errors by simply discarding the cell.

3.6.2.2 Received Cell Indication. How the APU 52 Recognizes that Cells are Awaiting Processing in the VCR 56.

A general signal timing diagram is illustrated in FIG. 18.

As mentioned above, once the ATM port side Receiver has reconstructed a cell in the VCR 56, it indicates this to the APU 52 by asserting the internal signal "Received_Cell_Indication". Received_Cell_Indication is connected internally to the APU 52's CPCond1 input pin.

The APU 52 can check for the presence of received cells that have yet to be processed by periodically polling CPCond1 using the "Branch on CPCond1 True" instruction. If the APU 52 senses that CPCond1 is set (i.e. a cell is available) it can then begin processing the cell. The logic in the PCI Receiver 62b that generates Received_Cell_Indication is an up/down counter.

Each time a cell arrives the counter counts up by one. Each time that the APU 52 processes a cell it lowers the count by one by writing to a special location in the PCI 62 that causes the counter to count down. Therefore, if the APU 52 becomes occupied handling certain boundary conditions or gets blocked from the memory backplane for a period of time, cells will begin piling up in the VCR 56 and the Received Cell Count will continue to rise.

Once the APU 52 frees up it should immediately begin draining the Received Cell Buffer. Each time it processes a cell it reduces the Received Cell Counter by one and then immediately checks to see if additional cells are in the VCR 56 by polling its CPCond1 input. If CPCond1 remains asserted cells have accumulated in the Receiver and should be drained before processing any pending segmentation requests.

Of course, the system designer may wish to interleave segmentation handling in with Received Cell draining. This is acceptable but it does prolong the period of time required to drain the Received Cell Buffer and increases the chance that a busy backplane will cause eventual Received Cell Loss.

If the Receivers cell buffer overflows cells will no longer be written into the VCR 56 until a locations is freed up. The Overflow signal is sent off chip as PCI_RcBuffOver to inform the outside world of this condition. It is also attached internally to APU 52 interrupt five. If APU 52 interrupt five is enabled in the APU 52, the APU 52 will recognize the interrupt, otherwise it will not be informed of the condition.

3.6.3 HEC Generation and Checking

In applications that generate and check their own HEC values, ATMizer 50 HEC generation can be disabled by asserting the HEC Disable bit in the System Control register. If a cell of size other than 52 bytes (53 including the HEC) is used, internal HEC generation should be disabled. When HEC generation is enabled, the PCI_HECError pin is an output pin that indicates whether an HEC error was detected on an incoming cell.

Cells arriving with HEC errors are discarded by the PCI Receiver 62b and external circuitry is informed by the assertion of PCI_HECError. If HEC generation is disabled, no HEC checking will be performed.

When configured with HEC generation disabled, PCI_HECError acts as an input pin. External logic can prevent the ATMizer 50 from writing a corrupted cell into the VCR 56 by asserting PCI_HECError while providing the first byte of the SAR PDU to the Receiver. External logic should not suspend cell transfer to the ATMizer 50 when an HEC error is encountered. It should continue with cell transfer but simply inform the ATMizer 50 to discard the cell by asserting PCI_HECError.

3.6.4 External Buffering of Received Cells

The PCI Receiver 62b supplies a signal that can be used by external logic to prebuffer received cells. The PCI_RcBuffHalf output indicates to the Transmission Convergence framing logic that the internal Received Cell Holder buffer in the VCR 56 has reached or exceed one half full. External logic can use this signal to switch cell buffering over to an xKx8 SRAM buffer.

This buffer would be a dual port buffer that logically had a read port and a write port. IDLE cells would be filtered before entering this buffer. Once the APU 52 has processed a number of cells in the VCR 56 and PCI_RcBuffHalf is deasserted, external logic could begin transferring the cells queued up in the external SRAM into the ATMizer 50 for processing (maintaining FIFO sequentiality).

3.6.5 Frequency Decoupling

The ATMizer 50 contains all of the logic necessary for decoupling the ATMizer 50's internal clock (i.e. the system clock) from the clock rates of the transmission lines. The user clocks byte wide data out of the ATMizer 50 relative to the byte clock that is used to drive the transmission line and clocks data into the ATMizer 50 relative to the byte clock derived from the received data stream.

All frequency decoupling and metastability issues are dealt with inside the ATMizer 50's Parallel Cell Interface 62 circuitry. The ATMizer 50 uses a simple handshake acknowledgment mechanism to allow external logic pause data transfers between the ATMizer 50 and the line transceivers. Such a stall may be required if external logic suspends the cell stream in order to generate and send or extract transmission convergence layer framing overhead. Much more can be found on this interface in section 11.0.

3.7 Parallel Port 64

The ATMizer 50 includes an eight bit Parallel Port 64 that can be used to accomplish a variety of data transfer and control transfer operations between the APU 52 and the outside world. Parallel Port 64 access differs from DMA access in the following fashion:

1. The Parallel Port 64 can be read and written by the APU 52 directly, utilizing Load Byte and Store Byte instructions. The DMA controller 60 allows only indirect APU 52 access to memory mapped devices (the APU 52 programs the DMAC 60 to transfer data between the VCR 56 and memory mapped devices).

2. The Parallel Port 64 is also unique in that it can be accessed by the APU 52 when the DMA engine is busy. In this fashion the parallel port gives the APU 52 an ability to control DMA operations simultaneously to the operation. This may be of use in switching applications if the APU 52 wishes to notify another switching port that it is about to source a cell targeted to it onto the memory backplane.

3. The Parallel Port 64 can also be used to control physical devices by mapping certain Parallel Port 64 data bits to certain hardware functions.

4. The Parallel Port 64 can also be used in the ATMizer <-> Host messaging system. The Host processor can pass a message to the ATMizer 50 by writing an 8 bit message code to a parallel port mapped register and then asserting ATMizer 50_Int. The APU 52, polling ATMizer_Int, branches to the messaging routine, reads in the register and takes the appropriate action based on the message code retrieved. Or, the ATMizer 50 can simply poll certain control information from the Parallel Port 64.

The Parallel Port 64 has a one deep write buffer in it. Writes to the Parallel Port 64 when the write buffer is empty will not stall the APU 52. Writes to the Parallel Port 64 when the write buffer is full will result in the APU 52 stalling until the write in the write buffer is retired to memory. The APU 52 will stall when reading the Parallel Port 64 if the Parallel Port 64's write buffer is full or if external hardware prolongs the read operation by withholding assertion of PP_RdWrAck.

In addition to 8 data bits, Parallel Port 64 accesses provide 4 address bits to distinguish between up to 16 external devices. The Parallel Port 64 sources the address bits transferred over CPUAddress(5:2) during APU 52 Load or Store operations that target the Parallel Port 64.

4.0 The System Control Register

Certain functions within the ATMizer 50 are programmable and must be configured at system reset time. All ATMizer 50 configuration information is stored in the System Control Register that is written by the APU 52 as part of its initialization routine. The System Control Register is programmed using a Store Word instruction. CPUData (31:0) is written into the fields of the System Control Register as illustrated in FIG. 19.

BUFFER SIZE

Buffer Size determines the size of the Received Cell Holder Buffer. Received cells are written into the VCR 56, one per 64 byte block, starting at location 0. The high order address is determined by the Buffer Size field.

| | |
|---|---|
| 0001 Buffer Size = 2 | 0100 Buffer Size = 8 |
| 0010 Buffer Size = 4 | 1000 Buffer Size = 16 |

CR—CELLS READY

The APU 52 sets the Cells Ready bit once it has configured the System Control Register, built an IDLE cell in the VCR 56 and passed a pointer to the IDLE cell to the IDLE cell address holder in the PCI Transmitter 62a. The PCI Transmitter 62a will not attempt to source any cell data onto its output bus until Cells Ready is asserted. Once asserted, the PCI Transmitter 62a fetches a cell (either the IDLE cell or an assigned cell if the APU 52 writes a cell address into the Cell Address FIFO before setting Cells Ready) from the VCR 56 and sources it over PCI_TxData(7:0).

DH—DISABLE HEC GENERATION AND CHECKING

In applications that generate and check their own HEC values, ATMizer 50 HEC generation can be disabled by asserting the HEC Disable bit in the system control register. If a cell of size other than 52 bytes (53 including the HEC) is used, internal HEC generation should be disabled. When HEC generation is enabled, the PCI_HECError pin is an output pin that indicates whether an HEC error was detected on an incoming cell.

Cells arriving with HEC errors are discarded by the PCI Receiver 62b and external circuitry is informed by the assertion of PCI_HECError. If HEC generation is disabled, no HEC checking will be performed.

When configured with HEC generation disabled, PCI_HECError acts as an input pin. External logic can prevent the ATMizer 50 from writing a corrupted cell into the VCR 56 by asserting PCI_HECError while providing the first byte of the SAR PDU to the Receiver. External logic should not suspend cell transfer to the ATMizer 50 when an HEC error is encountered. It should continue with cell transfer but simply inform the ATMizer 50 to discard the cell by asserting PCI HECError.

CTR 4/5—COUNTER 4/5

When CTR 4/5 is set, PRPCs 4 and 5 are tied together into a 24 bit timer/counter. PRPC 4 forms the low order 12 bits of the timer/counter and PRPC 5 forms the high order 12 bits of the timer/counter.

CTR 6/7—COUNTER 6/7

When CTR 6/7 is set, PRPCs 6 and 7 are tied together into a 24 bit timer/counter. PRPC 6 forms the low order 12 bits of the timer/counter and PRPC 7 forms the high order 12 bits of the timer/counter.

CELL SIZE

The ATMizer 50 supports a user defined cell size from 52 bytes up to 64 bytes. The actual cell size to be used is programmed into the Cell Size field by the APU 52 during system reset. The APU 52 must program Cell Size before setting the Cells Ready bit.

5.0 ATMizer 50 Memory Map

A map of the memory of the ATMizer 50 is illustrated in FIG. 20.

Except where noted below under VCR 56 Notes (Load w/DMA Busy Considerations, Type 1 and 2 Instructions) and under DMA Notes (DMA Operation Initialization instruction), all internal access should be initiated with CPUAddress(31:20) set to 0s.

VCR 56 NOTES

If Address Bit 22 is set during a VCR 56 Read Operation we are executing a "Load with DMA Busy Considerations, Type 1" instruction and the APU 52 will stall if the first word of the DMA operation has not been retired to the VCR 56.

If Address Bit 23 is set during a VCR 56 Read Operation we are executing a "Load with DMA Busy Considerations, Type 2" instruction and the APU 52 will stall if the DMA operation has not completed.

| DMAC NOTES | |
|---|---|
| CPUAddress(31:30) | Local Offset Register |
| CPUAddress(29:24) | Transfer Length Counter |
| CPUAddress(21) | Ghost Bit |
| CPUAddress(20) | Operation Direction (Rd Vs Wr) |
| CPUAddress(11:2) | Local Address Counter |
| CPUData(31:0) | Memory Address Register/Memory Address Counter/Memory Offset Register |

| PRU NOTES | | | | | | | | | |
|---|---|---|---|---|---|---|---|---|---|
| RRR | PRPC | RRR | PRPC | RRR | PRPC | RRR | PRPC | | |
| 000 | PRPC0 | | 010 | PRPC2 | | 100 | PRPC4 | 110 | PRPC6 |
| 001 | PRPC1 | | 011 | PRPC3 | | 101 | PRPC5 | 111 | PRPC7 |
| BBB | CRB | BBB | CRB | BBB | CRB | BBB | CRB | | |
| 000 | Bit0 | 010 | Bit2 | 100 | Bit4 | 110 | Bit6 | | |
| 001 | Bit1 | 011 | Bit3 | 101 | Bit5 | 111 | Bit7 | | |

The RRR field determines which of the eight Peak Rate Pacing Counter Initialization Registers are the target of the write operation.

The BBB field determines which bit of the Credit Register 58b is targeted for being cleared. A write to the Credit Register 58b clears the Credit Bit associated with the PRPC 58a addressed by the BBB field. Reading the Credit Register 58b returns the 8 bit Credit Register 58b Value on Data Bits (7:0). The BBB field is ignored on reads.

If the I bit is set to 1 the Initialization value is immediately written into both the Initialization register and the Peak Rate Pacing Counter 58a, overwriting the values in each of these structures. If the I bit is set to 0, the Initialization register is written but the counter 58a is allowed to continue with its count. Once the count reaches zero, the new initialization value will be written into the Peak Rate Pacing Counter 58a.

PCI NOTES

When the PCI 62 Address FIFO is written, the value of the CCC field (the command field) is used to determine what actions the transmitter should take in regards to the cell being queued for transmission. If bit 9 is set, the Transmitter will Force an HEC Error (HEC generation must be enabled). If bit 8 is set, the Transmitter will calculate and insert a 10 bit CRC10 value for this cell.

In this fashion, the ATMizer 50 can support AALs 1, 2, 3/4 and 5 simultaneously because a CRC10 is only generated by the PCI 62 when it is instructed to do so by the processor. If bit 7 is set, the Transmitter will force an error in the CRC10 encoding (Big 8 must be set as well).

The CRC10 error register is a 16 bit register that contains one bit for each Received Cell Holder. If a CRC10 error is detected for a cell in the corresponding received cell holder, the corresponding CRC10 error register bit is set.

If a VC is determined to be an AAL 2 or AAL 3/4 VC, the APU 52 must check the CRC10 error register for an indication of a CRC10 error. If the VC is determined to be an AAL 1 or AAL 5 VC, the APU 52 will not check the CRC10 error bit for that Received Cell Holder. In this fashion the ATMizer 50 can support simultaneously, cells of all AAL types.

Parallel Port 64 NOTES

The address indicated in the four bit field marked AAAA is sourced onto PP_Address(3:0) during parallel port read and parallel port write operations.

6.0 The ATMizer 50's Interrupt Structure and CpCond Hookups

INTERRUPT STRUCTURE

The R3000 CPU has six interrupt inputs. Each of these interrupts can be enabled or disabled by software running on the APU 52 (see MIPS assembly language programmer's guide). The ATMizer 50 uses all six of the APU 52's interrupt pins for a variety of purposes. User firmware may chose to enable and use any of these interrupts or may instead chose not to implement interrupts and interrupt handling.

| Interrupt 1 | Counter/Timer 4/5 time-out (Only asserted |
| if | PRPC4/5 configured as counter/timer) |
| Interrupt 2 | Counter/Timer 6/7 time-out (Only asserted |
| if | PRPC 6/7 configured as counter/timer) |
| Interrupt 3 | General Purpose External Interrupt 1 |
| Interrupt 4 | General Purpose External Interrupt 2 |
| Interrupt 5 | Received Cell Buffer Overflow |
| Interrupt 6 | Received Cell Buffer Half Full |

CPCOND CONNECTIONS

The APU 52 can check the state of any one of the CpCond inputs by executing a "Branch on Coprocessor x Condition Input True/False" instruction. ATMizer Int differs from GP_Int1 and GP_Int2 in that it is not an interrupt in the classic sense but simply a signal whose state can be tested when so desired by the APU 52 by issuing the "Branch on CPCond0 True/False" instruction.

CPCond0 Connected to ATMizer 50_Int external pin

CPCond1 Connected to Receive Cell Indication

CPCond2 Connected to PRU's Transmit Request Output (i.e CGCR 58b has a bit set)

CPCond3 Connected to DMA_Rqst 7.0 Programming the ATMizer 50

Figure 21:
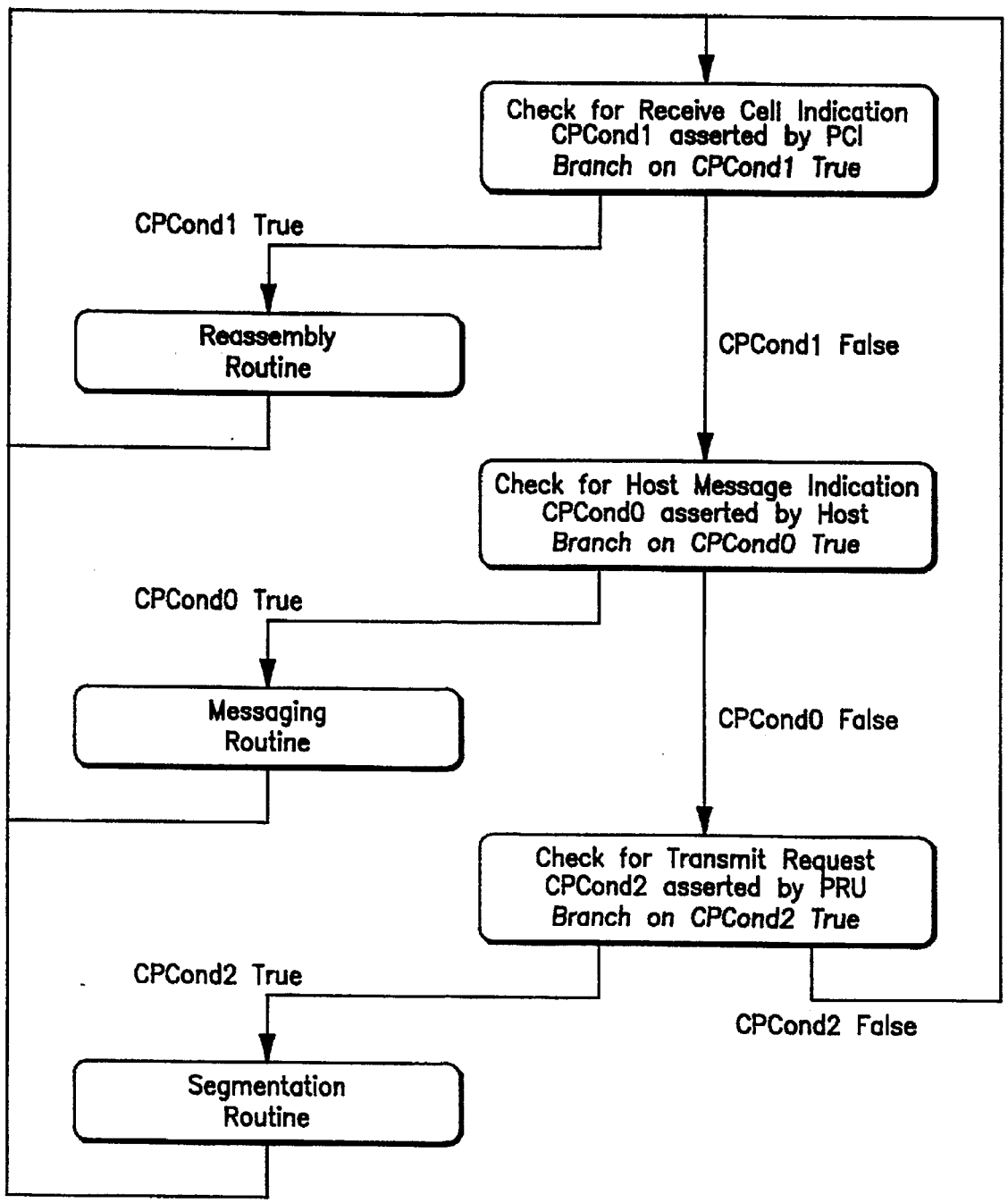
FIG. 21 is a flowchart illustrating an IDLE loop of the ATMizer.

No two ATMizer 50 applications are likely to be identical, and therefore each system designer will create APU 52 firmware specifically tailored to his system implementation. In general though, it can be shown that the basic firmware routine will revolve around the IDLE loop illustrated in FIG. 21 which checks for the existence of one of three conditions and takes the appropriate actions if one of the states exists.

The order in which the CpCondx pins are tested in our sample IDLE routine is significant. In our sample system we always check for Received Cell Indication first. The reason for this is that it is more important not to drop a received cell (if the received cell buffer overflows) than it is to prevent an IDLE cell from being transmitted.

| IDLE | |
|---|---|
| BCP1 True Receive Cell receive | If RcInd is asserted jump to the cell routine |
| LDW R8 R24 received cell | Load in the ATM Header of the |
| BCP0 True Message jump to the message routine NOP | If ATMizer 50_Int is asserted |
| BCP2 True Transmit Cell transmit cell routine | If TXReq is asserted jump to the |
| LW R1, PRUCB(R0) Group Credit Register) channel banks have expired | Get the eight bit CGCR (Channel 58b value representing which |

Therefore, we always check for received cell indication before checking for either a Host messaging request or a transmit cell request. Furthermore, because the ATMizer 50 can be asked to accomplish certain complex functions, the possibility exists that the servicing of either a received cell indication, transmit cell request or message request could take longer than the time normally allotted in steady state operation (approximately 65 instructions for transmit cell requests and received cell processing at 50 MHz). As a result, cells may accumulate in the VCR 56 and firmware may wish to always drain this buffer before occupying the memory backplane with segmentation data transfers.

8.0 ATMizer <-> Host Messaging

The ATMizer 50 is further capable of messaging with a host in a manner which can be programmed into the system firmware.

9.0 The ATMizer in Operation

Figure 22:
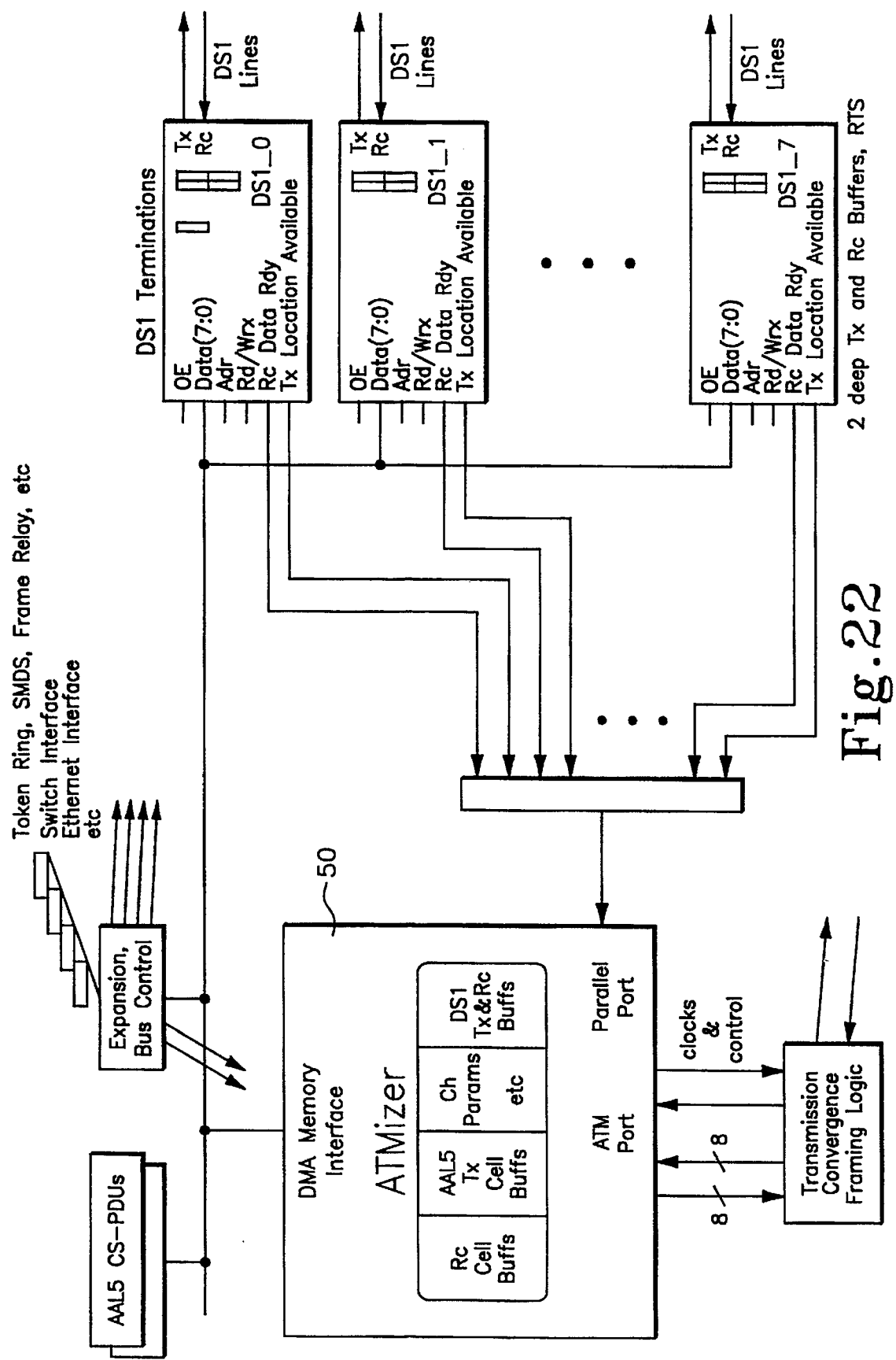
FIG. 22 is a diagram of the ATMizer in a system supporting AAL 1 and AAL 5 circuit termination and cell switching.

A diagram of the ATMizer 50 in a system supporting AAL 1 and AAL 5 circuit termination and cell switching is illustrated in FIG. 22.

9.1 Data Types Supported

The ATMizer 50 is capable of handling a combination of data types from a variety of data sources. In general, if the necessary data and control information (i.e. the Residual Time Stamp values for AAL1 connections) can be accessed by the ATMizer 50 from a memory mapped entity (either RAM or a peripheral interface controller) the ATMizer 50 can create an ATM cell or cell stream from the data source.

This applies to real-time data stream sources such as DS1 line termination as well as to packet generating sources such as workstations, packet-based LANs and WAN interfaces. This also applies to the switching of ATM cells to and from other ATM ports or switching fabrics as long as the switching fabric is mapped into the ATMizer 50's DMA memory space or accessible over the ATMizer 50's Parallel Port 64 interface.

9.2 The Cell Generation Process—An Overview

It is important to understand that almost all aspects of the cell generation process are controlled by the ATM Processing Unit (APU) 52 under user firmware control. To accomplish segmentation, the APU 52 functions as an event driven device. A segmentation triggering event can be an external event such as the filling of a DS1 buffer or an internal event such as the timing out of one of the eight on-chip Peak Rate Pacing Counters (PRPCs) 58a.

The APU 52 learns about external events by periodically polling a DMA memory mapped or Parallel Port 64 memory mapped register that has a bit associated with each external triggering event or by polling its ATMizer_Int signal for an indication that an external event has occurred. Polling ATMizer_Int is a faster mechanism because its state can be tested with a single APU 52 instruction (Branch on Coprocessor Condition 0 True).

However, since ATMizer_Int is expected to be used as part of the host-to-ATMizer messaging system, the assertion of ATMizer_Int may have to be qualified by access to a "message type" field or register somewhere in DMA or Parallel Port 64 memory space. This field indicates the reason for which external logic asserted ATMizer_Int. In our example, the value would indicate that ATMizer_Int was asserted to alert the ATMizer 50 to a DS1 buffer full condition.

An internal triggering event most likely consists of the time-out of one or more Peak Rate Pacing Counters 58a. In general, internal events are used to pace the segmentation of CS-PDUs while external events are used to pace cell generation from real time data streams.

When one or more counters 58a times-out the Pacing Rate Unit 58 responds by asserting the Coprocessor Condition 2 (CpCond2) input to the APU 52. The APU 52 frequently checks the state of this input by executing a single Branch on Coprocessor Condition 2 True instruction. If the APU 52 senses CpCond2 asserted it branches to the Segmentation routine and reads in an 8 bit value from the CGCR 58b that indicates which counters have expired.

The APU 52 can then proceed to segment the CS-PDUs associated with the Peak Rate Pacing Counter/s 58a that have expired. Since the APU 52 can read the CGCR 58b at any time, even in the midst of servicing a Channel Group, the User is able to implement almost any channel priority scheme that fits the application.

9.2.1 AAL 1 Real-Time Data Streams

The ATMizer 50 is capable of generating AAL 1 SAR—PDUs from memory mapped data buffers. In most cases, data streams such as DS1 lines will be terminated and synchronized to the ATMizer 50's system clock then pre—buffered in dual 48 byte buffers in main memory.

Once a buffer fills, the ATMizer 50 can be instructed (through an external event) to retrieve the SAR User Payload, retrieve (RTS) or generate (SN/SNP) and append the SAR Header and transfer the cell to the transmission convergence framing logic using the Transmitter 62a in the ATMizer 50's Parallel Cell Interface 62.

As the ATMizer 50 is generating a cell from one buffer the other buffer is being refilled by the real-time data source. Eventually the second buffer will fill and the first buffer will become the active fill buffer. ALL 1 data streams are continuous in time. The APU 52 under user firmware control creates the Sequence Number and Sequence Number Protection fields internally but is passed the Residual Time Stamp field from an external device.

Residual Time Stamp values can be passed to the ATMizer 50 in byte 0 of the SAR SDU (the logical positioning, in this case external logic calculates the RTS and writes it into the data buffer) or the APU 52 can proactively retrieve the RTS value, when needed, utilizing either the Parallel Port 64 or DMA Engine.

The APU 52 is responsible for implementing RTS and SN/SNP interleaving on transmission and for passing the SAR SDUs and RTS values to the appropriate buffers and interfaces and SN/SNP checking on reassembly. The actual AAL1 cell generation and received cell handling routines shall be written by the user.

Figure 23:
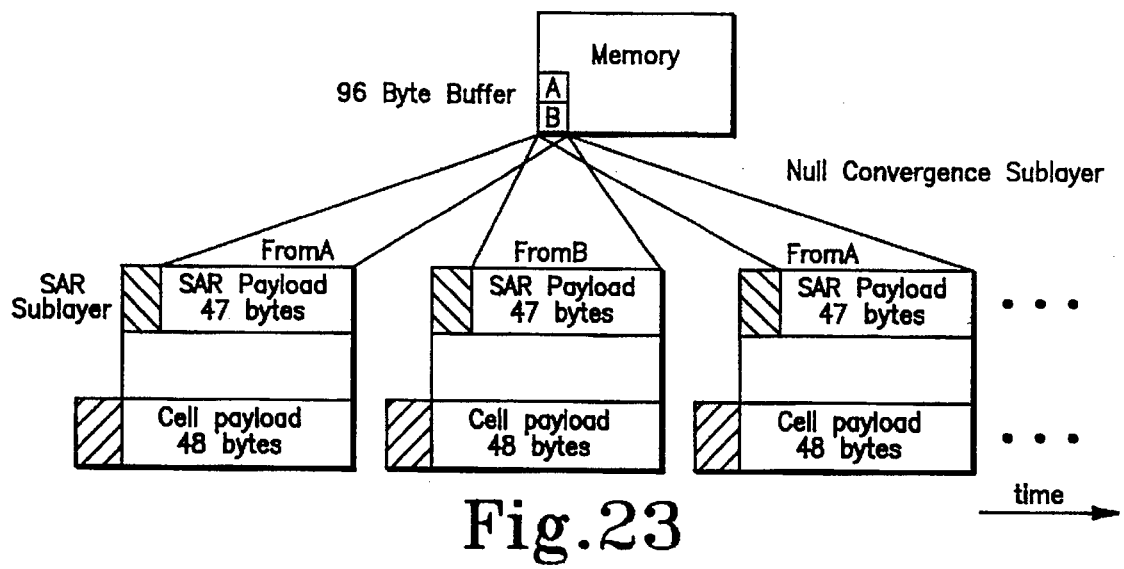
FIG. 23 is a diagram illustrating AAL1 circuit emulation and data buffering as performed by the ATMizer 50.
Figure 24:
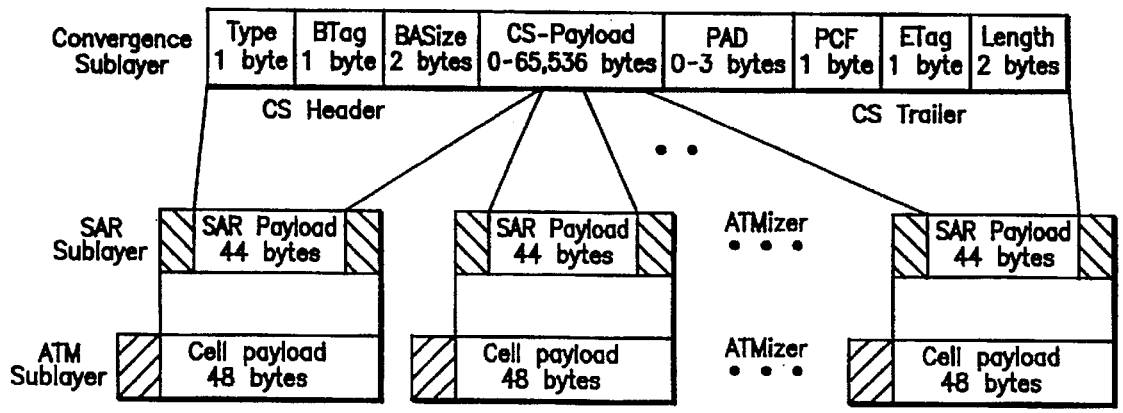
FIGS. 24 and 25 are diagrams illustrating AAL 5 CD-PDU segmentation.
Figure 25:
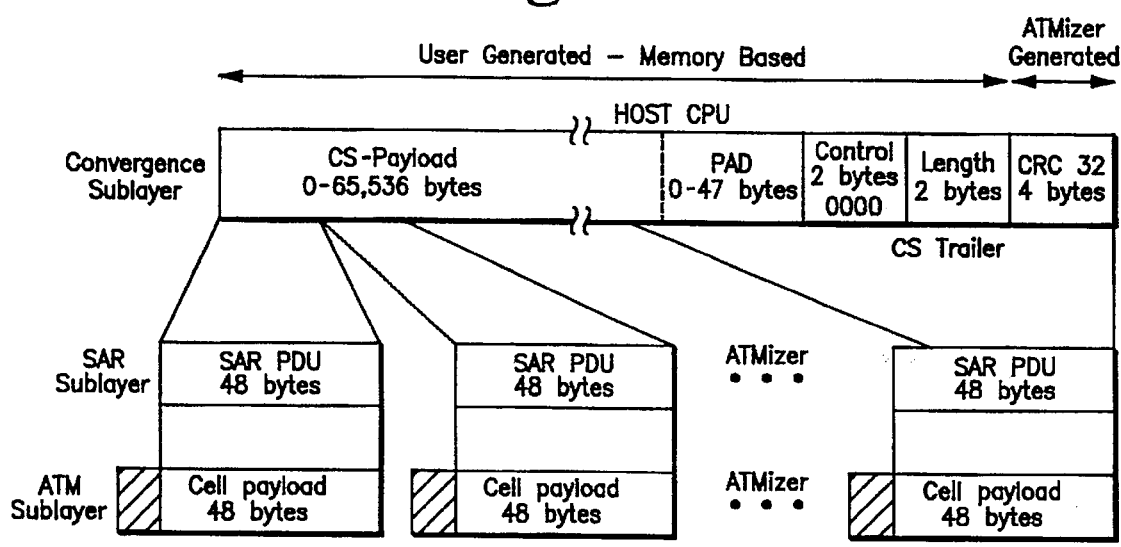

FIG. 23 illustrates AAL1 circuit emulation and data buffering as performed by the ATMizer 50, whereas FIGS. 24 and 25 illustrate AAL 5 CD-PDU segmentation.

In situations where DSls are to be sourced over an ATM port, the low data rates of the DSls allow for multiple such lines to be handled with ease. In low speed applications, the ATMizer 50 itself can be programmed to handle the transfer of data from a small word buffer in the DS1 physical interface device to the dual 48 byte buffers in main memory.

In some applications the VCR 56 itself could provide the dual data buffer functionality. Using the ATMizer 50 in this fashion alleviates the need for intelligent DMA operations at the DS1-main memory interface and simplifies memory controller design.

Since the overhead on the ATMizer 50 to facilitate these transfers is quite high, such "dumb" DS1 ports may only be usable at ATM port speeds at or below DS3 rates. It is up to the user to make a final determination if a chosen implementation can sustain the desired throughput rates.

9.2.2 AAL 3/4 and 5 CS-PDUs Segmentation

AAL 5 CS-PDU Segmentation is illustrated in FIGS. 24 and 25.

If an internal event occurs (a PRPC 58a has expired forcing the assertion of CpCond2), the APU 52 determines which PRPC/expired by reading the Channel Group Credit Register 58b. The APU 52 then begins to parse through the list of Channel Parameter Entries that are attached to the expired PRPC 58a segmenting a number of cells from each CS-PDU before proceeding on to the next entry in the Channel Group (this is all by software design, the ATMizer 50 is APU 52 driven and different concepts of how segmentation should be controlled are both imaginable and supportable).

As the APU 52 parses through the Channel Parameter Entries in the Channel Group, it can generate one or more cells from a given CS-PDU before proceeding on to the next Channel Parameter Entry in the list. Again, depending on the application this list will either be VCR 56 resident or main memory resident with the tradeoff being that VCR 56 resident lists have limits on their sizes (i.e. a limit on the number of channels that can be active simultaneously) but allow for less costly memory system implementations while memory based lists have few restrictions on their size but may require fast SRAM to support the processors need for fast access to the entry (as well as fast access to restore the updated entry to memory at the end of the segmentation/cell generation burst for each Channel Parameter Entry/CS-PDU).

CONTIGUOUS CS-PDUS

In the most straight-forward of system implementations, AAL 3/4 and 5 CS-PDUs are created in system memory by a host processor. The ATMizer 50's job is to segment these CS-PDUs into a series of SAR-SDUs, generate and append ATM Adaptation Layer headers and trailers and ATM headers to the SAR-SDUs and then transfer the newly built cells to the external Transmission Convergence Sublayer framing logic one byte at a time using the Transmitter portion of the ATMizer 50's Parallel Cell Interface (PCI) 62.

CS-PDUs undergoing segmentation will be resident and contiguous in system memory prior to the ATMizer 50 beginning the segmentation process. In addition to performing segmentation and ATM cell generation, the ATMizer 50 will also calculate the CRC32 for AAL 5 CS-PDUs and append the resulting 4 bytes of CRC32 code to the end (bytes 50–53) of the last cell generated from the given AAL 5 CS-PDU. The host processor constructs the entire AAL 3/4 or 5 CS-PDU in system memory but, in the case of AAL 5, should stuff all zeros into the last four bytes (the CRC32 field).

NON-CONTIGUOUS CS-PDUS—THE "GATHER" FUNCTION OF SCATTER-GATHER DMA

In more complicated system environments, CS-PDUs may be resident in memory in a non-contiguous fashion. This may occur in ATM network interface card applications if the operating system builds higher layer header fields apart from the actual "User Payload" portion of the packet or if headers from different layers are created physically separate though logically belonging to the same CS-PDU.

It may also occur if the User Payload field consumes more than one page in a virtual memory system and memory management software allocates non-contiguous pages to the application. Forced moves to create a contiguous CS-PDU are wasteful of system resources and time. Fortunately, such moves are unnecessary in systems employing the ATMizer 50.

In routing applications (or CSU/DSU applications), the system designer may wish to provide for the segmentation of packets (CS-SDUs) prior to their complete arrival. Segmenting a CS-SDU as it arrives reduces the amount of buffer memory required in the bridging mechanism. It also reduces the latency attributable to the router. In applications employing ATM Adaptation Layer 5, the ATMizer 50 can begin packet segmentation as soon as enough bytes arrive for the host processor to establish the route and before the host processor has built the CS-PDU trailer.

In addition, the memory allocation mechanism of the router may allocate memory to incoming packets in blocks of size less than the maximum packet size (these blocks are referred to as memory "fragments"). This is useful in applications where packet sizes can vary dramatically. Small packets may take up a single memory "fragment" while much larger packets may require the allocations of several "fragments".

The ATMizer 50 proceeds through the segmentation process "one fragment at a time"; communicating with the host processor or accessing a link list of the CS-PDU from system memory as fragment boundaries are reached.

In "Gather" applications, the APU 52 will periodically reach the end of a particular CS-PDU fragment. The APU 52 must be able to determine if it has reached the end of a fragment or if it has actually reached the end of the CS-PDU. This information is needed to insure that the APU 52 does not prematurely insert an EOM (or SSM) identifier into the SAR Headers of AAL 2 and 3/4 cells or encode an EOM identifier into the PTI fields of the ATM Headers of AAL 5 cells.

Therefore, it is important that a flag field be included in the Channel Parameter Entry that indicates whether the fragment represents the end of a CS-PDU or if more fragments exist for the CS-PDU. Software running on the APU 52 must check this condition during the segmentation process.

Since the APU 52 must check the resulting byte count each time it decrements it, it is possible to signal end-of-CS-PDU by providing a byte count in the Channel Parameter Entry that will reach exactly zero at the end of a fragment that represents the end of the CS-PDU and one that will produce a negative result for fragments that are not the last fragment (i.e. the byte count would by at least 1 byte less than the actual count). These and other techniques can be employed to dramatically reduce the number of APU 52 instructions required to generate (or process) a cell and shall be expanded upon later in the section on programming the APU 52.

As mentioned previously, the APU 52 may chose to generate more than one cell from a given CS-PDU before proceeding on to the next CS-PDU. This is up to the user but it is important to understand that generating multiple cells per CS-PDU reduces the number of APU 52 cycles required to build a cell, and the APU 52 cycles required to retrieve and restore the Channel Parameter Entry for the CS-PDU can be amortized over the number of cells generated. This may be important in high speed applications (155 mbps), especially if a large number of simultaneously active Transmit channels are to be supported.

Once the cell generation routine has been entered, cell generation involves the APU 52 retrieving a Channel Parameter Entry (from the VCR 56 or off chip), using the DMA Address to initiate a memory Read operation to retrieve the SAR SDU (size dependent on AAL type and on "Gather" algorithm employed), retrieving the ATM Header from the Channel Parameter Entry, modifying certain fields (GFC, PTI, CLP) if necessary and writing the Header into the appropriate location in the VCR 56 (just in front of where the DMA Controller 60 was instructed to write the SAR SDU).

If the cells are AAL 3/4 cells, the APU 52 must also retrieve the previous SAR Header and use it (i.e. the previous sequence number) to generate the current SAR Header. The APU 52 must also set the LI field in the VCR 56 (by writing it to the tail end of where the DMA Controller 60 was instructed to write the SAR SDU after the SAR SDU retrieval has completed since the DMAC does not clip VCR 56 or memory write operations on the tail end of the last word) and finally by queuing the cell for transmission by writing its VCR 56 address into the Cell Address FIFO in the PCI Transmitter 62a.

AAL 5 cells do not require SAR Header or Trailer generation operations but they do require CRC32 partial results maintenance and CRC32 insertion into the last cell of a CS-PDU.

The number of actual scenarios are too many to explore in detail in this specification (Scatter-Gather implementations, data alignment for application acceleration, user defined parsing and messaging routines, congestion control, statistics gathering, Interleaving of Segmentation, Reassembly and Messaging in the most effective manner, etc.). The present invention is therefore not limited to the specific examples presented herein, but is capable of numerous modifications and applications within the scope of the disclosure.

Figure 26:
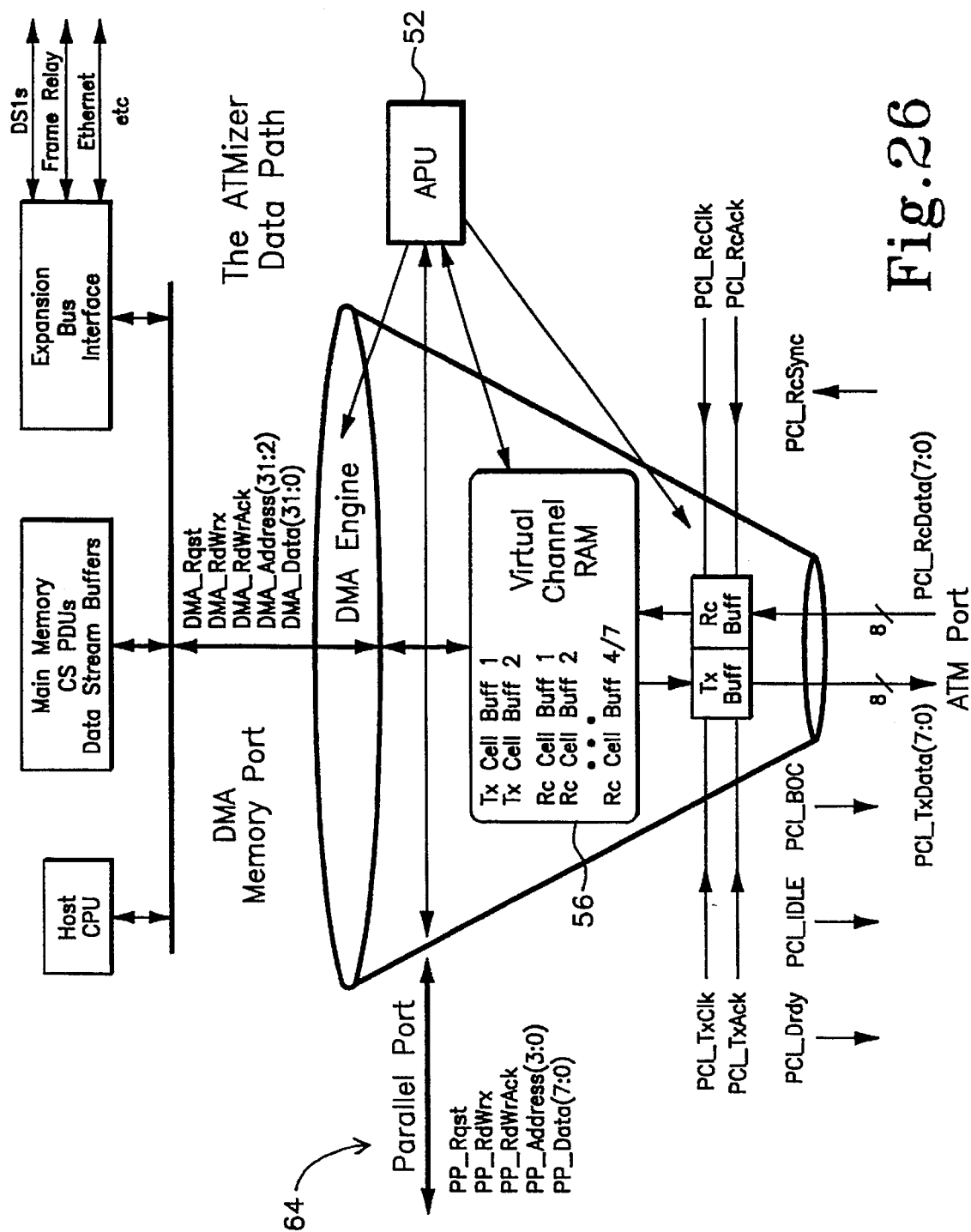
FIG. 26 is a diagram illustrating a cell generation data path.

A Cell Generation Data Path is illustrated in FIG. 26. As a overview of the segmentation process, CS-PDUs undergoing segmentation reside in system memory. SAR-SDUs are retrieved from memory (AAL 5 SAR-SDU=48 bytes, AAL 1 SAR-SDU=47 bytes) and placed in a Tx Cell Buffer in the VCR 56. SAR and ATM Headers are appended by the APU 52 and then the cell is queued for transmission over the Parallel Cell Interface 62.

An eight byte Elastic Buffer (Tx Buff) in the PCI 62 sits between the VCR 56 and the line driver. Data is fetched from the VCR 56 Tx Cell Buffer relative to the ATMizer 50's system clock (Clk) but transferred out of the eight byte deep Elastic Buffer (Tx Buff) relative to the line's byte clock (PCI_TxClk).

CS-PDUs undergoing reassembly also reside in system memory. Data from the Receiver is temporarily buffered in a second 8 byte deep Elastic Buffer (Rc Buff). This buffered data is then transferred to the Receive Cell Buffers in the VCR 56. The combination of elastic buffering and cell buffering provides all of the buffering needed in many applications.

9.3 The CS-PDU Reassembly Process

In addition to segmentation, the ATMizer 50 performs reassembly operations on AAL 3/4 and 5 CS-PDUs and AAL 1 real-time data streams. In the case of AAL 5 CS-PDUs, reassembly is the process of reconstructing CS-PDUs in system memory from a stream of cells received over the ATMizer 50's ATM port interface. Of course, this stream of cells will contain SAR-PDUs from a number of VCs/CS-PDUs simultaneously and the ATMizer 50 will have to track operations on a number of active CS-PDUs.

The exact number of open VCs that the ATMizer 50 can support is implementation dependent. By restricting the number of active channels and caching all channel parameters in the on-chip VCR 56, low cost network interface cards can be built that use system memory for CS-PDU storage, alleviating the need for dedicated memory on the NIC itself.

In higher speed applications, a larger number of channels (up to 65,536) can be supported through the provision of off-chip local DRAM and/or SRAM. In such implementations, the ATMizer 50 will go off chip to obtain the Channel Parameter Entries necessary for CS-PDU reassembly. Of course not all high speed (155 mbps) applications will support very large numbers of VCs. For example, an implementation of an ATM backbone may choose to encapsulate all traffic from a single network under a single VC/VP.

At the destination ATM switching point, the Convergence Sublayer strips out the ATM encapsulation information exposing a diverse stream of higher layer packets. In such systems, these high speed ATM interface devices may wish to support only a limited number of network segments/VCs (64–128) and as a result all channel parameters can be cached inside the ATMizer 50 and local memory could consist solely of DRAM.

As can be seen, the addition of on-chip memory allows ATMizer 50 users to make several tradeoffs between system cost (local memory vs. no local memory, DRAM vs. SRAM), ATM data rates and the number of channels supported.

THE "SCATTER" FUNCTION

When the first cell of a CS-PDU arrives over the ATMizer 50's ATM port interface, a buffer must be set aside in memory for reassembly. Because the ATMizer 50 is capable of "scatter" operations and buffer management, it is possible to allocate buffer space one block at a time. The ATMizer 50 can then construct a link list of the buffers used during the reassembly process, requesting additional buffer allocations as the CS-PDU extends beyond the bounds of the existing buffers.

With AAL 3/4 CS-PDUs, an intelligent decision can be made up front concerning buffer allocation since AAL 3/4 CS-PDUs contain a CS-PDU length indicator in their headers. But with AAL 5 CS-PDUs, size can not be determined until the last cell of the CS-PDU has arrived. Without a "scatter" capability the system would be forced to allocate the maximum size buffer to each new AAL 5 CS-PDU. This could put a severe strain on memory resources if many channels are active simultaneously.

With "scatter" control, the granularity of buffer allocations can be as small as the designer wishes. User firmware running on the ATMizer 50 is responsible for retrieving available buffer lists, constructing link lists for the CS-PDUs during reassembly, and passing these lists or pointers to these lists to the host processor upon completion of the reassembly process (or perhaps the pointer to the next buffer is simply appended to the present buffer).

It is important to note that the ATMizer 50 by design does not enforce a scatter architecture. The ATMizer 50 simply provides the resources to implement the scatter function—the APU 52 and DMA Engines and ATMizer—Host messaging capabilities. User firmware, downloaded to the ATMizer 50 at system reset time, implements the buffer allocation and link list pointer management processes chosen by the system designers as the best mechanism for their application.

HEC ERROR, AAL 3/4 CRC10 ERROR AND AAL 5 CRC32 ERROR CHECKING

If HEC generation is enabled, the ATMizer 50 will automatically check for HEC errors and discard cells that are found to have HEC Errors (it will also assert PCI_HECError). If HEC generation is enabled the ATMizer 50 will also automatically discard IDLE cells. Therefore, the reassembly routines need not check for either condition.

If AAL 3/4 cells are to be supported, the reassembly routine will have to check the CRC10 error register for an indication of CRC10 errors. Of course, Channel Parameter Entry for a VC indicates that the cell is encoded using AAL 1 or 5, no CRC10 error checking should be employed. AAL 5 CRC32 checking is explained in detail in the section on the DMAC 60.

10.0 Congestion Notification and Handling

Switching nodes within an ATM network that are experiencing congestion can inform ATM end stations by modifying the ATM headers of ATM cells passing through them. An end station receiving marked cells may take corrective action. During reassembly, the APU 52 can search each cell header for notification of congestion.

If congestion is found to exist, the APU 52 can execute whatever congestion handling algorithm the system designer has chosen to implement. There are several steps that the ATMizer 50's APU 52 can take in reaction to congestion notification.

1. The APU 52 can inform host software of the congestion problem but take no additional action. Host software can react as it sees fit by lowering Average and Peak segmentation rates or Burst Lengths for one or more CS-PDUs/VCs.

2. The APU 52 can react by increasing the service intervals for one or more Channel Groups (increase the initialization values in one or more PRPCs).

3. The APU 52 can lower the Global Pacing Rate for the overall Transmission pipe.

4. The APU 52 can choose to selectively lower the CLP value for one or more VCs. For real time sensitive data streams, CLP reduction may be preferable to throttling the VC. These and other actions can be taken separately or together to achieve the ultimate congestion handling mechanism.

It is important to note that no congestion control algorithm is enforced by hardware convention. Software running on the ATMizer 50 is responsible for checking for congestion and implementing a user design congestion control routine if congestion notification is found.

In actuality, the best congestion control algorithms may not be fully understood until enough equipment is fielded to put real life demands on ATM based networks. Much of that existing equipment may not be able to be updated to deal with actual congestion problems.

Systems employing the ATMizer 50 don't have the same problems. Because it is programmable, the ATMizer 50 can execute virtually any congestion control algorithm. Because its firmware is downloaded at system reset time, software "patches" can be sent out to existing customer sites with new congestion algorithms for the ATMizer 50 when more is learned about actual network congestion. Because the APU 52 sits directly at the line interface, the ATMizer 50 can react quickly, within a single cell time, to congestion notification found on an incoming cell. And because it has access to the Peak Pacing Rate registers 58a, Maximum Burst Length values, Global Pacing Rate Register 58c and the CLP fields in the ATM headers, the ATMizer 50 has unlimited flexibility in its means for implementing congestion control.

11.0 ATMizer 50 Pins 11.1 ATMizer 50 Pin Diagram

Figure 27:
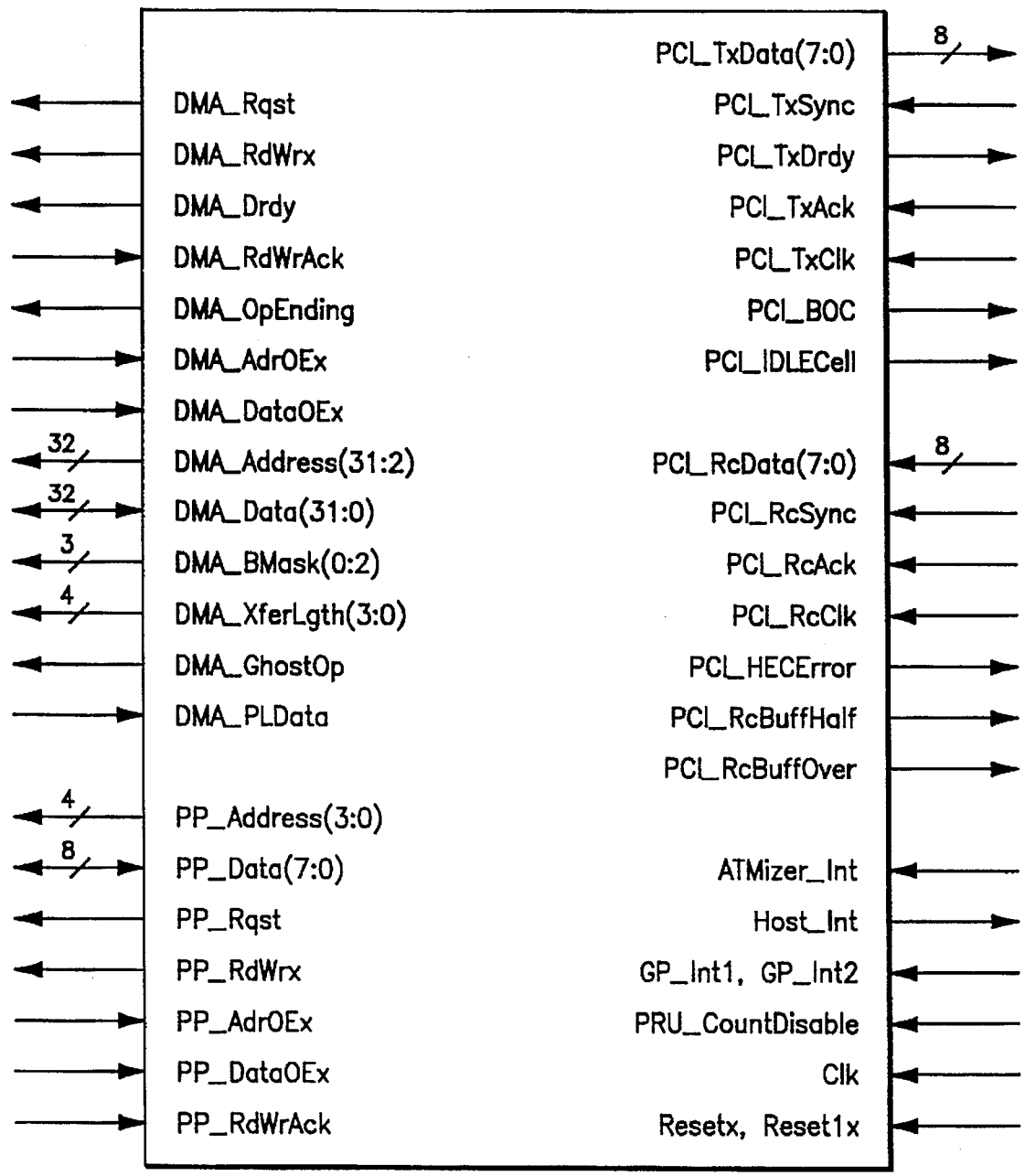
FIG. 27 is a pin diagram of the ATMizer.

A pin diagram of the ATMizer 50 is illustrated in FIG. 27.

11.2 ATMizer 50 Signal List

DMA MEMORY INTERFACE

TERMINOLOGY

The "DMA Engine" is that function within the ATMizer 50 that handles memory transactions. The DMA Engine manages the functions of main and local (VCR 56) memory address incrementing, byte count reduction, and byte alignments and mergers for transactions where the local byte starting offset which is not equal to the memory byte starting offset.

A DMA "operation" is initiated by the APU 52. To initiate a DMA operation, the APU 52 accesses the DMA Engine and sets the memory starting address (byte address), the number of bytes in the transaction (<=64 bytes), the local VCR 56 starting address (byte address) and the direction of the operation (Rd/Wr). The DMA Engine responds by asserting DMA_Rqst and by cycling through the required number of data "transfers" to complete the operation.

Devices accessed during DMA operations are responsible for informing the DMA Engine that the sourced data has been retired (on DMA Write transfers) or that the requested data is available (on DMA Read transfers). External devices (memory included) use the DMA_RdWrAck signal to signal these transfer "acknowledgments". The DMA Engine can be idled indefinitely by the withholding of an expected acknowledgment.

SIGNALS

DMA_Rqst

DMA Operation Request—Output—Asserted High

Asserted by the ATMizer 50's DMA Engine when the APU 52 has programmed the DMA Engine to execute a partial word, word or block transfer to or from a memory mapped device such as main memory. The accessed device shall respond to DMA_Rqst by asserting DMA_RdWrAck one or more times.

The ATMizer 50 does not have a specific DMA Grant input. External logic controls ATMizer 50 bus access with DMA_AdrOEx, DMA_DataOEx and DMA_RdWrAck. DMA_Rqst will be removed following the rising clock edge upon which the ATMizer 50 samples the final transfer acknowledgment (DMA_RdWrAck asserted) for the given DMA operation.

If the APU 52 has queued up back to back DMA operations (it may have even entered a write busy stall because it attempted to write a new initialization word to a busy DMAC), DMA_Rqst will not be deasserted in response to the final DMA_RdWrAck and the very next operation will begin immediately. Therefore, external logic should check the state of DMA_OpEnding to distinguish between DMA operation boundaries. A benefit is that external logic can chose not to give up memory bus ownership if DMA_Rqst is not deasserted in response to the final transfer acknowledgment.

DMA_RdWrx

DMA Operation Type—Output—High/Rd, Low/Wr

When DMA_RdWrx is high and DMA_Rqst is high, the ATMizer 50's DMA Engine is initiating a memory read operation. If DMA_RdWrx is low while DMA_Rqst is high, the ATMizer 50's DMA Engine is initiating a memory write operation. DMA_RdWrx remains valid throughout the entire DMA operation.

DMA_Drdy

DMA Data Ready—Output—Asserted High

Asserted by the DMA controller on memory write operations when write data is valid on DMA_Data(31:0).

DMA_RdWrAck

DMA Read/Write Acknowledgment—Input—Asserted High

During memory read operations initiated by the DMA engine, external logic asserts DMA_RdWrAck to indicate that it has placed valid data onto DMA_Data(31:0). The DMA Engine samples the incoming data on the rising edge of Clk if DMA_RdWrAck is asserted. During memory write operations, an external device asserts DMA_RdWrAck to indicate to the ATMizer 50 that it has retired the present write operation and is ready for the next address/data pair.

The ATMizer 50 will source the next address data pair off of the rising edge of Clk if DMA_RdWrAck is asserted at the rising edge of Clk. Transactions can be extended indefinitely by holding DMA_RdWrAck deasserted.

If the acknowledged transfer was the last transfer of the operation, DMA_Rqst will be removed following the rising edge of Clk. During both read and write operations the DMA Engine will respond to DMA_RdWrAck by incrementing the memory address by the appropriate number of bytes.

DMA_OpEnding

DMA Operation Ending—Output—Asserted High

Since the DMA controller 60 is capable of block transfers of up to 64 bytes (16 words), the DMA_OpEnding signal is sourced during the last memory operation to indicate to the outside world that the operation is in its final transfer. This gives the memory controller warning that the operation will end with the next DMA_RdWrAck returned to the ATMizer 50.

The memory controller can use this warning to gain an early start on RAS precharge or to grant the bus to another master on the next cycle. DMA_OpEnding will be removed following the rising clock edge upon which the ATMizer 50 samples the final transfer acknowledgment (DMA_RdWrAck asserted) for the given DMA operation.

DMA_AdrOEx

DMA Address Bus Tristate Enable—Input—Asserted Low

When asserted (logical 0), the DMA_Address(31:2) outputs of the ATMizer 50's DMA engine actively drive the memory address bus. When deasserted (logical 1), the DMA_Address(31:2) outputs are electrically isolated from the memory address bus (tristated). Since the DMA engine does not have an explicit DMA Grant input, external logic can "Grant" the bus to the ATMizer 50 by turning on its address and data outputs.

DMA_DataOEx
DMA Data Bus Tristate Enable—Input—Asserted Low

When asserted (logical 0), the DMA_Data(31:0) outputs of the ATMizer 50 actively drive the memory data bus. When deasserted (logical 1), the DMA_Data(31:0) outputs of the ATMizer 50 are electrically isolated from the memory data bus (tristated). The ATMizer 50 will not drive the DMA_Data bus during read operations so the value of DMA_DataOEx during read operations is a "don't care".
DMA_Address(31:2)
DMA Memory Address Bus (31:2)—Output The DMA Engine sources memory addresses on this bus during DMA operations. These memory addresses can be used to access memory systems or memory mapped devices giving the ATMizer 50 accessibility to all system components.

The ATMizer 50's DMA Engine always increments the DMA_Address in response to DMA_RdWrAck except on the last word of a DMA transfer. DMA_Address(31:24) is not incremented. Therefore, it is important that user firmware not initiate DMA operations that cross 16 megabyte boundaries.
DMA_Data(31:0)
DMA Memory Data Bus (31:0)—Bidirectional During memory read operations, the DMA Engine samples DMA_Data(31:0) on each rising edge of Clk for which DMA_RdWrAck is asserted. During memory write operations the DMA Engine sources data onto DMA_Data (31:0). DMA_DataOEx should be asserted during memory write operations.

On Write operations the DMA Engine responds to DMA_RdWrAck by sourcing data for the next transfer onto DMA_Data(31:0). DMA_Data(31:0) is not changed following acknowledgment of the last transfer of the DMA operation.
DMA_BMask(0:2)
DMA Write Data Bus Byte Masks—Output—Asserted High On Write transfers, the DMA engine asserts one or more of the DMA_BMask outputs to indicate which bytes contain valid data that must be retired to memory. Only those bytes should be written. DMA_BMask(0) pertains to DMA_Data(31:24), etc.

The DMAC does not clip byte masks on the far side of a word. For example at two byte write beginning at memory byte offset 00 would result in DMA_BMask(0:3) being asserted as 1111. A two byte Write operation beginning at memory offset 01 would result in DMA_BMask(0:3) being asserted as 0111. A six byte transfer starting a memory offset 10 would result in DMA_BMask(3:0) being asserted for the first word as 0011 and for the second word as 1111.

These examples show that the DMAC clips writes at the beginning to prevent overwriting valid data in on a partial word but does not (and need not in almost every system implementation) clip byte writes at the end of a word. Therefore, DMA_BMask(3) is logically always asserted during writes and therefore need not be supplied.

External devices should operate as if DMA_BMask(3) is provided and always asserted on Write operations. On Read transfers, DMA_BMask(0:2) can be ignored. The accessed device always sources all four bytes on Reads but only the desired bytes are sampled and stored by the DMA Engine.
DMA_GhostOp
DMA Ghost Write Operation—Output—Asserted High In Scatter-Gather applications, it is possible that a single SAR SDU may need to be built from more than one memory based CS-PDU fragment and that one of the fragments may not be of size divisible by four. The resulting memory transfer operations may include non-aligned transfers, throwing the CRC32 generator off.

In such situations, firmware should build the fragment transition cell using as many DMA operations as necessary. Once the SAR SDU is built in the VCR 56, a ghost write operation is initiated by the APU 52 to transfer the SAR SDU through the CRC32 generator. External circuitry, seeing the DMA_GhostOp bit set, should ignore the transfer except to provide the necessary number of DMA_RdWrAck assertions at the maximum rate possible to allow the DMA interface to cycle through the data transfer in order to calculate the CRC32 partial or final result.
DMA_PLData
DMA Pipelined Read Data Indication—Input—Asserted High Under normal operation, the data returned from memory during a memory Read transfer is sent directly into the byte alignment circuitry prior to being latched. This adds to the data-setup-to-clock requirement for DMA_Data(31:0) but also removes one cycle of latency from the operation. External circuitry can opt to have the data registered in the ATMizer 50 immediately to reduce the setup requirement. This will add an additional cycle of latency to the transfer.

In such a scenario, the DMA_RdWrAck must be withheld for one cycle. Asserting DMA_PLData causes DMA_Data(31:0) to be registered before entering the data alignment circuitry. The resulting reduction in setup time will be reflected in the timing section of the specification.
PARALLEL CELL INTERFACE 62

TERMINOLOGY

The "Parallel Cell Interface" (PCI) 62 is the ATMizer 50 functional block that interfaces to the ATM Port side logic. Cells are created by the ATMizer 50 from memory mapped CS-PDUs, Real Time Data Streams or from existing memory resident cells. These cell are "built" in cell holding areas inside the VCR 56. Once built they are transferred to the Transmission Convergence Sublayer framing circuitry one byte at a time through the PCI 62.

The PCI 62 contains special buffering circuitry to de-couple the ATMizer 50's system clock frequency from the clock frequency required by the Transmission Convergence Sublayer framing circuitry. The PCI 62 is driven by the ATM line-derived byte clocks.

The ATMizer 50 is designed to calculate and source HEC values in the fifth byte position of each cell. It is also designed to generate IDLE cells when no valid assigned cell is available for transmission. IDLE cell generation can not be inhibited. IDLE Cells must be fully ACK'ed out of the PCI 62.

In ATM, raw cell data is combined with certain overhead information to form "transmission frames". The logic that accomplishes this framing belongs to the Transmission Convergence Sublayer. ATM supports framing modes that insert several framing bytes per "transmission frame". As a result bytes will be received that do not correspond to data transfers between the TCS framing logic and the ATMizer 50's PCI ports.

As a result, data transfers to and from the ATMizer 50's PCI Ports will need to be "Gappable". Therefore, there must be a way to signal to the ATMizer 50 when no data transactions is desired. The two mechanism for implementing this "Gapping" mechanism are:

1. Simply stop the PCI Port clock/s if a data transaction is not required due to framing overhead.

2. Deassert PCI_TxAck or PCI_RcAck to indicate that a data transaction is not required due to framing overhead.

The former case corresponds to running the ATMizer 50's PCI Ports off of "Gapped clocks". The latter corresponds to running the ATMizer 50's PCI interfaces off of the free running line clocks and using a ""data ready" mechanism" to deal with gapping. Both approaches are supported by the ATMizer 50.

SIGNALS—TRANSMIT

PCI_TxData(7:0)
Parallel Cell Interface Data for Transmission—Output

The ATMizer 50 sources byte aligned cell data onto PCI_TxData(7:0). PCI_TxData(7:0) feeds the Transmission Convergence Sublayer framing logic or, for 8B/10B encoding, PCI_TxData(7:0) could feed the Taxi chip set directly. Logically, bit 7 is the first bit to be transmitted over the serial line.

PCI_TxSync
Parallel Cell Interface Transmitter Synchronizer—Input—Asserted High

PCI_TxSync is use to reset the state machines of the Transmitter inside of the ATMizer 50's Parallel Cell Interface. Asserting PCI_TxSync will cause the Transmitter logic to discard the current cell being transmitted and begin sending the cell pointed to be the IDLE Cell Pointer inside of the PCI Transmitter 62a.

PCI_BOC and PCI_IDLECell will both be asserted following the removal of PCI_TxSync. If PCI_TxSync is issued in conjunction with System reset (Resetx) then no cell will be sent until the APU 52 enables the PCI Transmitter 62a by setting the "Cell Available" field inside of the ATMizer 50's status register. Once the ATMizer 50 has set this field, PCI_TxSync will result in the transmission of the cell pointed to be the IDLE cell pointer. The Transmitter synchronization process is completely decoupled from both System reset (Resetx) and Receiver reset (PCI_RcSync).

PCI_TxDrdy
Parallel Cell Interface Transmit Data Ready—Output—Asserted High

PCI_Drdy is of significance after the transmitter has been reset, either on System reset (Resetx) or on Transmitter reset (PCI_TxSync). Upon leaving either of these resets, data will become ready a number of cycles later and the ATMizer 50 will assert PCI_TxDrdy and PCI_BOC to indicate that external logic can sample PCI_TxData(7:0) and issue a PCI_TxAck. External logic should not issue PCI_TxAck prior to seeing PCI_TxDrdy asserted.

Once asserted, PCI_TxDrdy remains asserted until the next System or Transmitter reset. This is a reflection of the fact that the ATMizer 50 will always be ready to source data on PCI_TxData(7:0) (Assigned or Unassigned Cells) as long as the interface is operated at or below 25 MHz (PCI_TxClk frequency).

PCI_TxAck
PCI Transmitted Data Acknowledgment—Input—Asserted High

PCI_TxAck is asserted by the Transmission Convergence Sublayer framing logic when it has sampled the data value on PCI_TxData(7:0). The ATMizer 50 responds to PCI_TxAck by sourcing the next byte of the existing cell or the first byte of the next cell (assigned or IDLE) onto PCI_TxData(7:0).

If the next byte is the first byte of a new cell, the ATMizer 50 will also assert PCI_BOC and possibly PCI_IDLECell in response to PCI_TxAck. PCI_TxAck allows the PCI Transmitter 62a to operate in "Gappable" mode. The ATMizer 50's PCI Transmitter 62a can be gapped in two fashions:

1. PCI TxAck is permanently asserted, PCI_TxClk is occasionally shut off.
2. PCI_TxClk is free running. PCI_TxAck is deasserted if external logic is unable to sample the byte on PCI_TxData(7:0) in a given cycle. This is the recommended mechanism.

PCI_TxClk
Parallel Cell Interface Transmitter Clock—Input Signals sampled on ^edge The elastic byte buffer inside the Transmitter portion of the ATMizer 50's Parallel Cell Interface is driven by PCI_TxClk. All data transfers from the ATMizer 50 over PCI_TxData(7:0) are synchronized to this clock. PCI_TxDrdy, PCI_BOC, and PCI_IDLECell are also synchronized to this clock.

Logic inside of the ATMizer 50 handles synchronization between the ATMizer 50's system clock and the PCI Transmitter 62a's elastic data buffer circuitry which is sequenced off of PCI_TxClk. The system designer need not worry about metastability at the Transmitter output. PCI_TxClk is the byte clock of the external transmitter and can be operated at any frequency less than or equal to 25 MHz.

If external logic is not ready to sample PCI_TxData(7:0) on a rising edge of its byte clock, it can either inhibit the rising edge from reaching PCI_TxClk or cause the PCI Transmitter 62a to extend the current data cycle by deasserting PCI_TxAck. The later is the preferred approach.

PCI_BOC
Beginning of Cell—Output—Asserted High

The PCI Transmitter 62a asserts PCI_BOC while the first byte of a cell is sourced on PCI_TxData(7:0). PCI_BOC is removed after the first PCI_TxAck is received for a cell. PCI_BOC should be qualified with PCI_TxDrdy.

PCI_IDLECell
Idle Cell—Output—Asserted High

The PCI Transmitter 62a asserts PCI_IDLECell during the entire period that an IDLE cell is being sourced onto PCI_TxData(7:0). (53 Bytes long). Transmission Convergence framing logic that does not wish to transmit IDLE cells must still assert PCI_TxAck until PCI_IDLECell goes away. (i.e. it must "ACK" out the entire IDLE cell).

SIGNALS—RECEIVE

PCI_RcData(7:0)
Parallel Cell Interface Data for Reception—Input

The ATMizer 50 receives byte aligned cell data on PCI_RcData(7:0). PCI_RcData(7:0) is fed from the Transmission Convergence Sublayer framing logic or, for 8B/10B encoding, PCI_RcData(7:0) could be fed from a Taxi chip set directly. Logically, bit 7 is the first bit to be received over the serial line.

PCI_RcSync
Parallel Cell Interface Receiver Synchronizer—Input—Asserted High

PCI_RcSync is use to reset the state machines of the Receiver 62b inside of the ATMizer 50's Parallel Cell Interface 62. Asserting PCI_RcSync will cause the Receiver logic to discard the current cell being received and proceed as if the next byte of data latched into the ATMizer 50 (PCI_RcAck asserted on rising edge of PCI_RcClk) is the first byte of a cell.

PCI_RcSync is used during the cell boundary delineation process. External logic (or the ATMizer 50's APU 52 with a bit of creative design work) assumes a cell boundary and synchronize the ATMizer 50's receiver. Logic then monitors the ATMizer 50's PCI HECError output. If HEC errors continue, it is assumed that a wrong cell boundary was chosen. External logic can then "slip a byte" and reassert PCI_RcSync. Eventually, this logic will yield a correct choice for cell boundary and PCI_HECError will no longer be asserted. The Receiver synchronization processes is completely decoupled from system reset and from the Transmission process.

PCI_RcAck
PCI Receive Data Acknowledgment—Input—Asserted High

PCI_RcAck is asserted by the Transmission Convergence framing logic when it has sourced data onto PCI_RcData(7:0). The ATMizer 50 responds to PCI_RcAck by sampling PCI_RcData(7:0) on the rising edge of PCI_RcClk. PCI_RcAck allows the PCI Receiver 62b to operate in "Gappable" mode. The ATMizer 50's PCI Receiver 62b can be gapped in two fashions.

1. PCI RcAck is permanently asserted, PCI_RcClk is occasionally shut off.
2. PCI_RcClk is free running. PCI_RcAck is deasserted if external logic is unable to supply a byte on PCI_RcData (7:0) in a given cycle. This is the recommended mechanism.

PCI_RcClk
Parallel Cell Interface Receiver Clock—Input—Signals sampled on ^edge

The elastic byte buffer inside the Receiver 62b of the ATMizer 50's Parallel Cell Interface 62 is driven by PCI_RcClk. All data transfers to the ATMizer 50 over PCI_RcData(7:0) are synchronized to this clock. Assertion of the PCI_HECError output is synchronized to this clock. Logic inside of the ATMizer 50 handles synchronization between the ATMizer 50's system clock and the PCI's Receive data buffer circuitry powered by PCI_RcClk.

The system designer need not worry about metastability at the Receiver input. PCI_RcClk is likely to be the clock derived from the line data and can be operated at any frequency less than or equal to 25 MHz. If external logic is not ready to source PCI_RcData(7:0) on a rising edge of its byte clock, it can either inhibit the rising edge from reaching PCI_RcClk or simply deassert PCI_RcAck.

PCI_HECError
HEC Error—Bidirect—Asserted High

PCI_HECError acts as an output when HEC generation is enabled and as an input when HEC generation is disabled. The ATMizer 50 asserts PCI_HECError when the HEC field (byte 5 of a cell) received does not equal the HEC field calculated by the ATMizer 50 for the ATM Header received. When HEC generation is disabled, the ATMizer 50 checks the state of HEC Error while processing the first byte of a SAR PDU. If PCI_HECError is asserted, external logic has found an HEC error and the cell PCI RcBuffHcarded.

PCI_RcBuffHalf
Received Cell Holder Buffer Half Full—Output—Asserted High

The ATMizer 50 asserts PCI_RcBuffHalf whenever the Received Cell Buffer is at least half full (based on its sized as set in the System Control Register). External circuitry can use this signal to know when to transfer cell buffering to a byte wide off chip SRAM operating as a FIFO and when to start reading stored cells back out of the SRAM and writing them back into the ATMizer 50.

PCI_RcBuffOver
Received Cell Holder Buffer Overflow—Output—Asserted High

The ATMizer 50 asserts PCI_RcBuffOver whenever the internal Received Cell Buffer in the VCR 56 overflows. The PCI will stop writing new cells into the VCR 56 once the buffer fills and will simply discard any new cells that the Transmission Convergence framing logic attempts to write into the Receiver in the PCI.

PARALLEL PORT 64

SIGNALS

PP_Address(3:0)
Parallel Port 64 Address—Output

Set by the APU 52 on Parallel Port 64 Read and Write Transfers. Bits (5:2) of CPUAddress(3:0) are latched and sourced on PP_Address(3:0) during parallel port read and write operations.

PP_Data(7:0)
Parallel Port 64 Data—Bidirectional

Sampled by the APU 52 on Parallel Port 64 Read transfers. Sourced by the APU 52 on Parallel Port 64 Write transfers. The Parallel Port 64 contains a one deep write buffer that drives PP_Data(7:0) during Write transfers.

PP_Rqst
Parallel Port 64 Request—Output—Asserted High

Asserted by the ATMizer 50 when it has sourced a valid address on PP_Address(3:0) and wants to perform a transfer using the parallel port.

PP_RdWrx
Parallel Port 64 Read/High, Write/Low—Output—High/Rd, Low/Wr

Used to qualify PP_Rqst. If PP_RdWrx is high while PP_Rqst is asserted, the ATMizer 50 is requesting a Parallel Port 64 read operation. If PP_RdWrx is low while PP_Rqst is asserted, the ATMizer 50 is requesting a Parallel Port 64 write operation. The Parallel Port 64 will automatically disable the data output drivers on Read Operations.

PP_AdrOEx
Parallel Port 64 Address Tristate Enable—Input—Asserted Low

When asserted, the PP Address(3:0) drive the Parallel Port 64 Address bus. When deasserted, PP_Address(3:0) is electrically isolated from the bus (tristated). PP_AdrOEx should be deasserted if the Parallel Port 64 Address Bus has been granted to an external device.

PP_DataOEx
Parallel Port 64 Data Tristate Enable—Input—Asserted Low

When asserted, PP_Data(7:0) actively drive the Parallel Port 64 Data bus. When deasserted, PP_Data(7:0) is electrically isolated from the bus (tristated). PP_Data(7:0) is automatically deasserted by the Parallel Port 64 during Read operations. The state of PP_DataOEx is a "don't care" during Read operations. It should be driven Low by external logic during ATMizer 50 Write transfers over the parallel port.

PP_RdWrAck
Parallel Port 64 Read/Write Acknowledgment—Input—Asserted High

External logic asserts PP_RdWrAck during a Parallel Port 64 Read operation when it has placed valid data on PP_Data(7:0). External logic can extend a read access indefinitely by withholding PP_RdWrAck. Withholding PP_RdWrAck will force the APU 52 to stall until PP_RdWrAck is asserted. External logic also must assert PP_RdWrAck in response to a Parallel Port 64 Write operation.

External logic asserts PP_RdWrAck once it has retired the Write data sourced on PP_Data(7:0). After queuing a write transfer to the write buffer in the parallel port, if the APU 52 attempts a second Parallel Port 64 operation before PP_RdWrAck is asserted it will enter a stall cycle until PP_RdWrAck is asserted.

MESSAGING

SIGNALS

ATMizer 50_Int
ATMizer 50 Interrupt—Input—Asserted High/Level Sensitive

External logic asserts ATMizer 50_Int when it wishes to gain the attention of the APU 52. Reasons to gain APU 52 attention include message passing (i.e. configure Transmit Channel, Activate CS-PDU segmentation, Change Pacing Rates, etc.) and other user defined constructs. The actual usage of this input is entirely user programmable. ATMizer 50_Int is not an interrupt in the classic sense.

Instead, it is connected to CpCond0 of the APU 52. APU 52 firmware can sample this signal whenever it wishes to determine if the host desires communication with the APU 52. Branch on CpCond0 TRUE, will allow the ATMizer 50 to sense this signal. If asserted, the ATMizer 50 can then read a value off of the Parallel Port 64 to get an indication of why the host asserted ATMizer_Int.

In fact, a messaging system can be designed by the user/system architect where the eight bit value could act as an index to a jump table, thus encoding the action to be taken directly in the message.

Host_Int
Host Interrupt—Output—Asserted High

The ATMizer 50 asserts Host Interrupt when it wishes to affect an action by the host. The usage of this signal is user defined but is likely to be used as part of the messaging system. Error conditions, congestion problems, CS-PDUs reassembled, and other conditions may prompt the APU 52 to seek host action. The ATMizer 50's APU 52 asserts Host_Int by writing to an on-board register. Host_Int remains valid for only one cycle and must be latched by external logic.

GP_Int1, GP_Int2
General Purpose APU 52 Interrupts 1 and 2—Input—Asserted High

GP_Int1 is connected to APU 52 interrupt 3, GP_Int2 is connected to APU 52 interrupt 4. Software running on the APU 52 can choose to disable or enable interrupts as necessary.

GENERAL SIGNALS

SIGNALS

PRU_CountDisable
Pacing Rate Unit Count Disable—Input—Asserted High

The down counters associated with the eight "Peak Rate Pacing Counters" (PRPCs) 58a count down one tick every System Clock tick (Clk). External logic can slow or inhibit the counting process by asserting PRU_CountDisable. Asserting PRU_CountDisable prior to the rising edge of Clk prevents the PRPCs 58a from counting down on that clock tick.

This feature can be used creatively in DS1/Real Time circuit emulation situations as a short cut mechanism for informing the ATMizer 50 that a 47 byte payload has been received and is ready for transmission. For a PRPC (Peak Rate Pacing Counter) 58a to be inhibited by PRU_CountDisable, it must have been configured to be sensitive to the state of this bit. Otherwise, the PRPC 58a will ignore PRU_CountDisable.

Clk
System Clock Input—Input

The Clk input runs the ATMizer 50 APU 52, DMA Controller 60, Parallel Port 64 and much of the logic in the Parallel Cell Interface 62. Clk does not however effect the transfer of byte data to or from the ATMizer 50 over the Parallel Cell Interface. These transaction are controlled by PCI_TxClk and PCI_RcClk. Supported frequencies on Clk are expected to be 33, 40 and 50 MHz. 16.5, 20 and 25 MHz memory systems can be supported by running the ATMizer 50's DMA interface at ½ frequency (assert DMA_RdWrAck every other cycle).

Resetx
System Reset—Input—Asserted Low

This is the master reset for the ATMizer 50. External logic should download firmware to the ATMizer 50 during reset. Reset also causes the PCI Transmitter 62a and Receiver 62b to be reset. PCI_TxDrdy will go low in response to reset and stay low until the APU 52 queues a cell for transmission.

Reset1x
LAC and MAC Reset—Input—Asserted Low

Reset1x is used to reset the circuitry involved in downloading user firmware into the IRAM 54. It should be deasserted prior to beginning the process of writing firmware into the IRAM 54. Reset1x sets the Local Address Counter and Memory Address Counter and Registers to zero. These counters are then incremented each time DMA_RdWrAck is asserted.

12.0 ATMizer 50 Interface Timing

A timing diagram for the ATMizer 50 interface is collectively illustrated in FIGS. 28a to 28g.

Figure 28B:
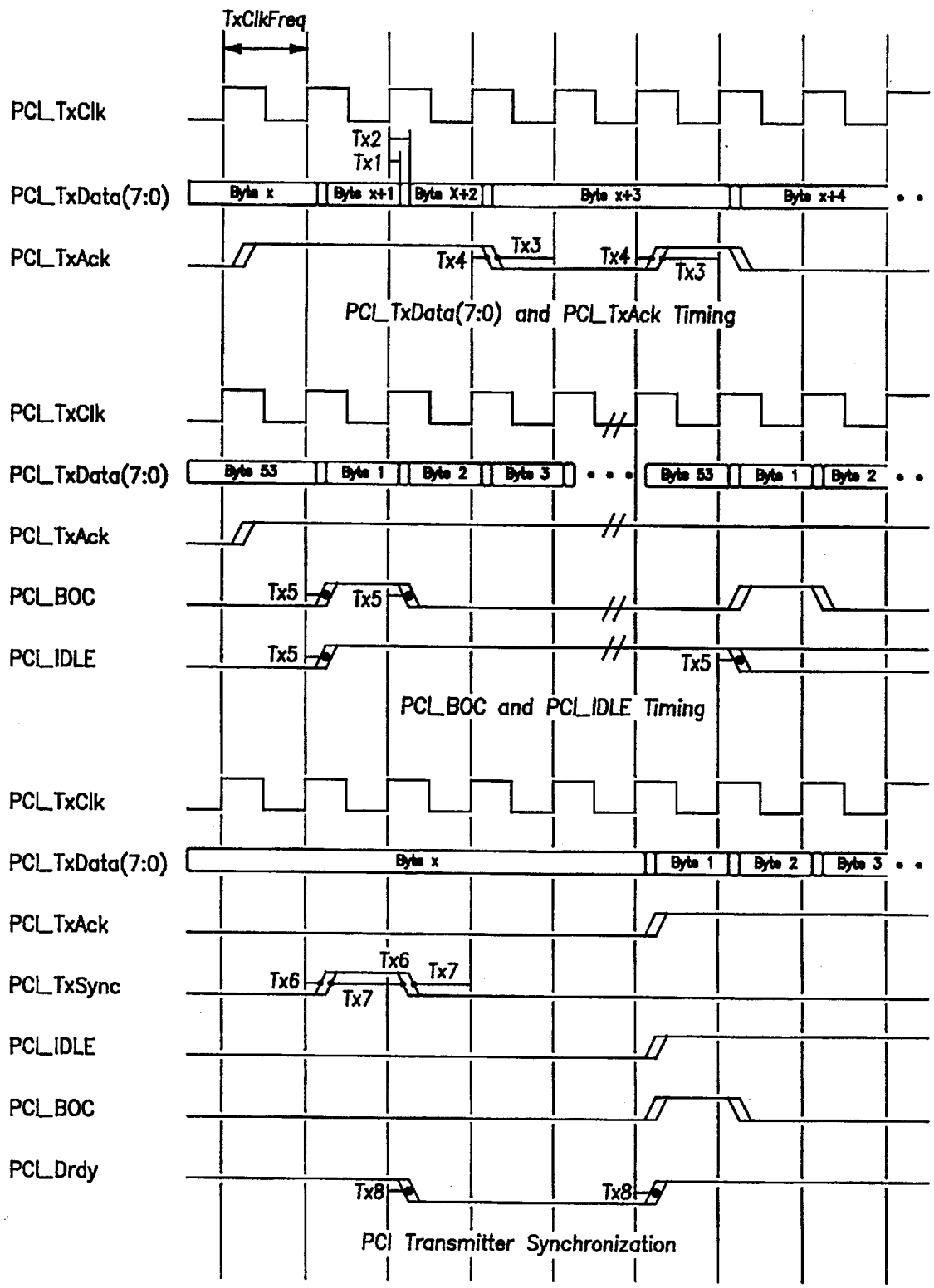
FIGS. 28b and 28c are timing diagrams illustrating PCI Transmitter Synchronization.
Figure 28C:
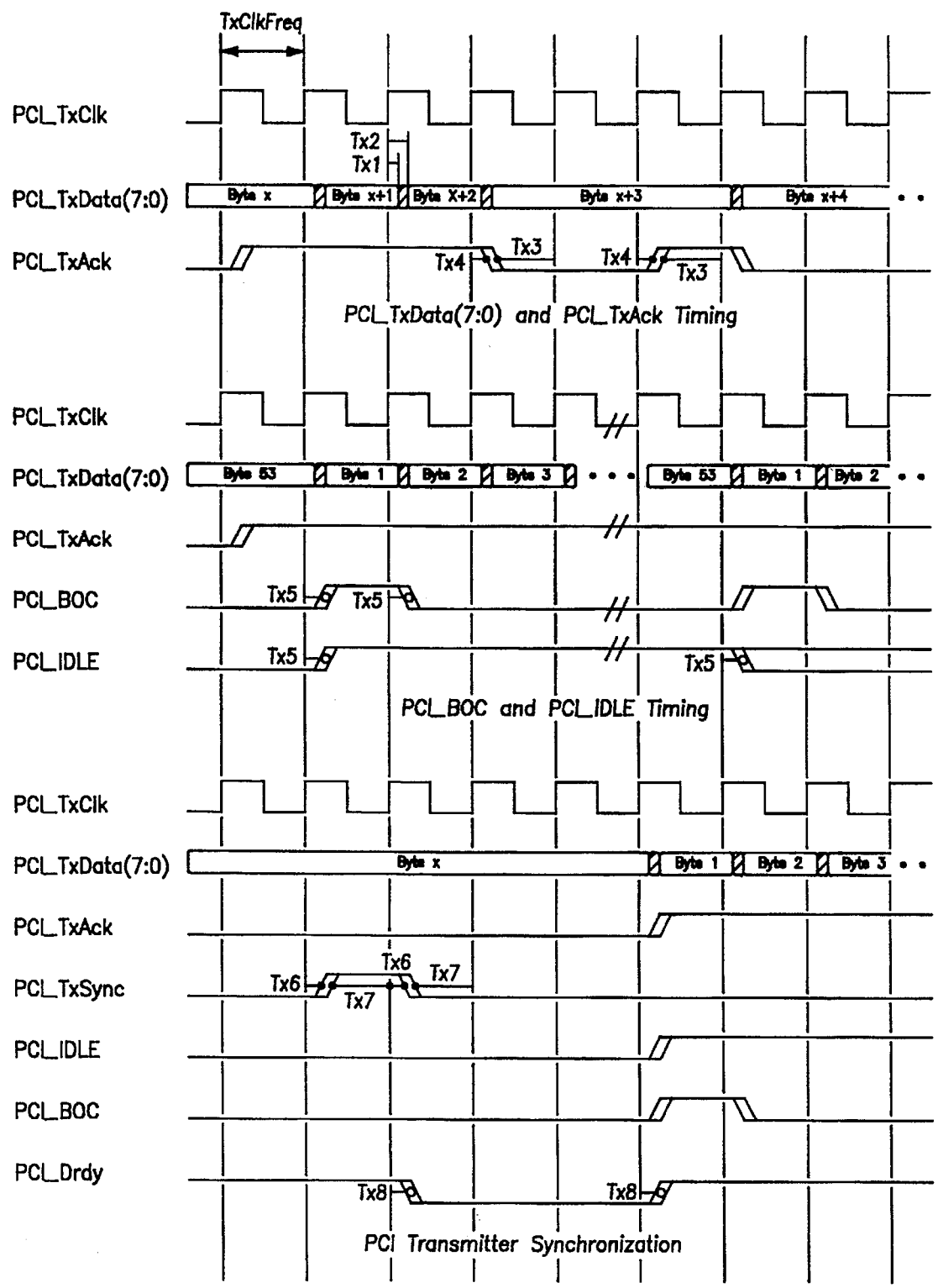
Figure 28F:
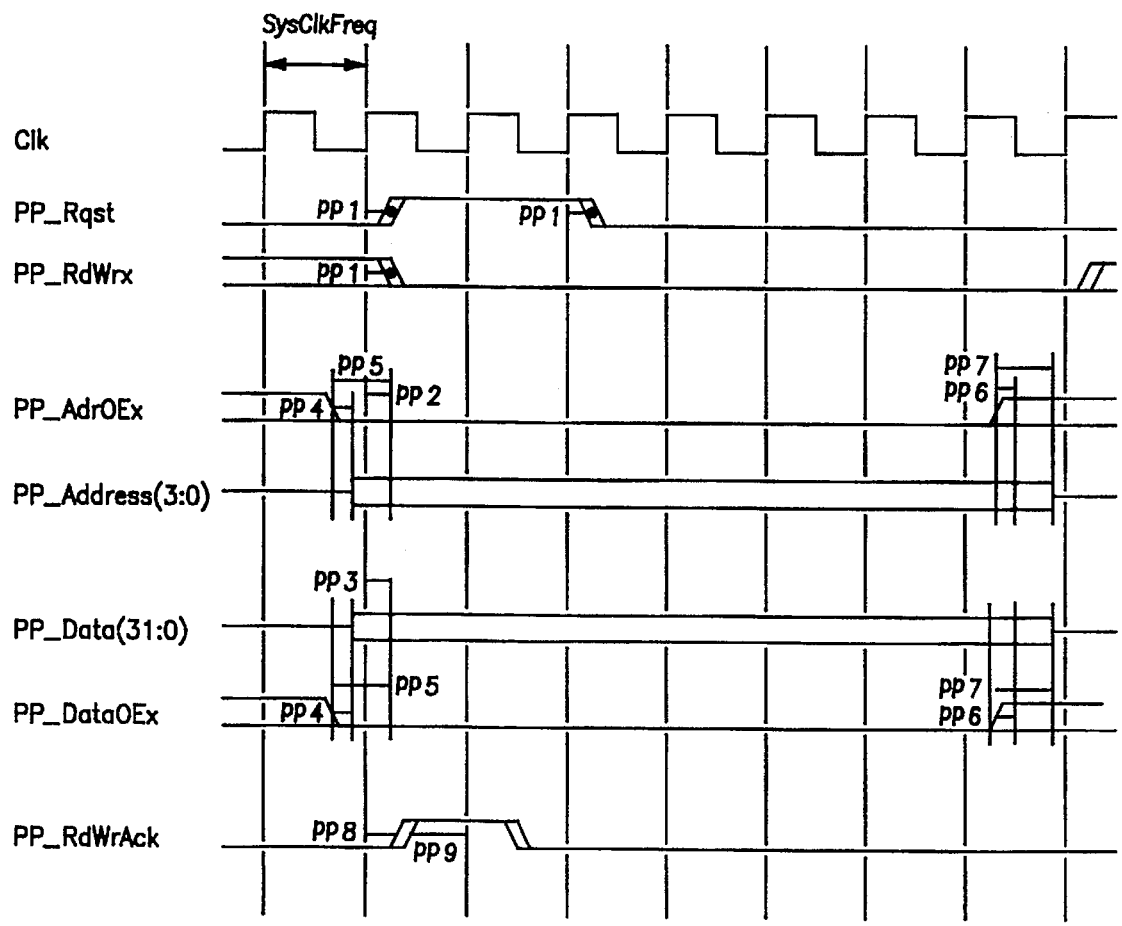
FIG. 28f is a timing diagram illustrating a Parallel Port write operation.

FIG. 28a is a diagram listing the interfacing timing signals. FIGS. 28b and 28c illustrate the PCI Transmitter 62a Synchronization. FIG. 28d illustrates a DMA write operation. FIG. 28e illustrates a DMA read operation. FIG. 28f illustrates a Parallel Port 64 write operation. FIG. 28g illustrates a Parallel Port 64 read operation.

Figure 29:
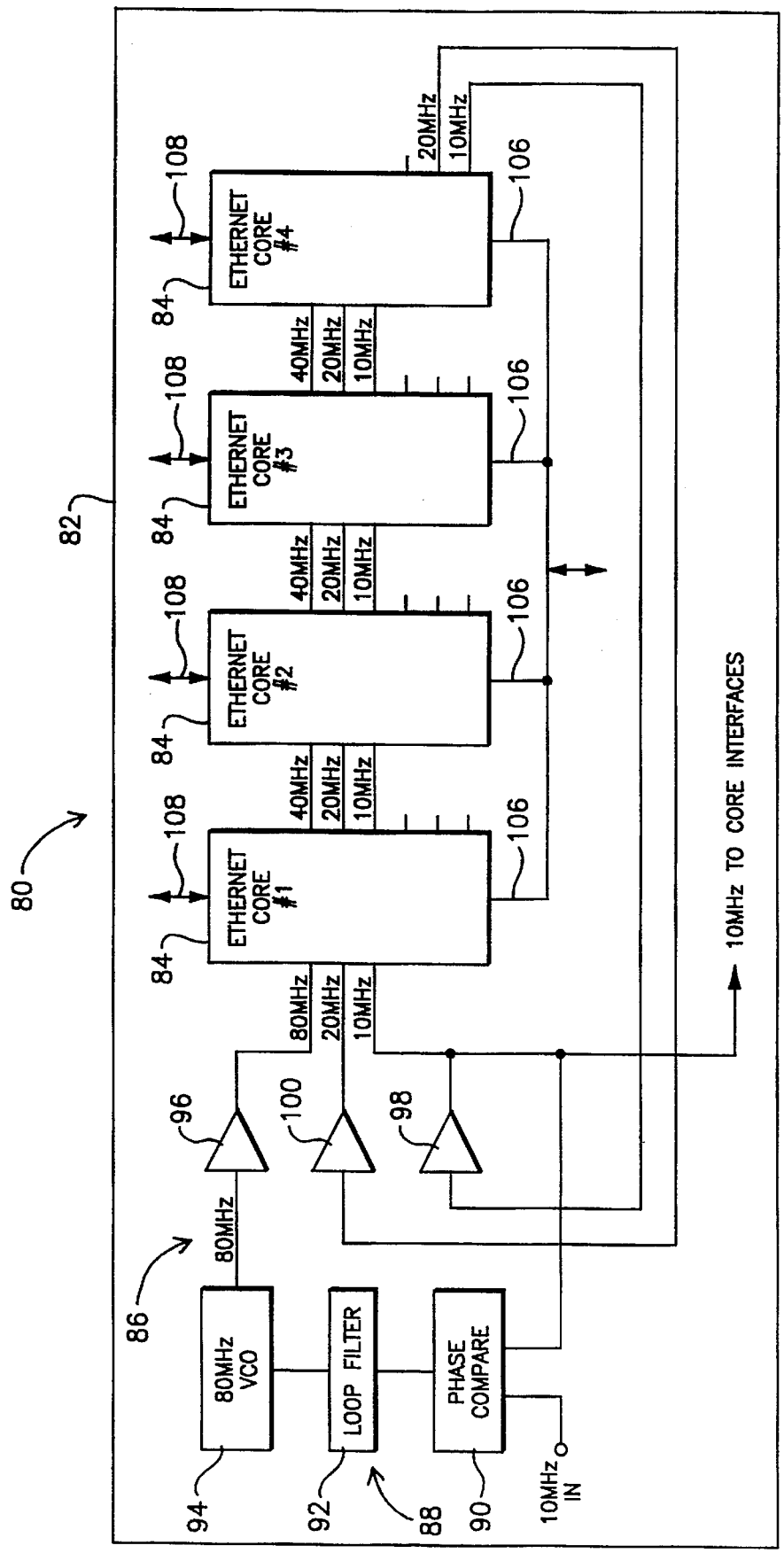
FIG. 29 is a schematic diagram of an Ethernet controller according to the present invention.

An Ethernet controller 80 embodying the present invention is illustrated in FIG. 29, and is fabricated as a single integrated circuit chip on a substrate 82. The controller 80 comprises a plurality of network interface units or cores 84, which can be operated separately or interconnected at one end, as illustrated, to form a hub.

The cores 84 are synchronously driven from a clock unit 86, which includes a phase locked loop PLL frequency multiplier 88. A 10 MHz input signal from a system master clock (not shown) is applied to one input of a phase comparator 90 of the multiplier 88, the output of which is fed through a loop filter 92 and voltage controlled oscillator (VCO) 94 to a buffer 96. The scale factor of the PLL multiplier 88 is selected to be eight, whereby the frequency of pulses output from the VCO 94 to the buffer is 80 MHz.

The output of the buffer 96 (80 MHz clock pulses) is applied to an 80 MHz clock input of the first or leftmost core 84. Each core 84 comprises an internal voltage divider (not shown) which divides the 80 MHz signal by 2, 4 and 8 to produce 40, 20 and 10 MHz clock pulses at outputs thereof. The pulse outputs of the first to third cores 84 are applied to the pulse inputs of the second to fourth cores 84 respectively.

The 10 and 20 MHz outputs of the fourth core 84 are connected to the 10 and 20 MHz inputs of the first core 84 through buffers 98 and 100 respectively. The output of the buffer 98 is applied to the other input of the phase comparator 90 to complete the phase locked loop.

Figure 30:
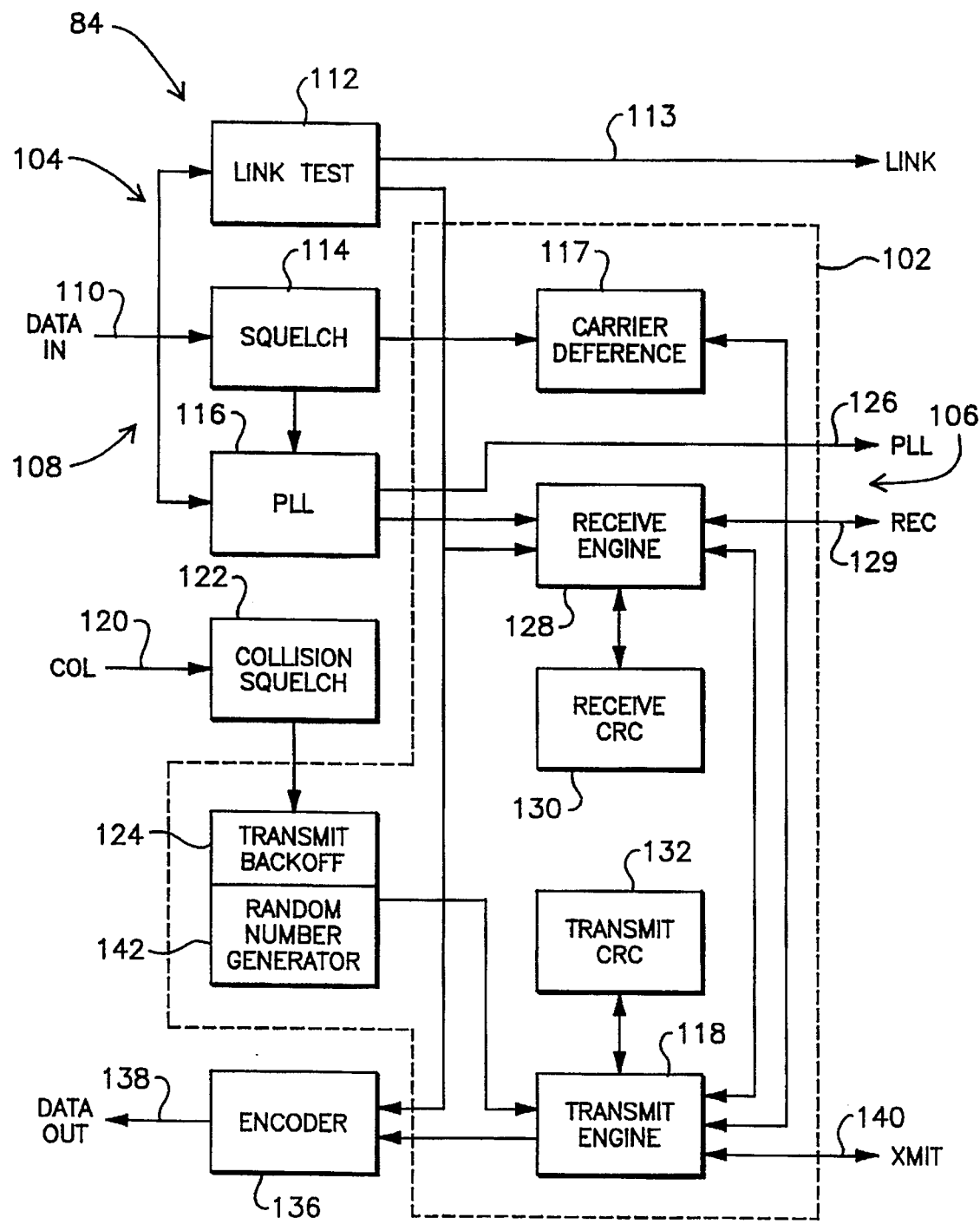
FIG. 30 is a functional block diagram of a core of the controller of FIG. 29.

As illustrated in FIG. 30, each core 84 comprises a media access controller (MAC) 102 including the elements enclosed in a dashed line box, and a serial interface adapter (SIA) 104 including the other elements illustrated in the drawing. The MAC 102 is connected externally through lines which are collectively designated as 106, whereas the SIA 104 is connected externally through lines which are collectively designated as 108.

The cores 84 can be used independently of each other, with the lines 106 leading to individual units such as computer workstations. However, the controller 80 is more useful with the lines 106 interconnected as illustrated in FIG. 29 to form a hub. The lines 106 can be further connected to another network element such as a router (not shown). The lines 108 are connected to other network elements through Ethernet interfaces which are not shown in the drawing.

The entire controller 80 is fabricated on a single integrated circuit chip, with the cores being clocked synchronously by the clock unit 86. This forces the individual cores 84 to transmit and receive data in a synchronous manner through the lines 106 in the hub configuration, and enables a router or other element which is connected to the network node constituted by the interconnected lines 106 to operate in a periodic manner which is much more efficient than if the cores 84 were attempting to communicate through the lines 106 in an unsynchronized manner at random intervals. This latter operation would occur if a separate clock unit were provided for each core 84, and each core 84 was clocked independently as in the prior art.

The present arrangement by which the cores 84 are integrated on a single integrated circuit chip and driven synchronously by a single clock unit 86 is advantageous in that only one clock unit 86 is required, rather than a clock unit for each core, and the that the synchronous operation greatly facilitates the smooth operation of the controller 80 when operated as a hub.

As illustrated in FIG. 30, each core 84 is configured to provide the functionality stipulated by IEEE standard 802.3. Ethernet is a network protocol embodying this standard, which is more generically referred to as Carrier Sense with Multiple Access and Carrier Detect (CSMA/CD).

An input data signal DATA IN enters the SIA 104 through a data input line 110 which is connected to a link test unit 112, a squelch unit 114 and a phase locked loop unit 116. The link test unit 112 generates a LINK signal on a link test line 113 which indicates whether or not the core 84 is connected correctly in circuit. The squelch unit 114 distinguishes a valid DATA IN signal from noise, and provides an output to a carrier deference unit 117 which is connected to a transmit engine 118.

A collision signal COL is fed through a collision signal line 120 and a collision squelch unit 122 to a transmit backoff unit 124, the output of which is applied to the transmit engine 118. The PLL unit 116 generates a PLL signal on a PLL line 126 which indicates that the PLL unit 116 is locked on a signal.

The DATA IN signal is locked by the PLL unit 116 and applied to a receive engine 128, which receives a receive signal REC on a line 129. A receive CRC unit 130 performs cyclic redundancy checks on data in the receive engine 128, whereas a transmit CRC unit 130 performs this function on data in the transmit engine 118.

Data from the transmit engine 118 is fed through an encoder 136 to a data output line 138 as a data signal DATA OUT. Data enters the transmit engine as a signal XMIT on a transmit line 140. The lines 110, 120 and 138 constitute the line 108, whereas the lines 113, 126, 129 and 140 constitute the line 106.

Data applied to the XMIT line 140 is received by the transmit engine, encoded by the encoder 136 and transmitted out through the line 138. Data received on the line 110 is decoded by the PLL unit 116, and fed out by the receive engine 128 through the line 129. If the line 108 is busy, as indicated by a DATA IN signal on the line 110, the carrier deference unit 117 inhibits the transmit engine 118 from transmitting data until the line is clear.

The transmit backoff unit is responsive to a collision signal COL on the line 120, which indicates that two or more units are attempting to transmit on the network at the same time. In response to the signal COL, the transmit backoff unit 124 executes a truncated exponential backoff algorithm as specified in IEEE 802.3. This algorithm utilizes a pseudo random number generator to generate a random number which designates a backoff time, or a time for which the transmit engine 118 should wait before attempting transmission.

If all of the cores in the network utilize the same type of pseudo random number generator, they will generate the same sequence of random numbers. If the random number generators of two or more cores become synchronized with each other, they will cause the associated cores to back off by the same times. This will cause the cores to continuously attempt to transmit at the same times. This condition is called "lockup", and can result in the cores generating collisions indefinitely, preventing any data from being transmitted over the network.

Figure 31:
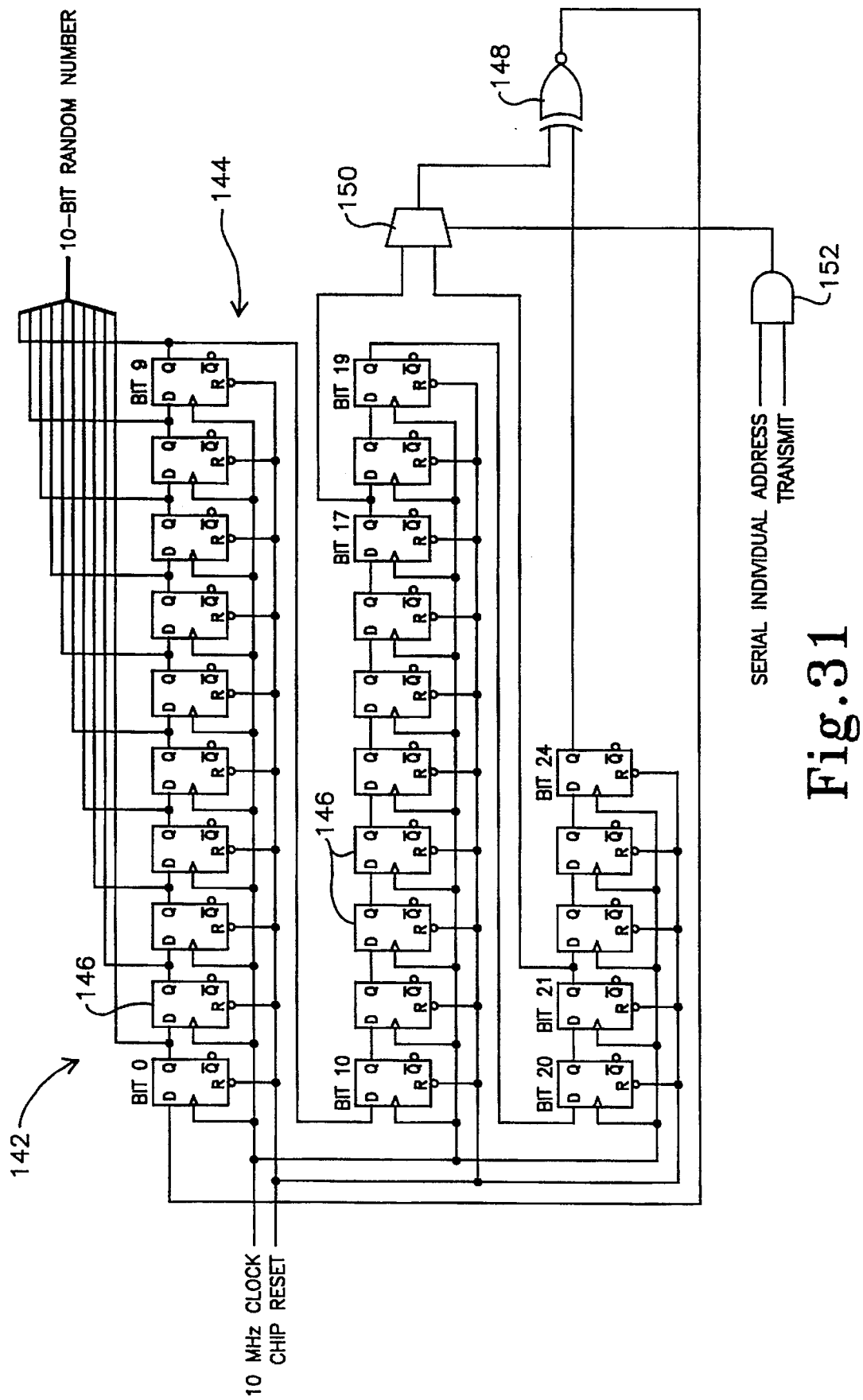
FIG. 31 is an electrical schematic diagram of a random number generator of the core of FIG. 30.

This problem is overcome by employing a pseudo random number generator 142 in the transmit backoff unit 124 as illustrated in FIG. 31. The generator 142 comprises a linear feedback shift register 144 including 25 flip-flops 146 which are synchronously clocked by a 10 MHz clock signal. Further illustrated is a chip reset signal which can be applied to reset all of the flip-flops 146. The flip-flops 146 are designated in the drawing as stages BIT 0 to BIT 24.

The flip-flops 146 are connected in a ring, with the outputs of upstream flip-flops 146 being connected to the inputs of the adjacent downstream flip-flops 146. The output of the 25th flip-flop 146 (BIT 24) is connected through an exclusive NOR gate 148 to the input of the 1st flip-flop 146 (BIT 0).

The shift register 144 has two modes of operation, each operating on a division ratio of 33,554,431, ($2^{25}-1$). In each mode, the shift register 144 generates the same random numbers, but in different orders. The first mode appears at the output of the 18th shift register 146 (BIT 17), whereas the other mode appears at the output of the 22nd shift register 146 (BIT 21). These mode outputs are connected to signal inputs of a multiplexer 150, the output of which is connected to another input of the gate 148.

Each data packet being transmitted by the transmit engine 118 has a header including a serial address. This address is applied serially (bit by bit) to an input of an AND gate 152, the output of which is connected to a switch input of the multiplexer 150. The AND gate 152 is enabled by a TRANSMIT signal which is generated in the transmit backoff unit 124.

When the bit of the serial address being applied to the multiplexer 150 is high, the multiplexer 150 will switch or gate the BIT 17 mode signal through the gate 148 to the BIT 0 input of the shift register 144. When the bit is low, the multiplexer 150 will gate the BIT 21 mode signal to the input of the shift register 144.

In this manner, the random number generator 142 is repeatedly switched between its two operating modes, in accordance with the logical sense of the individual bits of the serial packet address, thereby increasing the randomness of the random numbers produced by the generator 142 by an enormous factor. This reduces the possibility of two or more cores attempting to transmit data after waiting the same backoff time after a collision to such a low level that it can be assumed for practical purposes that this condition and the resulting network lockup will never occur.

Figure 32:
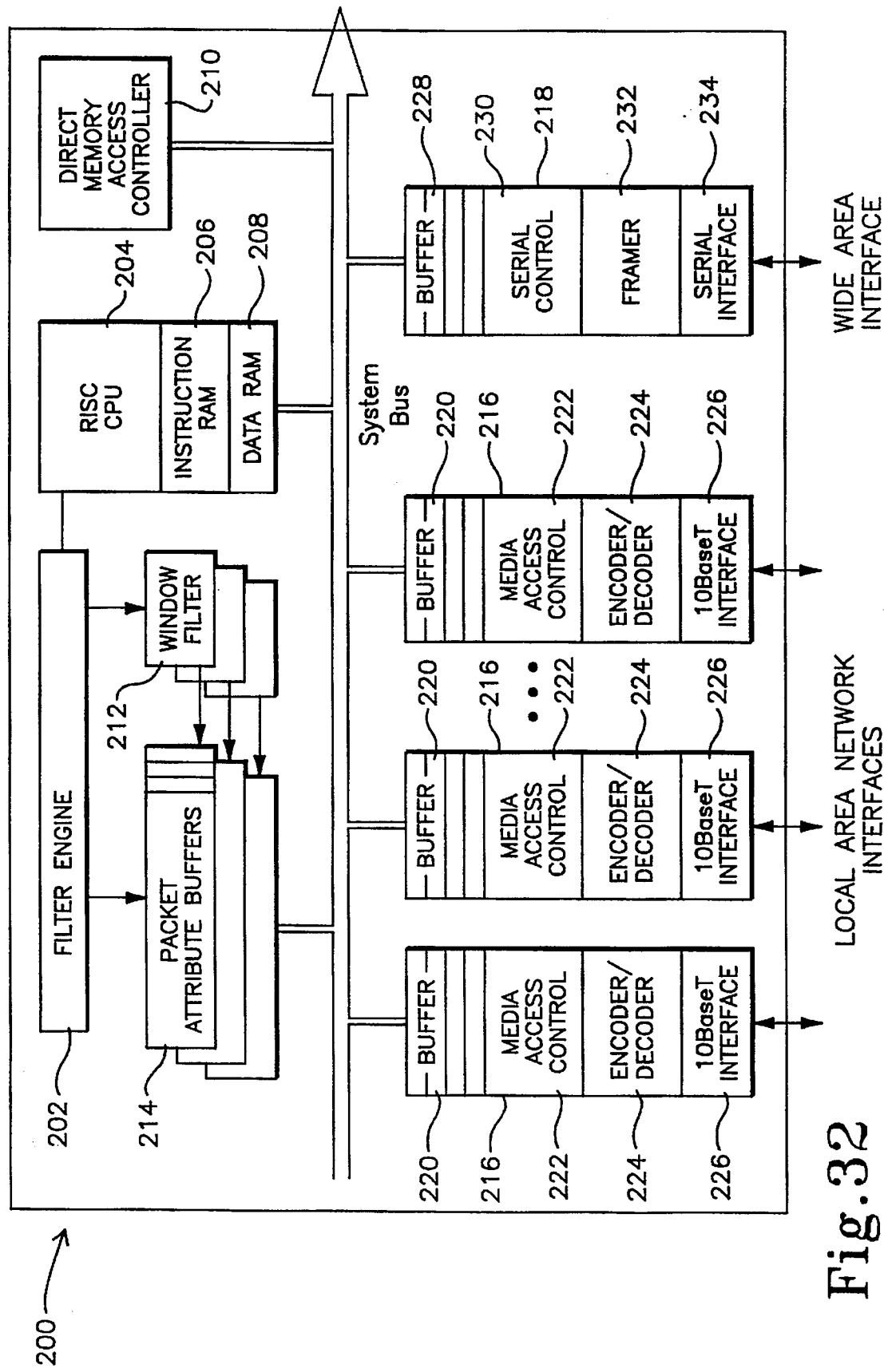
FIG. 32 is a diagram illustrating a multiprotocol or uniprotocol single chip router.

FIG. 32 illustrates a single chip device which can be configured as a hub, a bridge or a router depending on the types of interface units provided. As illustrated, a single chip router 200 comprises a filter engine 202, a RISC CPU 204, an instruction RAM 206, a packet data RAM 208, a direct memory access controller 210, a window filter 212, a plurality of packet attribute buffer memories 214, a plurality of LAN media access interface units 216 and a WAN interface unit 218. The router 200 can be converted to a hub by omitting or not using the WAN interface unit 218. These units are interconnected as illustrated in the drawing.

Each interface unit 216 comprises a buffer 220, a media access controller 222, an encoder/decoder 224 and a 10BaseT interface 226. The interface unit 218 comprises a buffer 228, a serial controller 218, a framer 232 and a serial interface 234.

The CPU 204 controls all processing of data packets in the memory RAM 208 including segmentation, reassembly, routing, address hashing and address filtering. The CPU 204 also utilizes the DMA controller 210 as a slave resource for transferring data packets from the memory 208 to and from the interfaces 216 and 218 using scatter and gather techniques. The instruction RAM 206 stores an operating program for the CPU 206 in volatile or non-volatile memory.

The packet attribute buffers 214 store attributes of packets which are accessed using the packet addresses. The filter engine 202 and CPU 204 perform a non-linear hashing algorithm on the packet addresses for accessing the corresponding attributes in the buffers 214 with reduced processing time and hardware. The window filter 212 further facilitates attribute access by examining only predetermined portions of the addresses rather than the entire addresses.

The combination of the non-linear hashing function and the window filter enable the router 200 to be fabricated on a single chip, eliminating the problems with external memory access and latency which plague the prior art. These functions enable the data packets to be stored in the on-chip data RAM 208, rather than in external CAM memory as in the prior art.

Typical Network topologies today make extensive use of Local Area Network (LAN) traffic and "routing" of such LAN traffic over a Wide Area Network (WAN). The node devices provide a desktop or terminal interface for traffic at speeds of up to 100 mbps. These nodes may be linked together or individually instantiated. The linked units are typically 30 to 50 per link, sharing the bandwidth of an individual "port" or Media Access Controller (MAC) and thus operating at a lower throughput due to shared bandwidth.

The hub provides the concentration and decision point for network traffic that must be passed between "segments", with each segment being represented by a unique port on the "port" or local side of the hub. The hub decides whether to forward a packet to another node or out of the WAN port based on the attributes of that packet, or whether to "drop" if the address is a local one and will be therefore picked up by another node on that same segment.

Typical hub operation is therefore known as "physical layer" passthrough, as it simply works at the physical wire level, moving LAN mode traffic from physical interface to physical interface as needed, wave shaping the signal and amplifying it if necessary.

The topology of providing a single node per MAC and switching this traffic through the hub provides full bandwidth for that node, significantly improving performance for that individual node over conventional shared MAC topologies. By dedicating the Media Access Controller to the port and providing for a single address and packet switching fabric, a substantial performance gain can be attained.

A hub can terminate dozens of segments, however, each representing 30 to 50 nodes, with each node being identified by a unique 48 byte static address. As such the range of each address is $2^{48}$, and the number of addresses terminated on a hub could be on the order of 1,000. This traffic level can congest a node to the point of saturation in a populated LAN environment. By filtering LAN segment addresses and only passing through those as required to other segments, bridging can be performed, greatly reducing traffic on each segment. This process operates at the "data link" layer of the OSI network model and involves learning the LAN topology in address tables and deciding on whether to pass a packet through a bridge point, as it is destined for some other segment, or dropping it, as it is destined for another user on the same local segment.

The nodes can represent various types of LAN traffic or communications standards, all terminating on the hub. Typical LAN protocols include Ethernet (IEEE 802.3) and Token Ring (IEEE 802.5).

These LAN standards must often be routed out of the WAN to reach a remote hub or node, by utilizing a process known as routing. This process involves the following:

1. Mapping the LAN packet into a desired outgoing port format.
2. Attaching a routing address to the final destination.
3. Attaching an intermediate address to the next node in the mesh that represents the optimal intermediate path to reach that node.

This process is currently accomplished by multiprotocol routers at the Network Layer, requiring substantially higher processing power than the hub or bridge. The entire process is reciprocated in the reverse direction.

Packet processing, address filtering and destination routing all require a central processing unit. In accordance with the present invention, these functions are integrated on a signal chip. A single chip router or hub embodying the present invention includes the following elements.

A high performance RISC CPU 204 which operates at a speed of greater than 5.40 Mips.

Multiple media access controllers 216 with full interface connectivity.

A direct memory access controller 210 with a Linked-List capability.

Wide area network ports 218.

A packet cache memory 208.

A packet address memory 214 with a non-linear search mechanism (hash/window filter).

A packet attribute table with learning capability.

SINGLE DEVICE IMPLEMENTATION— ELIMINATION OF DISCREET PERFORMANCE BOTTLENECKS

A hub or router conventionally comprises a LAN I/O subsystem, a WAN/ I/O subsystem, DAM controller, central processing unit (CPU) and buffer memory all connected to a common system bus. The primary bottleneck is the packet memory and I/O subsystem latency. In order to move traffic into and out of the CPU, the latencies are introduced by chip to chip and memory delays. In order to quickly assembly and disassembly the various packet structures provided by these multiple standards, the CPU must move traffic from the I/O subsystem to and from buffer memory and perform a variety of bit level manipulations on the traffic. This is the secondary bottleneck in the conventional router architecture.

The incoming source and destination addresses must be matched with a filter/forward tree, and other attributes pertaining to security, protocol type, speed, etc. must be obtained. These can be done in a linear fashion at considerable time expense, or with a complex mechanism of Content Addressable Memories (CAM). Since the performance advantage obtained by embodying the entire system in a single chip is substantial, bringing this mechanism on chip would be required.

This is not technically feasible. RISC architectures can be utilized to improve the overall CPU performance, but the ability to bring the packet memory on-chip with a more efficient packet access structure eliminates the latencies associated with off-chip packet access in conventional DRAM technology. By also accommodating the I/O subsystem and memory controller, external accesses are virtually eliminated, significantly improving packet throughput.

ATTRIBUTE LOOK-UP/DECISION MAKING

Once a network configuration is learned by a typical router, the requirement to manipulate the entire address field is seldom required. As a matter of fact, of the 48 bits of address, as few as 12 bits need be processed. By using a variable window filter on the packet memory, the access time for channel or packet attributes can be further reduced.

Figure 33:
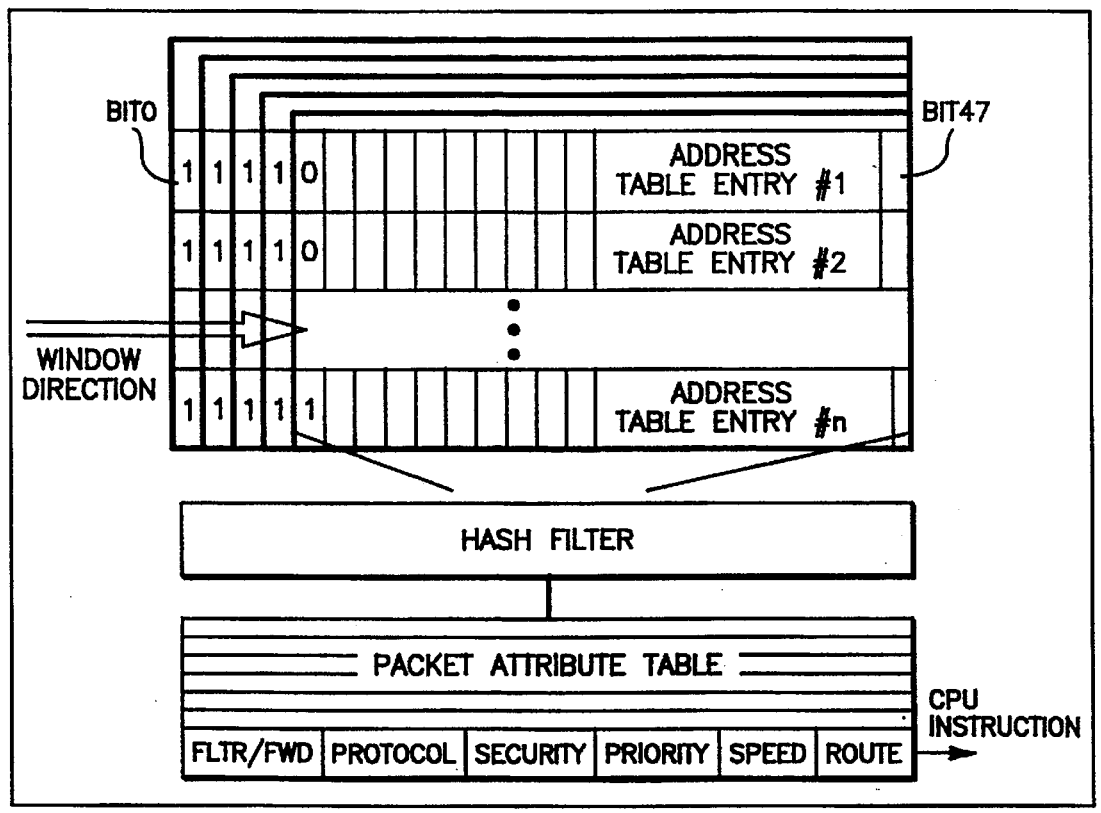
FIG. 33 is a diagram illustrating a dynamic window filter.

The nodes or segments terminating on a hub are similar in location, user group and/or matching type. By recognizing the fact that these address fields will be similar in some respects, particularly in the most significant bit fields, it is possible to substantially reduce the attribute look-up time by using the variable width window filter on the special RAM structure as illustrated in FIG. 33. This provides an entire routing/bridging/filter decision to the CPU in the form of a comprehensive control word.

DYNAMIC WINDOW FILTER

A typical Data Link Layer Frame Format in the Ethernet format consists of destination, source, type, data payload and frame check sequences. The window filter finds the maximum common address range for the active addresses terminated on the device by parsing the source packet address tables at network configuration and as a backup task upon instantiation of a new address. Although this procedure is time consuming for the first pass, it substantially reduces packet attribute searches when done in real time.

The filtering process typically starts at the most significant bit first, and reduces the size of the window until a difference in incoming address bit field is found (FIG. 33). The architecture does not require a separate memory for packet addresses, as this would consume considerable space on the device. Instead, the packet window filter adjusts to the minimum size as incoming packet addresses are passed through the device. This packet address table can be stored off-chip in less costly DRAM for background access and window filter setup. This window filter feeds the hash-function dynamically or as instructed by the CPU. This function utilizes the Packet Attribute memory by configuring it for the parameters required.

In the dynamic mode of operation, source address windows can be reduced from the 48 bit field to a considerably smaller number of entries. In the example of FIG. 33, a 16 bit unique field is identified and the entire Type field is utilized as the control word to instruct the CPU what to do with the packet. The CPU decision can be created while the packet payload is being streamed as outlined by the command word in real time.

The actual filter algorithm is run on the CPU so as to provide higher levels of flexibility in choosing a particular algorithm for a specific network topology.

STATIC WINDOW FILTER

Figure 34:
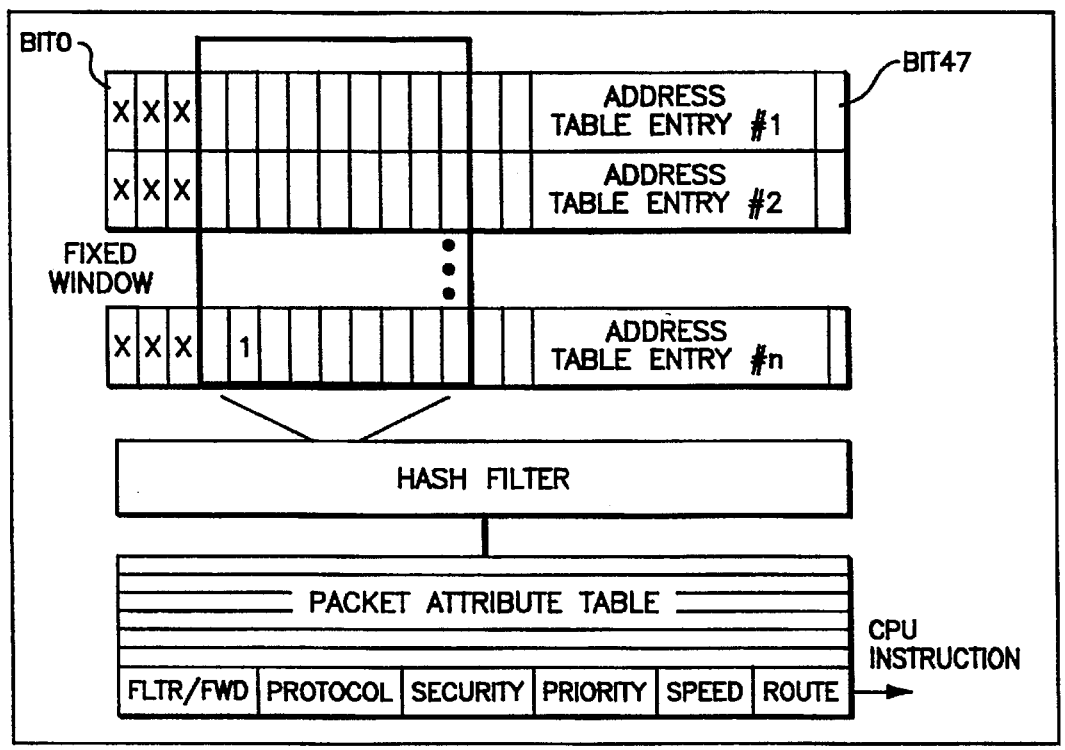
FIG. 34 is a diagram illustrating a static window filter.
Figure 35:
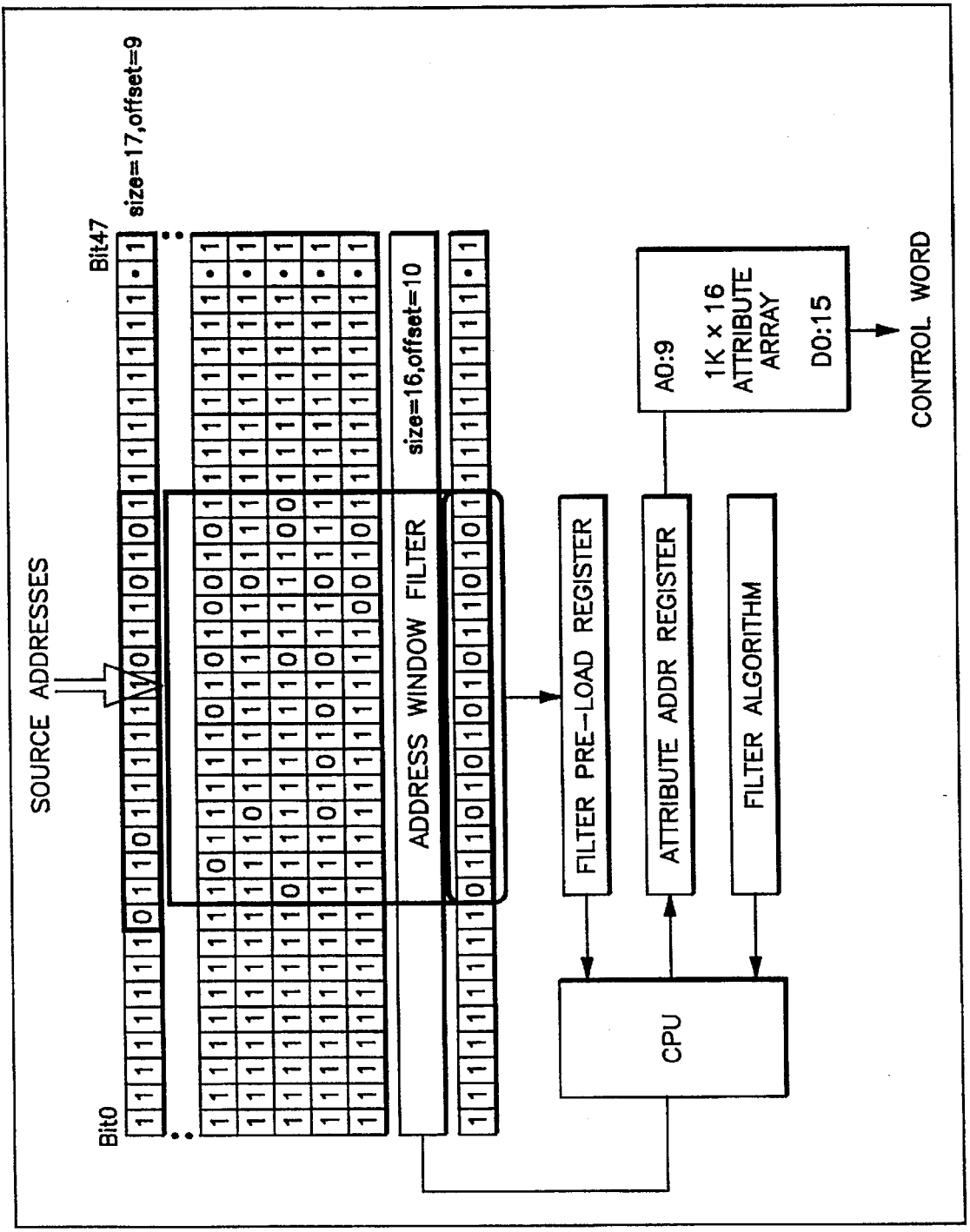
FIG. 35 is a diagram illustrating an example of static window filtering.

As outlined above, the dynamic window filter sizes itself to the smallest least common address window size. In specific routing or attribute environments, the window can be programmed to be a fixed size to greatly improve decision time. For example, encryption or compression of only addresses going to a certain destination range can be triggered by filter memory locations based on a fixed window. An example of a static window filter is illustrated in FIG. 34, with an example of the operation thereof illustrated in FIG. 35.

NON-LINEAR PACKET ATTRIBUTE LOOK-UP

Once the window size has been determined, access to packet attributes can be accelerated by the use of a nonlinear algorithm running on the CPU. This also reduces the size of the packet attribute memory, facilitating the single chip solution. The CPU is passed a filter "key" in the form of a window under examination and the CPU implements the desired filtering in the form of a hashing function. The CPU then provides the resultant address to the packet attribute memory (PAM) for storage and subsequent retrieval.

CONTROL WORD PASS THROUGH

Instead of yielding a single decision as in a bridge (drop of forward packet) or a routing decision outcome, the entry in the PAM can provide a complete control word to the CPU instructing it on what to do with the packet.

HIGH SPEED PACKET BUILDING/MEMORY FRAGMENTING

Using a DMA controller to build packets in memory or move them quickly from one buffer location to another is required. By construction, the present invention provides the system design with all of the functionality needed to implement a fully robust scatter-gather Device to Memory interface. In the gather direction (during packet building for transmission), the invention is capable of generating cells from any number of separate data packets in memory as if they were a single contiguous packet.

By doing so, the invention precludes the need for the host processor to do a series of time consuming data movement operations to form a contiguous packet in a local buffer memory prior to initializing the transmit operation. For example, in a TCP/IP application, the TCP/IP header may reside in a different location within host memory from the actual user packet data payload. In addition, the actual packet data payload field may actually consist of a number of discontinuous pages of memory. Because the invention supports "Gather" operations, there is no need to move all of these data structures in advance into a single packet.

The actual implementation of both scatter and gather are defined in user firmware running on the RISC CPU 204. In general, the gather function can be implemented by having the host processor pass to the invention a series of "Segment Packet Fragment" messages with the appropriate user defined control structures. The RISC CPU 204, recognizing that it is involved in a gather operation, is programmed not to generate end of packet header fields at the end of a packet fragment. It is also programmed to understand how to resolve the arrival at an end of a packet fragment boundary (i.e. automatically resolve the link list pointer or simply pass a message to the host processor asking it to resolve the next pointer for it).

Packets under segmentation need not be contiguous in system memory when using the invention. The segmentation and reassembly routines, written by the system designer and executed by the invention, can perform segmentation on non-contiguous data structures that logically form a single packet. This is what is commonly referred to as the "gather" function of a scatter-gather DMA controller. These user supplied routines handle packet and packet header generation and extraction as well as link list pointer management and buffer allocation. The implications of "scatter" and "gather" support, made possible by the inclusion of a 32 bit RISC CPU 204, enable accelerated packet building so as to eliminate the newly created packet building/memory scatter bottleneck.

In specialty applications, the invention can also perform the stripping of higher layer headers from incoming packets and placing them in specific memory locations to aid network software. In addition, the invention can utilize the powerful byte alignment capabilities of the DMA engine to ensure that the higher layer (Transport Layer) is written into memory on a word aligned basis. This releases application layer software from the responsibility of ensuring proper data alignment.

Figure 36:
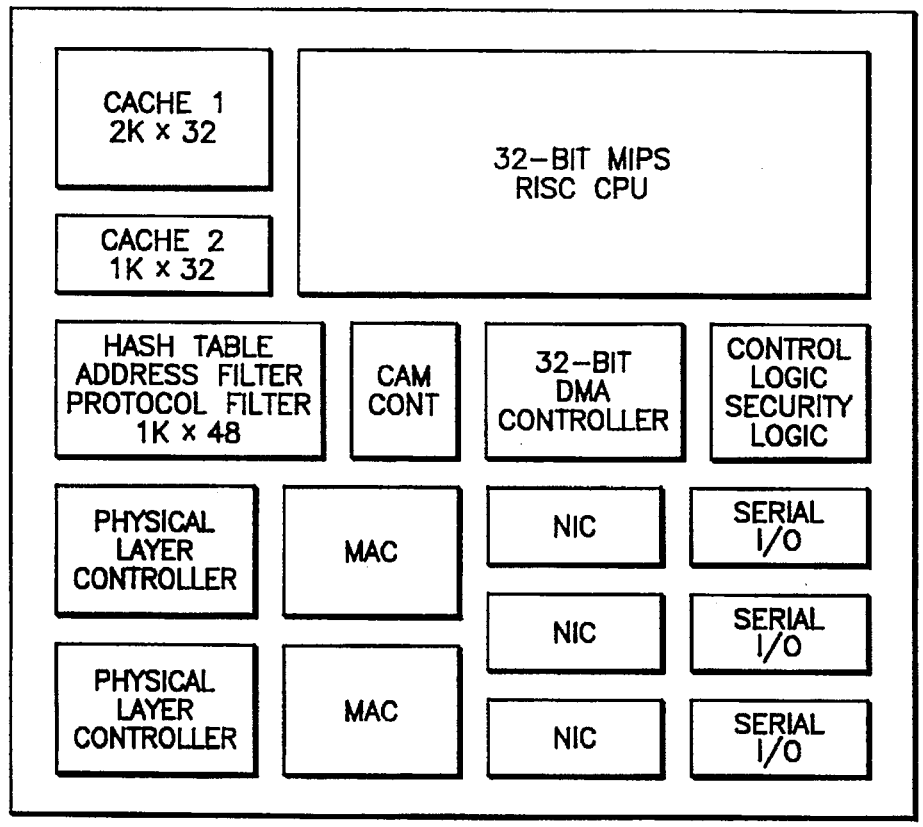
FIG. 36 is a diagram illustrating an example of a single chip router as fabricated on a substrate.
Figure 37:
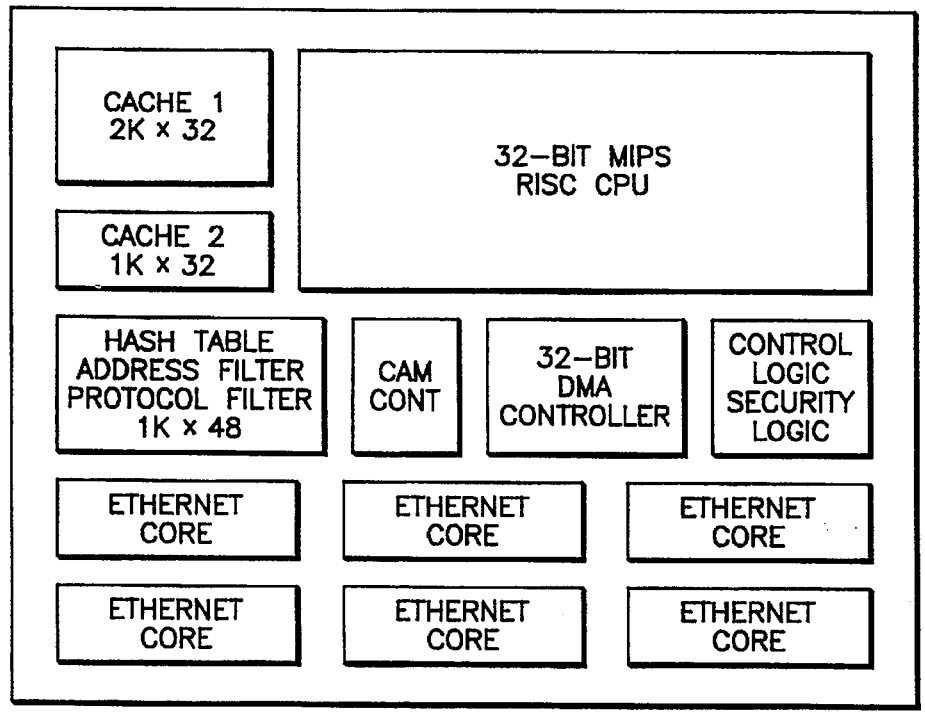
FIG. 37 is similar to FIG. 36, but illustrates a single chip hub.

FIGS. 36 and 37 are architectural examples of the layout of components of a single chip router and a single chip hub respectively which are fabricated on an integral substrate in accordance with the above described principles of the present invention.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

We claim:

1. A single chip router for a multiplex communication network, comprising:

a packet memory for storing data packets;

a processor for processing said packets including converting said packets between a first protocol and a second protocol;

at first protocol interface unit;

a second protocol interface unit;

a memory controller for transferring packets in said first and second protocols between the processor and the memory, for transferring packets in said first protocol between the memory and the first protocol interface unit and for transferring packets in said second protocol between the memory and the second protocol interface unit; and an address window filter for identifying a source or destination address of a packet being processed by examining only a predetermined portion of said address;

the address window filter including a dynamic window filter.

2. A single chip router for a multiplex communication network, comprising:

a packet memory for storing data packets;

a processor for processing said packets including converting said packets between a first protocol and a second protocol;

a first protocol interface unit;

a second protocol interface unit;

a memory controller for transferring packets in said first and second protocols between the processor and the memory, for transferring packets in said first protocol between the memory and the first protocol interface unit, and for transferring packets in said second protocol between the memory and the second protocol interface unit; and an address window filter for identifying the address of a packet being converted by examining only a predetermined portion of said address; in which the address window filter comprises a dynamic window filter; and the dynamic window filter comprises means for determining said predetermined portion of said address for examination by determining a common address range of addresses of packets processed by the router.

3. A router, comprising:

a processor for processing data packets;

a packet attribute memory for storing attributes of said data packets;

an attribute processor for performing a non-linear algorithm on a source or destination address of a packet being processed for accessing a corresponding attribute of said packet being processed in the packet attribute memory; and an address window filter for identifying said address of said packet being processed by examining only a predetermined portion of said address;

the address window including a dynamic window filter.

4. A router, comprising:

a processor for processing data packets;

a packet attribute memory for storing attributes of said data packets;

an attribute processor for performing a non-linear algorithm on an address of a packet being processed for accessing a corresponding attribute of said packet being processed in the packet attribute memory; and an address window filter for identifying said address of said packet being processed by examining only a predetermined portion of said address; in which the address window filter comprises a dynamic window filter; and the dynamic window filter comprises means for determining said predetermined portion of said address for examination by determining a common address range of addresses of packets processed by the router.

* * * * *

UNITED STATES PATENT AND TRADEMARK OFFICE
CERTIFICATE OF CORRECTION

PATENT NO. : 5,640,399
DATED : June 17, 1997
INVENTOR(S) : Michael D. Rostoker, D. Tony Stelliga It is certified that error appears in the above-indentified patent and that said Letters Patent is hereby corrected as shown below:

Column 69, line 44, claim 1, at the beginning of the line, delete the word "at" and and insert therefor the word --a--.

Signed and Sealed this

Twenty-first Day of October 1997

Attest:

BRUCE LEHMAN

Attesting Officer

Commissioner of Patents and Trademarks